United States Patent
Ho et al.

(10) Patent No.: US 11,449,171 B2
(45) Date of Patent: Sep. 20, 2022

(54) TOUCH SYSTEM AND TOUCH SENSITIVE PROCESSING APPARATUS AND METHOD THEREOF FOR DETECTING WHETHER TOUCH PANEL IS PARTIALLY SUBMERGED IN CONDUCTIVE LIQUID

(71) Applicant: EGALAX_EMPIA TECHNOLOGY INC., Taipei (TW)

(72) Inventors: Shun-Lung Ho, Taipei (TW); Hsiao-Tsung Lee, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 17/139,540

(22) Filed: Dec. 31, 2020

(65) Prior Publication Data
US 2021/0200408 A1 Jul. 1, 2021

(30) Foreign Application Priority Data
Dec. 31, 2019 (TW) .................................. 108148742

(51) Int. Cl.
*G06F 3/044* (2006.01)
*G06F 3/041* (2006.01)
(52) U.S. Cl.
CPC ........ *G06F 3/04164* (2019.05); *G06F 3/0445* (2019.05); *G06F 3/04166* (2019.05)

(58) Field of Classification Search
None
See application file for complete search history.

(56) References Cited

U.S. PATENT DOCUMENTS

| | | | | |
|---|---|---|---|---|
| 9,904,427 B1* | 2/2018 | Co | ..................... | G06F 3/041661 |
| 2016/0291796 A1* | 10/2016 | Ho | ........................ | G06F 3/0447 |
| 2018/0260070 A1* | 9/2018 | Mun | ..................... | G06F 3/0488 |
| 2018/0307375 A1* | 10/2018 | Shah | ....................... | G06V 40/28 |
| 2019/0129556 A1* | 5/2019 | Hwang | ............... | G06F 3/04166 |

* cited by examiner

*Primary Examiner* — Krishna P Neupane
(74) *Attorney, Agent, or Firm* — WPAT, PC

(57) ABSTRACT

The present invention provides a touch sensitive processing method for detecting a liquid line when a touch panel half submerged in conductive liquid, wherein the touch panel comprises multiple parallel first electrodes and multiple parallel second electrodes, the touch sensitive processing method comprising: determining whether a liquid line piece group touches two sides of the touch panel if the liquid line piece group does exists; calculating two averaged values of sensing information with regard to two parts of the touch panel separated by the liquid line piece group if it touches two sides of the touch panel; determining a part of the touch panel having a larger averaged value is above the conductive liquid and another part of the touch panel is below the conductive liquid; and determining a liquid line according to a surface between the part above the conductive liquid and the liquid line piece group.

12 Claims, 22 Drawing Sheets

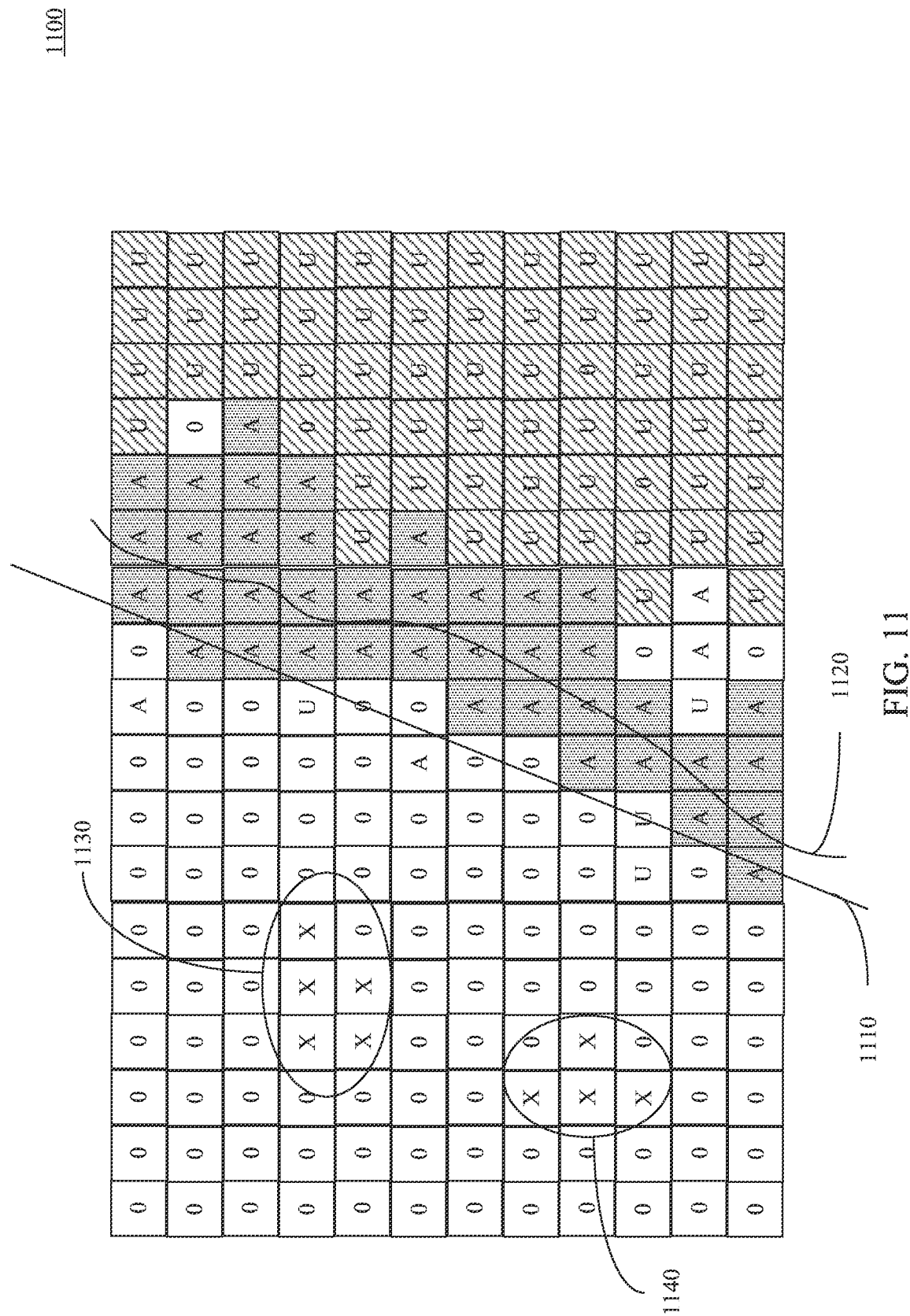

TOUCH SYSTEM AND TOUCH SENSITIVE PROCESSING APPARATUS AND METHOD THEREOF FOR DETECTING WHETHER TOUCH PANEL IS PARTIALLY SUBMERGED IN CONDUCTIVE LIQUID

CROSS REFERENCE TO RELATED PATENT APPLICATION

This patent application is based on a Taiwan, R.O.C. patent application No. 108148742 filed on Dec. 31, 2019.

FIELD OF THE INVENTION

The present invention relates to touch system, and more particularly, to touch system which is able to report touch event when the touch system is partially submerged in conductive liquid.

BACKGROUND OF THE INVENTION

Touch screen or panel is one of common output interfaces of modern electronic systems. More and more modern electronic systems increasingly emphasize drip-proof, water-proof and dust-proof functions. When a modern electronic system is in use closer to a water surface, especially seawater with good conductive characteristics, the touch screen or panel would be malfunctioned because it is mostly covered by water or conductive liquid although the electronic system may not be permanently damaged. User experiences would be bad due to the input functions of the electronic system are reduced to water-proof buttons.

Hence, there exists a need of an electronic system which can be operated around a water surface. The electronic system is able to detect the water surface on the touch screen or panel and to provide different touch input functions above and below the water surface, such that the electronic system is capable to provide different outputs according to different touch inputs.

SUMMARY OF THE INVENTION

An objective of the present application is to provide an electronic device and a touch sensitive processing apparatus and methods thereof for determining whether a component of the electronic device is submerged in conductive liquid. The determination is further based on another determination of liquid surface line corresponding to a touch panel of the electronic device. The present application further provides detection mechanisms for detecting a touching or approximating event happens in the submerged area of the touch panel.

According to an embodiment, the present application provides an electronic device for detecting whether a component is submerged in conductive liquid, comprising: the component; a touch panel; a touch sensitive processing apparatus, coupled to the touch panel, configured to detect a liquid surface line when the electronic device is partially submerged in the conductive liquid; an attitude sensor, for detecting an attitude of the electronic device relative to ground; and a central processing unit (CPU) module, connected to the touch sensitive processing apparatus and the attitude sensor, configured to execute instruction for implementing following steps: receiving the liquid surface line from the touch sensitive processing apparatus; receiving the attitude from the attitude sensor; gathering positional data of the touch panel and the component; and determining whether the component is submerged in the conductive liquid according to the positional data, the liquid surface line and the attitude.

In one embodiment, in order to be adapted to changeable shape of the electronic device, the electronic device further comprises a sensor, connected to the CPU module, configured to detect the positional data of the touch panel and the component and to transmit the positional data to the CPU module.

In one embodiment, if relative positions of the touch panel and the component are fixed, the electronic device further comprises a memory module, connected to the CPU module, configured to store the positional data of the touch panel and the component and to provide the positional data to the CPU module.

In one embodiment, in order to be adapted to new environment, the CPU module is further configured to execute instruction for implementing one of following steps: performing an entering step if the component is determined being submerged in the conductive liquid; performing a component entering step if the component is determined being submerged in the conductive liquid; performing an exiting step if the component is determined being un-submerged in the conductive liquid; and performing a component exiting step if the component is determined being un-submerged in the conductive liquid.

According to an embodiment, the present application provides a method for detecting whether a component is submerged in conductive liquid, comprising: receiving a liquid surface line from a touch sensitive processing apparatus of an electronic device, wherein the touch sensitive processing apparatus, coupled to a touch panel, is configured to detect the liquid surface line when the electronic device is partially submerged in the conductive liquid; receiving an attitude from an attitude sensor of the electronic device, wherein the attitude sensor is configured for detecting an attitude of the electronic device relative to ground; gathering positional data of the touch panel and the component; and determining whether the component is submerged in the conductive liquid according to the positional data, the liquid surface line and the attitude.

In one embodiment, in order to be adapted to changeable shape of the electronic device, the gathering step further comprises: receiving the positional data of the touch panel and the component from a sensor of the electronic device.

In one embodiment, if relative positions of the touch panel and the component are fixed, the gathering step further comprises reading the positional data of the touch panel and the component from a memory module of the electronic device.

In one embodiment, in order to be adapted to new environment, the method further comprises one of following steps: performing an entering step if the component is determined being submerged in the conductive liquid; performing a component entering step if the component is determined being submerged in the conductive liquid; performing an exiting step if the component is determined being un-submerged in the conductive liquid; and performing a component exiting step if the component is determined being un-submerged in the conductive liquid.

According to one embodiment, the present application provides an electronic device for detecting whether a component is submerged in conductive liquid, comprising: the component; a first touch panel; a second touch panel; a touch sensitive processing apparatus, coupled to the first touch panel and the second touch panel, configured to detect a first liquid surface line by the first touch panel and to detect a second liquid surface line by the second touch panel when the electronic device is partially submerged in the conductive liquid; and a central processing unit (CPU) module, connected to the touch sensitive processing apparatus, configured to execute instruction for implementing following steps: receiving the first liquid surface line and the second liquid surface line from the touch sensitive processing apparatus; gathering positional data of the first touch panel, the second touch panel and the component; and determining whether the component is submerged in the conductive liquid according to the positional data, the first liquid surface line and the second liquid surface line.

In one embodiment, in order to be adapted to changeable shape of the electronic device, the electronic device further comprises a sensor, connected to the CPU module, configured to detect the positional data of the first touch panel, the second touch panel and the component and to transmit the positional data to the CPU module.

In one embodiment, if relative positions of the first touch panel, the second touch panel and the component are fixed, the electronic device further comprises a memory module, connected to the CPU module, configured to store the positional data of the first touch panel, the second touch panel and the component and to provide the positional data to the CPU module.

In one embodiment, in order to be adapted to new environment, the CPU module is further configured to execute instruction for implementing one of following steps: performing an entering step if the component is determined being submerged in the conductive liquid; performing a component entering step if the component is determined being submerged in the conductive liquid; performing an exiting step if the component is determined being un-submerged in the conductive liquid; and performing a component exiting step if the component is determined being un-submerged in the conductive liquid.

In one embodiment, in order to more precisely determine whether the component is submerged in the conductive liquid, the electronic device further comprises an attitude sensor, connected to the CPU module, configured to detect an attitude of the electronic device relative to ground, wherein the CPU module is further configured to execute instruction for receiving the attitude from the attitude sensor, wherein the determining is further according to the positional data, the first liquid surface line, the second liquid surface line and the attitude.

According to one embodiment, the present application provides an electronic device for detecting whether a component is submerged in conductive liquid, comprising: the component; a first touch panel; a second touch panel; a first touch sensitive processing apparatus, coupled to the first touch panel, configured to detect a first liquid surface line by the first touch panel when the electronic device is partially submerged in the conductive liquid; a second touch sensitive processing apparatus, coupled to the second touch panel, configured to detect a second liquid surface line by the second touch panel when the electronic device is partially submerged in the conductive liquid; and a central processing unit (CPU) module, connected to the first touch sensitive processing apparatus and the second touch sensitive processing apparatus, configured to execute instruction for implementing following steps: receiving the first liquid surface line and the second liquid surface line from the first touch sensitive processing apparatus and the second touch sensitive processing apparatus, respectively; gathering positional data of the first touch panel, the second touch panel and the component; and determining whether the component is submerged in the conductive liquid according to the positional data, the first liquid surface line and the second liquid surface line.

In one embodiment, in order to be adapted to changeable shape of the electronic device, the electronic device further comprises a sensor, connected to the CPU module, configured to detect the positional data of the first touch panel, the second touch panel and the component and to transmit the positional data to the CPU module.

In one embodiment, if relative positions of the first touch panel, the second touch panel and the component are fixed, the electronic device further comprises a memory module, connected to the CPU module, configured to store the positional data of the first touch panel, the second touch panel and the component and to provide the positional data to the CPU module.

In one embodiment, in order to be adapted to new environment, the CPU module is further configured to execute instruction for implementing one of following steps: performing an entering step if the component is determined being submerged in the conductive liquid; performing a component entering step if the component is determined being submerged in the conductive liquid; performing an exiting step if the component is determined being un-submerged in the conductive liquid; and performing a component exiting step if the component is determined being un-submerged in the conductive liquid.

In one embodiment, in order to more precisely determine whether the component is submerged in the conductive liquid, the electronic device further comprises an attitude sensor, connected to the CPU module, configured to detect an attitude of the electronic device relative to ground, wherein the CPU module is further configured to execute instruction for receiving the attitude from the attitude sensor, wherein the determining is further according to the positional data, the first liquid surface line, the second liquid surface line and the attitude.

According to an embodiment, the present application provides a method for detecting whether a component is submerged in conductive liquid, comprising: receiving a first liquid surface line and a second liquid surface line, wherein the first liquid surface line is a line where a surface of the conductive liquid contacts a first touch panel of an electronic device, wherein the second liquid surface line is a line where the surface of the conductive liquid contacts a second touch panel of the electronic device; gathering positional data of the first touch panel, the second touch panel and the component; and determining whether the component is submerged in the conductive liquid according to the positional data, the first liquid surface line and the second liquid surface line.

In one embodiment, in order to be adapted to changeable shape of the electronic device, the gathering step further comprises receiving the positional data of the first touch panel, the second touch panel and the component from a sensor of the electronic device.

In one embodiment, if relative positions of the first touch panel, the second touch panel and the component are fixed, the gathering step further comprises reading the positional data of the first touch panel, the second touch panel and the component from a memory module of the electronic device.

In one embodiment, in order to be adapted to new environment, the method further comprises one of following steps: performing an entering step if the component is determined being submerged in the conductive liquid; performing a component entering step if the component is determined being submerged in the conductive liquid; performing an exiting step if the component is determined being un-submerged in the conductive liquid; and performing a component exiting step if the component is determined being un-submerged in the conductive liquid.

In one embodiment, in order to receive the first and the second liquid surface lines corresponding to the first and the second touch panels, respectively, the electronic device further comprises a touch sensitive processing apparatus coupled to the first touch panel and the second touch panel for detecting the first liquid surface line and the second liquid surface line, respectively, wherein the first liquid surface line and the second liquid surface line are received from the touch sensitive processing apparatus.

In one embodiment, in order to receive the first and the second liquid surface lines corresponding to the first and the second touch panels, respectively, the electronic device further comprises a first touch sensitive processing apparatus, coupled to the first touch panel, for detecting the first liquid surface line and a second touch sensitive processing apparatus, coupled to the second touch panel, for detecting the second liquid surface line, wherein the first liquid surface line and the second liquid surface line are received from the first touch sensitive processing apparatus and the second touch sensitive processing apparatus, respectively.

In one embodiment, in order to more precisely determine whether the component is submerged in the conductive liquid, the electronic device further comprises an attitude sensor for detecting an attitude of the electronic device relative to ground, wherein the method further comprises receiving the attitude from the attitude sensor, wherein the determining is further according to the positional data, the first liquid surface line, the second liquid surface line and the attitude.

According to an embodiment, the present application provides a CPU module as described in the aforementioned paragraphs.

According to an embodiment, the present application provides a touch sensitive processing apparatus for detecting whether a touch panel is partially submerged in conductive liquid, comprising: a driving circuit module; a sensing circuit module; an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: having the driving circuit module drive at least one of the first electrodes and having the sensing circuit module sense the first electrodes for determining which of the first electrodes are covered by the conductive liquid; having the driving circuit module drive at least one of the second electrodes and having the sensing circuit module sense the second electrodes for determining which of the second electrodes are covered by the conductive liquid; determining a liquid surface line according to the second electrodes which are un-submerged if all of the first electrodes and part of the second electrodes are determined being submerged in the conductive liquid; and determining the liquid surface line according to the first electrodes and the second electrodes which are un-submerged if part of the first electrodes and part of the second electrodes are determined being submerged in the conductive liquid.

In one embodiment, in order to detect the situations that the entire touch panel is submerged or un-submerged, the processor module is further configured to execute instruction for implementing following steps: determining the entire touch panel is covered by the conductive liquid if all of the first electrodes and all of the second electrodes are determined being submerged in the conductive liquid; and determining the touch panel is not covered by the conductive liquid if all of the first electrodes and all of the second electrodes are determined being un-submerged in the conductive liquid.

In one embodiment, in order to increase the preciseness of the determined liquid surface line, the processor module is further configured to execute instruction for implementing at least one of following steps: having the driving circuit module drive different one of the first electrodes and having the sensing circuit module sense the first electrodes, adjacent to the first electrode being driven, iteratively for determining which of the first electrodes are covered by the conductive liquid; and having the driving circuit module drive different one of the second electrodes and having the sensing circuit module sense the second electrodes, adjacent to the second electrode being driven, iteratively for determining which of the second electrodes are covered by the conductive liquid.

In one embodiment, in order to reduce number of the detections and to accelerate the detections, the processor module is further configured to execute instruction for implementing at least one of following steps: having the driving circuit module stop sensing the first electrodes, adjacent to the first electrode being driven, if it is determined that at least one of the first electrodes is submerged by the conductive liquid and another one of the first electrodes is not submerged by the conductive liquid; and having the driving circuit module stop sensing the second electrodes, adjacent to the second electrode being driven, if it is determined that at least one of the second electrodes is submerged by the conductive liquid and another one of the second electrodes is not submerged by the conductive liquid.

In one embodiment, in order to provide an option for different applications, the first electrode being driven is selected from one of following: an outermost one of the parallel first electrodes; and one of the parallel first electrodes which is closest to a central figurative parallel line of the parallel first electrodes.

In one embodiment, in order to provide an option for different applications, the first electrodes being driven are two of the outermost first electrodes.

In one embodiment, in order to detect the submerged area, when multiple sensing values corresponding to the first electrodes cannot form a quadratic curve or an absolute value of a difference between the maximum value and the minimum value of the multiple sensing values is less than a predetermined value, it is determined that the first electrodes corresponding to the multiple sensing values are covered by the conductive liquid.

In one embodiment, in order to increase the preciseness of the determined liquid surface line, the processor module is further configured to execute instruction for implementing following steps: receiving an attitude of the touch panel from an attitude sensor; and adjusting the liquid surface line according to the attitude.

According to one embodiment, the present application provides a method for detecting whether a touch panel is partially submerged in conductive liquid, wherein the touch panel comprises multiple parallel first electrodes and multiple parallel second electrodes, wherein the method comprising: driving at least one of the first electrodes and sensing the first electrodes for determining which of the first electrodes are covered by the conductive liquid; driving at least one of the second electrodes and sensing the second electrodes for determining which of the second electrodes are covered by the conductive liquid; determining a liquid surface line according to the second electrodes which are un-submerged if all of the first electrodes and part of the second electrodes are determined being submerged in the conductive liquid; and determining the liquid surface line according to the first electrodes and the second electrodes which are un-submerged if part of the first electrodes and part of the second electrodes are determined being submerged in the conductive liquid.

In one embodiment, in order to detect the situations that the entire touch panel is submerged or un-submerged, the method further comprises: determining the entire touch panel is covered by the conductive liquid if all of the first electrodes and all of the second electrodes are determined being submerged in the conductive liquid; and determining the touch panel is not covered by the conductive liquid if all of the first electrodes and all of the second electrodes are determined being un-submerged in the conductive liquid.

In one embodiment, in order to increase the preciseness of the determined liquid surface line, the method further comprises: driving different one of the first electrodes and sensing the first electrodes, adjacent to the first electrode being driven, iteratively, for determining which of the first electrodes are covered by the conductive liquid; and driving different one of the second electrodes and sensing the second electrodes, adjacent to the second electrode being driven, iteratively for determining which of the second electrodes are covered by the conductive liquid.

In one embodiment, in order to reduce number of the detections and to accelerate the detections, the method further comprises: stopping sensing the first electrodes, adjacent to the first electrode being driven, if it is determined that at least one of the first electrodes is submerged by the conductive liquid and another one of the first electrodes is not submerged by the conductive liquid; and stopping sensing the second electrodes, adjacent to the second electrode being driven, if it is determined that at least one of the second electrodes is submerged by the conductive liquid and another one of the second electrodes is not submerged by the conductive liquid.

In one embodiment, in order to provide an option for different applications, the first electrode being driven is selected from one of following: an outermost one of the parallel first electrodes; and one of the parallel first electrodes which is closest to a central figurative parallel line of the parallel first electrodes.

In one embodiment, in order to provide an option for different applications, the first electrodes being driven are two of the outermost first electrodes.

In one embodiment, in order to detect the submerged area, when multiple sensing values corresponding to the first electrodes cannot form a quadratic curve or an absolute value of a difference between the maximum value and the minimum value of the multiple sensing values is less than a predetermined value, it is determined that the first electrodes corresponding to the multiple sensing values are covered by the conductive liquid.

In one embodiment, in order to increase the preciseness of the determined liquid surface line, the method further comprises: receiving an attitude of the touch panel from an attitude sensor; and adjusting the liquid surface line according to the attitude.

According to one embodiment, the present application provides a touch system for detecting whether a touch panel is partially submerged in conductive liquid, comprising: the touch panel; a touch sensitive processing apparatus, further comprising: a driving circuit module; a sensing circuit module; an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: having the driving circuit module drive at least one of the first electrodes and having the sensing circuit module sense the first electrodes for determining which of the first electrodes are covered by the conductive liquid; having the driving circuit module drive at least one of the second electrodes and having the sensing circuit module sense the second electrodes for determining which of the second electrodes are covered by the conductive liquid; determining a liquid surface line according to the second electrodes which are un-submerged if all of the first electrodes and part of the second electrodes are determined being submerged in the conductive liquid; and determining the liquid surface line according to the first electrodes and the second electrodes which are un-submerged if part of the first electrodes and part of the second electrodes are determined being submerged in the conductive liquid.

According to one embodiment, the present application provides a touch sensitive processing apparatus for detecting whether a touch panel is partially submerged in conductive liquid, comprising: a driving circuit module; a sensing circuit module; an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: having the driving circuit module drive one of the first electrodes and having the sensing circuit module sense the second electrodes, iteratively, for generating multiple one-dimensional sensing information; forming two-dimensional sensing information according to the multiple one-dimensional sensing information; determining whether a line piece group of liquid surface exists according to the two-dimensional sensing information, wherein the line piece group of liquid surface includes line pieces which are continuous parts of some of the one-dimensional sensing information, all values of sensing information belonging to the line piece group of liquid surface are larger than a first threshold; determining whether the line piece group of liquid surface contacts two edges of the touch panel if it is determined that the line piece group of liquid surface does exist; calculating two average values of values of sensing information corresponding to two sides of the two-dimensional sensing information which are separated by the line piece group of liquid surface if it is determined that the line piece group of liquid surface contacts two edges of the touch panel; determining one side with a larger one of the two average values is below a surface of the conductive liquid and another side is above the surface of the conductive liquid; and determining a liquid surface line according to an interface between the line piece group of liquid surface and the side above the surface of the conductive liquid.

In one embodiment, in order to confirm the covered area is submerged in the conductive liquid rather than covered by other object, the processor module is further configured to execute instruction for implementing following steps: determining whether the larger one of the two average values is larger than a second threshold, where the first threshold is larger than the second threshold; and proceeding the determining the liquid surface line step when it is determined that the larger one of the two average values is larger than the second threshold.

In one embodiment, in order to find out a straight line which is the closest to the real liquid surface, the liquid surface line is a straight line, where a sum of distances between the liquid surface line and an interface between the line piece group of liquid surface and the side above the surface of the conductive liquid is smallest.

In one embodiment, in order to provide a more real liquid surface line, the liquid surface line is a curved line, which passes sensing points corresponding to the line piece group of liquid surface which are adjacent to the side above the surface of the conductive liquid.

In one embodiment, in order to provide a more real and lower liquid surface line, the liquid surface line is a curved line, which passes sensing points corresponding to the side above the surface of the conductive liquid which are adjacent to the line piece group of liquid surface.

According to one embodiment, the present application provides a touch sensitive processing method for detecting whether a touch panel is partially submerged in conductive liquid, wherein the touch panel comprises multiple parallel first electrodes and multiple second electrodes, the touch sensitive processing method comprising: driving one of the first electrodes and sensing the second electrodes, iteratively, for generating multiple one-dimensional sensing information; forming two-dimensional sensing information according to the multiple one-dimensional sensing information; determining whether a line piece group of liquid surface exists according to the two-dimensional sensing information, wherein the line piece group of liquid surface includes line pieces which are continuous parts of some of the one-dimensional sensing information, all values of sensing information belonging to the line piece group of liquid surface are larger than a first threshold; determining whether the line piece group of liquid surface contacts two edges of the touch panel if it is determined that the line piece group of liquid surface does exist; calculating two average values of values of sensing information corresponding to two sides of the two-dimensional sensing information which are separated by the line piece group of liquid surface if it is determined that the line piece group of liquid surface contacts two edges of the touch panel; determining one side with a larger one of the two average values is below a surface of the conductive liquid and another side is above the surface of the conductive liquid; and determining a liquid surface line according to an interface between the line piece group of liquid surface and the side above the surface of the conductive liquid.

In one embodiment, in order to confirm the covered area is submerged in the conductive liquid rather than covered by other object, the touch sensitive processing method further comprises: determining whether the larger one of the two average values is larger than a second threshold, where the first threshold is larger than the second threshold; and proceeding the determining the liquid surface line step when it is determined that the larger one of the two average values is larger than the second threshold.

In one embodiment, in order to find out a straight line which is the closest to the real liquid surface, the liquid surface line is a straight line, where a sum of distances between the liquid surface line and an interface between the line piece group of liquid surface and the side above the surface of the conductive liquid is smallest.

In one embodiment, in order to provide a more real liquid surface line, the liquid surface line is a curved line, which passes sensing points corresponding to the line piece group of liquid surface which are adjacent to the side above the surface of the conductive liquid.

In one embodiment, in order to provide a more real and lower liquid surface line, the liquid surface line is a curved line, which passes sensing points corresponding to the side above the surface of the conductive liquid which are adjacent to the line piece group of liquid surface.

According to an embodiment, the present application provides a touch system for detecting whether a touch panel is partially submerged in conductive liquid, comprising: a touch panel, comprising multiple parallel first electrodes and multiple parallel second electrodes; and a touch sensitive processing apparatus, comprising: a driving circuit module; a sensing circuit module; an interconnection network module, configured to connect the driving circuit module and one of the multiple parallel first electrodes and the multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: having the driving circuit module drive one of the first electrodes and having the sensing circuit module sense the second electrodes, iteratively, for generating multiple one-dimensional sensing information; forming two-dimensional sensing information according to the multiple one-dimensional sensing information; determining whether a line piece group of liquid surface exists according to the two-dimensional sensing information, wherein the line piece group of liquid surface includes line pieces which are continuous parts of some of the one-dimensional sensing information, all values of sensing information belonging to the line piece group of liquid surface are larger than a first threshold; determining whether the line piece group of liquid surface contacts two edges of the touch panel if it is determined that the line piece group of liquid surface does exist; calculating two average values of values of sensing information corresponding to two sides of the two-dimensional sensing information which are separated by the line piece group of liquid surface if it is determined that the line piece group of liquid surface contacts two edges of the touch panel; determining one side with a larger one of the two average values is below a surface of the conductive liquid and another side is above the surface of the conductive liquid; and determining a liquid surface line according to an interface between the line piece group of liquid surface and the side above the surface of the conductive liquid.

In one embodiment, in order to confirm the covered area is submerged in the conductive liquid rather than covered by other object, the processor module is further configured to execute instruction for implementing following steps: determining whether the larger one of the two average values is larger than a second threshold, where the first threshold is larger than the second threshold; and proceeding the determining the liquid surface line step when it is determined that the larger one of the two average values is larger than the second threshold.

In one embodiment, in order to find out a straight line which is the closest to the real liquid surface, the liquid surface line is a straight line, where a sum of distances between the liquid surface line and an interface between the line piece group of liquid surface and the side above the surface of the conductive liquid is smallest.

In one embodiment, in order to a more real liquid surface line, the liquid surface line is a curved line, which passes sensing points corresponding to the line piece group of liquid surface which are adjacent to the side above the surface of the conductive liquid.

In one embodiment, in order to a more real and lower liquid surface line, the liquid surface line is a curved line, which passes sensing points corresponding to the side above the surface of the conductive liquid which are adjacent to the line piece group of liquid surface.

According to an embodiment, the present application provides a touch sensitive processing apparatus for detecting whether a touch panel is partially submerged in conductive liquid, comprising: a driving circuit module; a sensing circuit module; an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: detecting a liquid surface line, by the driving circuit module, the sensing circuit module and the interconnection network module, and a covered area of the touch panel, below the liquid surface line, which is covered by the conductive liquid; detecting first touching or approximating event in the covered area; when zero or three first touching or approximating events are detected, reporting no first touching or approximating event to a host; and when one first touching or approximating event is detected, reporting the first touching or approximating event to the host.

In one embodiment, in order to report touching or approximating events above the liquid surface line, the processor module is further configured to execute instruction for implementing following steps: having the driving circuit module drive one of the first electrodes and having the sensing circuit module sense the second electrodes, iteratively, for generating multiple one-dimensional sensing information; forming two-dimensional sensing information according to the multiple one-dimensional sensing information; calculating one or more second touching or approximating events according to the two-dimensional sensing information; reporting the one or more second touching or approximating events which are outside the covered area to the host.

In one embodiment, in order to report an rectangle defined by two touching or approximating events below the liquid surface line, the processor module is further configured to execute instruction for implementing following steps: when two first touching or approximating events are detected in the covered zone, forming a rectangle with four vertices according to the two first touching or approximating events; and reporting the rectangle to the host.

In one embodiment, in order to report an rectangle defined by two touching or approximating events below the liquid surface line, the processor module is further configured to execute instruction for implementing following steps: when two first touching or approximating events are detected in the covered zone, forming a rectangle with four vertices according to the two first touching or approximating events; and when the four vertices are inside the covered area, reporting the rectangle to the host.

In one embodiment, in order to distinguish two touching or approximating events from the rectangle, the four vertices of the rectangle sequentially includes a first vertex, a second vertex, a third vertex and a fourth vertex, wherein the processor module is further configured to execute instruction for implementing following steps: having the driving circuit module drive one of the first electrodes and having the sensing circuit module sense the second electrodes, iteratively, for generating multiple one-dimensional sensing information; forming two-dimensional sensing information according to the multiple one-dimensional sensing information; calculating one or more second touching or approximating events according to the two-dimensional sensing information; when the first vertex is not inside the covered area, determining whether the vertex is corresponding to one of the second touching or approximating events; when the first vertex is corresponding to one of the second touching or approximating events, reporting the third vertex as a first touching or approximating event to the host; and when the first vertex is not corresponding to one of the second touching or approximating events, reporting the two vertex and the fourth vertex as the first touching or approximating events to the host.

In one embodiment, in order to detect touching or approximating event inside the covered area, the processor module is further configured to execute instruction for implementing following steps: having the driving circuit module drive one of the first electrodes and having the sensing circuit module sense the second electrodes, iteratively, for generating multiple one-dimensional sensing information; forming two-dimensional sensing information according to the multiple one-dimensional sensing information; calculating one or more second touching or approximating events according to the two-dimensional sensing information; when the first vertex is not inside the covered area, determining whether the vertex is corresponding to one of the second touching or approximating events; when the first vertex is corresponding to one of the second touching or approximating events, reporting the third vertex as a first touching or approximating event to the host; and when the first vertex is not corresponding to one of the second touching or approximating events, reporting the two vertex and the fourth vertex as the first touching or approximating events to the host.

In one embodiment, in order to detect touching or approximating event inside the covered area, the processor module is further configured to execute instruction for implementing following steps: having the driving circuit module simultaneously drive the first electrodes inside the covered area and having the sensing circuit module sense the second electrodes inside the covered area for generating multiple second sensing values; determining at least one second coordinate value according to the multiple second sensing values; having the driving circuit module simultaneously drive the second electrodes inside the covered area and having the sensing circuit module sense the first electrodes inside the covered area for generating multiple first sensing values; determining at least one first coordinate value according to the multiple first sensing values; and determining there exists one second touching or approximating event located at a position represented by the first coordinate value and a second coordinate value.

In one embodiment, in order to detect touching or approximating event inside the covered area, the processor module is further configured to execute instruction for implementing following steps: having the driving circuit module simultaneously drive the first electrodes inside the covered area; having the sensing circuit module sense the first electrodes and the second electrodes inside the covered area for generating multiple first sensing values and multiple second sensing values, respectively; determining at least one first coordinate value according to the multiple first sensing values; determining at least one second coordinate value according to the multiple second sensing values; and determining there exists one second touching or approximating event located at a position represented by the first coordinate value and a second coordinate value.

In one embodiment, in order to detect touching or approximating event inside the covered area, the processor module is further configured to execute instruction for implementing following steps: having the driving circuit module simultaneously drive the first electrodes inside the covered area and having the sensing circuit module sense the first electrodes inside the covered area for generating multiple first sensing values; determining at least one first coordinate value according to the multiple first sensing values; having the driving circuit module simultaneously drive the second electrodes inside the covered area and having the sensing circuit module sense the second electrodes inside the covered area for generating multiple second sensing values; determining at least one second coordinate value according to the multiple second sensing values; and determining there exists one second touching or approximating event located at a position represented by the first coordinate value and a second coordinate value.

According to one embodiment, the present application provides a touch sensitive processing method for detecting whether a touch panel is partially submerged in conductive liquid, wherein the touch panel comprises multiple parallel first electrodes and multiple parallel second electrodes, comprising: detecting a liquid surface line and a covered area of the touch panel, below the liquid surface line, which is covered by the conductive liquid; detecting first touching or approximating event in the covered area; when zero or three first touching or approximating events are detected, reporting no first touching or approximating event to a host; and when one first touching or approximating event is detected, reporting the first touching or approximating event to the host.

In one embodiment, in order to report touching or approximating events above the liquid surface line, the method further comprises: driving one of the first electrodes and sensing the second electrodes, iteratively, for generating multiple one-dimensional sensing information; forming two-dimensional sensing information according to the multiple one-dimensional sensing information; calculating one or more second touching or approximating events according to the two-dimensional sensing information; reporting the one or more second touching or approximating events which are outside the covered area to the host.

In one embodiment, in order to report an rectangle defined by two touching or approximating events below the liquid surface line, the method further comprises: when two first touching or approximating events are detected in the covered zone, forming a rectangle with four vertices according to the two first touching or approximating events; and reporting the rectangle to the host.

In one embodiment, in order to report an rectangle defined by two touching or approximating events below the liquid surface line, the method further comprises: when two first touching or approximating events are detected in the covered zone, forming a rectangle with four vertices according to the two first touching or approximating events; and when the four vertices are inside the covered area, reporting the rectangle to the host.

In one embodiment, in order to distinguish two touching or approximating events from the rectangle, the four vertices of the rectangle sequentially includes a first vertex, a second vertex, a third vertex and a fourth vertex, the method further comprises: driving one of the first electrodes and sensing the second electrodes, iteratively, for generating multiple one-dimensional sensing information; forming two-dimensional sensing information according to the multiple one-dimensional sensing information; calculating one or more second touching or approximating events according to the two-dimensional sensing information; when the first vertex is not inside the covered area, determining whether the vertex is corresponding to one of the second touching or approximating events; when the first vertex is corresponding to one of the second touching or approximating events, reporting the third vertex as a first touching or approximating event to the host; and when the first vertex is not corresponding to one of the second touching or approximating events, reporting the two vertex and the fourth vertex as the first touching or approximating events to the host.

In one embodiment, in order to detect touching or approximating event inside the covered area, the method further comprises: simultaneously driving the first electrodes inside the covered area and sensing the second electrodes inside the covered area for generating multiple second sensing values; determining at least one second coordinate value according to the multiple second sensing values; simultaneously driving the second electrodes inside the covered area and sensing the first electrodes inside the covered area for generating multiple first sensing values; determining at least one first coordinate value according to the multiple first sensing values; and determining there exists one second touching or approximating event located at a position represented by the first coordinate value and a second coordinate value.

In one embodiment, in order to detect touching or approximating event inside the covered area, the method further comprises: simultaneously driving the first electrodes inside the covered area; sensing the first electrodes and the second electrodes inside the covered area for generating multiple first sensing values and multiple second sensing values, respectively; determining at least one first coordinate value according to the multiple first sensing values; determining at least one second coordinate value according to the multiple second sensing values; and determining there exists one second touching or approximating event located at a position represented by the first coordinate value and a second coordinate value.

In one embodiment, in order to detect touching or approximating event inside the covered area, the method further comprises: simultaneously driving the first electrodes inside the covered area and sensing the first electrodes inside the covered area for generating multiple first sensing values; determining at least one first coordinate value according to the multiple first sensing values; simultaneously driving the second electrodes inside the covered area and sensing the second electrodes inside the covered area for generating multiple second sensing values; determining at least one second coordinate value according to the multiple second sensing values; and determining there exists one second touching or approximating event located at a position represented by the first coordinate value and a second coordinate value.

According to one embodiment, the present application provides a touch system for detecting whether a touch panel is partially submerged in conductive liquid, comprising: the touch panel; and a touch sensitive processing apparatus, comprising: a driving circuit module; a sensing circuit module; an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: detecting a liquid surface line, by the driving circuit module, the sensing circuit module and the interconnection network module, and a covered area of the touch panel, below the liquid surface line, which is covered by the conductive liquid; detecting first touching or approximating event in the covered area; when zero or three first touching or approximating events are detected, reporting no first touching or approximating event to a host; and when one first touching or approximating event is detected, reporting the first touching or approximating event to the host.

In one embodiment, the touch system further comprises the host.

BRIEF DESCRIPTION OF THE DRAWINGS

The advantages and spirit related to the present invention can be further understood via the following detailed description and drawings.

FIG. 11 is a diagram illustrates a sensing image of mutual capacitance sensing between perpendicular electrodes according to one embodiment of the present invention.

DETAILED DESCRIPTION OF THE PREFERRED EMBODIMENT

Figure 1:
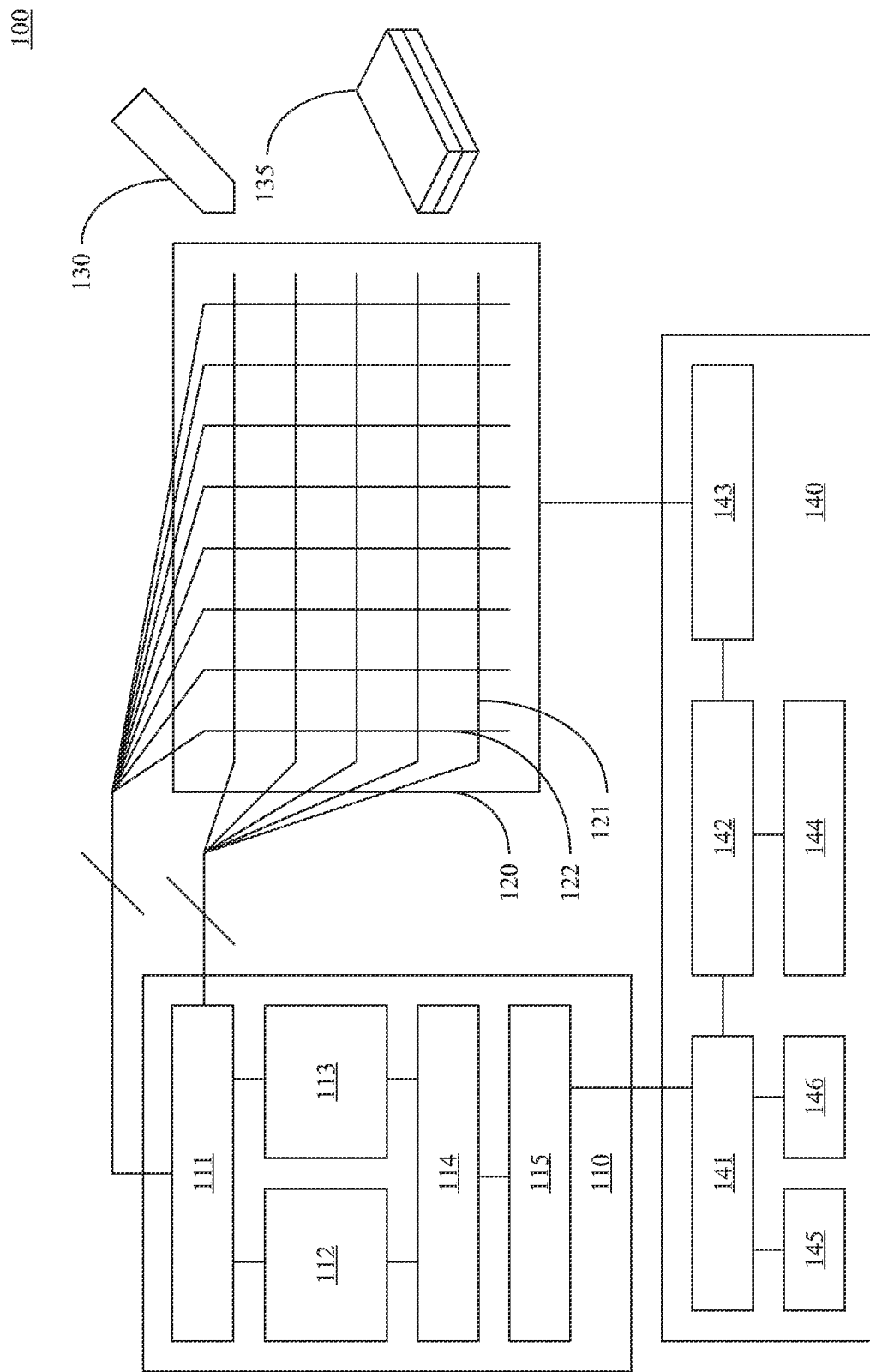
FIG. 1 is a block diagram depicts a touch system according to one embodiment of the present invention.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

Please refer to FIG. 1, which is a block diagram depicts a touch system 100 according to one embodiment of the present invention. The touch system 100 may be a computer system such as desktop, laptop, tablet, industrial control computer, smartphone or any other computer systems including touch sensitive functions.

The touch system 100 may include a touch sensitive processing apparatus 110, a touch panel or screen 120 coupled to the touch sensitive processing apparatus 110 and a host 140 coupled to the touch sensitive processing apparatus 110. The touch system may further include one or more styli 130 and or touch electronic board erasers 135. Hereinafter in this application, the touch panel or screen 120 is collectively being referred as the touch screen 120. However, in the embodiments which are lack of display function, person having ordinary skill in the art can understand the "touch screen" is referring to the touch panel. The touch screen 120 may include a plurality of first electrodes 121 in parallel to a first axis and a plurality of second electrodes 122 in parallel to a second axis. The first electrode 121 intersects with the plurality of second electrodes 122 for forming multiple sensing points or areas. Similarly, the second electrode 122 intersects with the plurality of first electrodes 121 for forming multiple sensing points or areas. In some embodiments, the present application may refer to the first electrodes 121 as the first touch electrodes 121, and the second electrodes 122 as the second touch electrodes 122. The first and the second electrodes are collectively being referred as touch electrodes. In some embodiments of the touch screen 120, the first electrodes 121 and the second electrodes 122 are made by transparent materials such as indium tin oxide (ITO) or nanometer carbon tubes. The first electrodes 121 and the second electrodes 122 may be arranged in one electrode layer. Multiple conductor plates of one of the first electrodes 121 or the second electrodes are connected by bridging. The first electrodes 121 and the second electrodes 122 may be arranged in two adjacent electrode layers. Unless further elaborated, the present application is able to be applied to single-layered or multi-layered embodiments. The first axis is usually perpendicular to the second axis. However, the present application does not limit that the first axis must be perpendicular to the second axis. In one embodiment, the first axis may be a horizontal axis or a refresh line axis of the touch screen 120.

Simplified speaking, the touch panel or screen 120 in this application is a base plate with a sensing layer structure. Its control apparatus may use the sensing layer structure to detect at least one external conducting object touching or approximating the base plate. The sensing layer structure may include one or more layers. A touching or approximating object is referred to an external conducting object touching or approximating the touch panel or screen.

The external conducting object in this application may be a part of human body, such as a finger or a palm. It may be an object touched by human body, such as a passive stylus or an active stylus which actively transmits signals for the touch panel to detect its position. It may be a grounded test object such as a bronze cylinder. The touching or approximating event is an event detected by the touch panel or screen where the external conducting object touching or approximating the touch panel or screen. The event related information may include a position on the touch panel or screen, a range, a signal strength, touching or approximating, etc.

The touch sensitive processing apparatus 110 may include following hardware circuit modules: an interconnection network module 111, a driving circuit module 112, a sensing circuit module 113, a processor module 114 and an interface module 115. The touch sensitive processing apparatus may be implemented inside a single IC (integrated circuit) which may include one or more dies. It may be alternatively implemented by multiple ICs and an interconnection board of the multiple ICs. The touch sensitive processing apparatus 110 may be implemented in the same IC with the host 140. Or the touch sensitive processing apparatus 110 and the host 140 may be resided in the same die. In other words, the present invention does not limit how the touch sensitive processing apparatus 110 implements.

The interconnection network module 111 is configured to connect the first and the second electrodes 121 and 122 of the touch screen 120, respectively. Upon receiving control command of the processor module 114, the interconnection network module 111 is configured to connect the driving circuit module 112 to any one or more touch electrodes or to connect the sensing circuit module 113 to any one or more touch electrodes. The interconnection network module 111 may include a combination of one or more multiplexers to fulfill the aforementioned functions.

The driving circuit module 112 may comprise clock generator, frequency divider, frequency multiplier, phase lock loop, power amplifier, DC-DC voltage converter, regulator and/or filter, which is configured to provide driving signal to any one or more touch electrodes via the interconnection network module 111 according to control commands of the processor module 114. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 112 may include one or more channel. Each channel may be connected to any one or more touch electrodes via the interconnection network module 111.

The sensing circuit module 113 may comprise clock generator, frequency divider, frequency multiplier, phase lock loop, power amplifier, DC-DC voltage converter, regulator and/or filter, which is configured to sense on any one or more touch electrodes via the interconnection network module 111 according to control commands of the processor module 114. When the touch signal is transmitted from one of the touch electrodes, another touch electrode may induce the touch signal. And the sensing circuit module 130 may demodulate the induced touch signal by the another touch electrode in accordance with the modulation method performed on the driving signal by the driving circuit module 112 in order to restore the messages carried by the driving signal. The sensing circuit module 113 may include one or more channels. Each channel may be connected to any one or more touch electrodes via the interconnection network module 111. In the same time, each channel may simultaneously perform sensing and demodulation.

In one embodiment, the driving circuit module 112 and the sensing circuit module 113 may include analog front-end (AFE) circuits. In another embodiment, in additional to the AFE circuits, the driving circuit module 112 and the sensing circuit module 113 may include digital back-end (DBE) circuits. If the driving circuit module 112 and the sensing circuit module 113 include only the AFE circuits, the DBE circuits may be implemented in the processor module 114.

The processor module 114 may include a digital signal processor for connecting the AFE circuits or the DBE circuits of the driving circuit module 112 and the sensing circuit module 113, respectively. The processor module 114 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 111, the driving circuit module 112, the sensing circuit module 113 and the interface module 115 of the touch sensitive processing apparatus 110. For examples, the processor module 114 may comprises processors widely adopted in the industry such as 8051 series, Intel i960 series, ARM Cortex-M series and etc. The present application does not limit types and numbers of processors included in the processor module 114.

The instructions and data may be used to implement each of steps mentioned in the present application and flows and methods constructed by the steps. Some instructions may be executed independently inside the processor module 114, for examples, arithmetic and log operation instructions. Other instructions may be used to control other modules of the touch sensitive processing apparatus 110. These instructions may include input/output interfaces of the processor module 114 to control other modules. Other modules may provide information via the input/output interface of the processor module 114 to the OS and/or application programs executed by the processor module 114. Persons having ordinary skill in the art should have common knowledge of computer organization and architecture which enabling them to understand that the flows and methods provided by the present application can be realized by the modules and the instructions.

The interface module 115 may include kinds of serial or parallel bus, such as universal serial bus (USB), I²C, peripheral component interconnect (PCI), PCI-Express, IEEE 1394 and other industrial standard input/output interface. The touch sensitive processing apparatus 110 connects to the host 140 via the interface module 115.

The driving electrode in this application refers to the touch electrode which is connected to the driving circuit module 112. The sensing electrode in this application refers to the touch electrode which is connected to the sensing circuit module 113. The touch electrode may be one of the first electrodes 121 or the second electrodes 121.

The one-dimensional sensing information in this application may refer to multiple sensing data corresponding to the first axis or the second axis. It may refer to a set of signal values corresponding to m sensing points at intersections of a single sensing electrode and m driving electrodes. It may refer to a set of signal values corresponding to n sensing points at intersections of a single driving electrode and n sensing electrodes. In other words, one-dimensional sensing information may include signal values corresponding to m sensing points or n sensing points. The one-dimensional sensing information may include difference values or dual difference values of the m/n sensing points.

The two-dimensional sensing information in this application may refer to a combination of multiple one-dimensional sensing information or an image. The two-dimensional sensing information is arranged according to positions corresponding to the multiple one-dimensional sensing information.

The signal value may be a value which is directly measured at the sensing electrode, or a value restored from difference values or dual difference values. These two kinds of signal value may be different, however, they may be interchangeable or equivalent in some embodiments.

The difference value may be a difference of signal values of adjacent sensing points. The dual difference value may be a difference of adjacent difference values. The sensing circuit module 113 may be configured to output the signal values, the difference values or the dual difference values to the processor module 114.

The line piece (LPC) in this application may refer to a whole or a continuous part of one-dimensional sensing information. The line piece group may refer to multiple line pieces of multiple adjacent one-dimensional sensing information, where one of two adjacent line pieces include a sensing point which is a neighbor of another sensing point of the another one of the two adjacent line pieces.

The ghost point may be a point or an area which occurs undesired capacitance sensing.

The touch system 100 may comprise one or more styli 130 and/or touch erasers 135. The stylus 130 and touch eraser 136 may be transmitters which emit electrical signals. The transmitters may include active transmitter which actively emits electrical signals or passive transmitter which emits electrical signals in response to outside electrical signals.

The stylus 130 and touch eraser 136 may comprise one or more electrodes which is configured to receive electrical signals from the touch screen synchronously or asynchronously, or to transmit electrical signals to the touch screen synchronously or asynchronously. The electrical signals may be modulated according to one or more of the aforementioned modulation methods.

The stylus 130 or touch eraser 135 may be conductor which is configured to transmit driving signals or to be grounded via user's hand or body. The stylus 130 or touch eraser 135 may be wired or wirelessly connected to an I/O interface module 141 of the host 140 or any other underlying modules of the I/O interface module 141.

The touch sensitive processing apparatus 110 may detect one or more external conductive objects such as fingers, palms or passive styli 130 or touch erasers 135 or styli 130 or touch erasers 135 emitting electrical signals via the touch screen 120. The touch sensitive processing apparatus 110 may utilize mutual-capacitance or self-capacitance principles to detect external conductive objects. The styli 130 or touch erasers 135 and touch sensitive processing apparatus 110 may use the aforementioned modulation and demodulation methods to transmit message via the electrical signals. The touch sensitive processing apparatus 110 may detect one or more positions where the stylus 130 or touch erasers 135 touches or approximates the touch screen 120, status or sensors (pressure sensor or button) onboard the stylus 130 or touch eraser 135, orientation angle or inclination angle of the stylus 130 or touch erasers 135 with respect to the touch screen 120 and etc. according to the electrical signals.

The host 140 is a main apparatus for controlling the touch system 100. It may comprises an input/output interface module 141 for connecting the interface module 115, a central processing unit (CPU) module 142, a graphics processor module 143, a memory module 144 connects to the CPU module 142, a network interface module 145 and a storage module 146 connect to the input/output interface module 141.

The storage module 146 comprises non-volatile memory. Common examples are hard disks, electronic erasable rewritable read only memory (EEPROM), or flash memory. The storage module 146 may store normal operating system and application programs executable under the operating system. The network interface module 145 may comprise wired or wireless hardware network interface. The network interface module 145 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 142 may directly or indirectly connects to the input/output interface module 141, the graphics processor module 143, the memory module 144, the network interface module 145 and one storage module 146. The CPU module 142 may comprises one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 142 is able to control other modules of the touch system 100.

The optional graphics processor module 143 is usually configured to handle computations with respect to graphics outputs. The graphics processor module 143 may connect to the touch screen 120 for controlling outputs of the touch screen 120. In some applications, the host 140 may have the CPU module 142 execute the computations with respect to graphics outputs, without dedicated handling of the graphics processor module 143.

Figure 2:
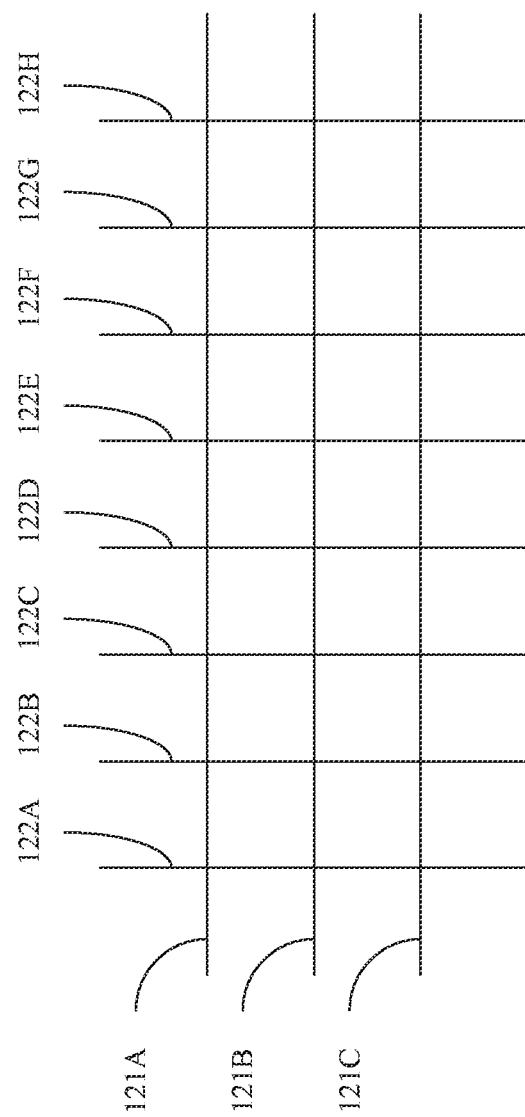
FIG. 2 is a diagram shows a touch screen according to one embodiment of the present invention.

Please refer to FIG. 2, which shows a diagram of a touch screen according to an embodiment of the present application. For convenience, the touch screen 120 includes only three first electrodes 121. In a sequence, they are first electrodes 121A, 121B and 121C, respectively. The touch screen 120 comprises multiple second electrodes 122A-122H.

In traditional mutual-capacitance detection, the driving circuit module 112 would provide driving signals to one of the three first electrodes 121 in a time-sharing manner in order to gather three sets of one-dimension sensing information. Each set of one-dimension sensing information includes sensing results of each of the second electrodes 122. A two-dimension sensing information or a sensing image can be constructed according to the three sets of one-dimension sensing information and the driving signal transmission sequence with regard to the first electrodes 121. The processor module 114 is able to detect whether an external conductive object touches or approximates the touch screen 120 according to the two-dimension sensing information or the sensing image.

Figure 3:
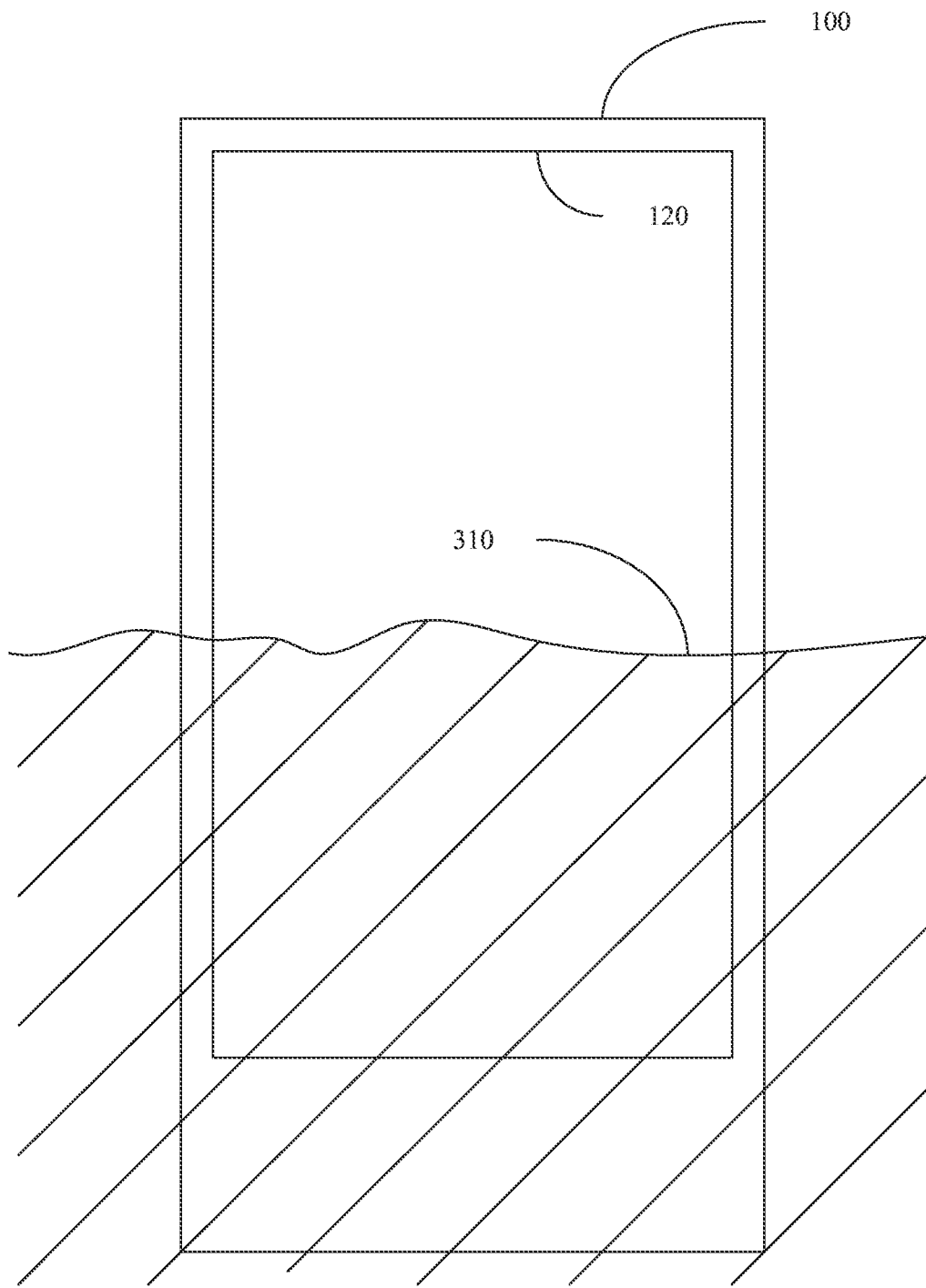
FIGS. 3 and 4 are diagrams illustrate touch systems according to embodiments of the present invention partially submerged into conductive liquid.
Figure 4:
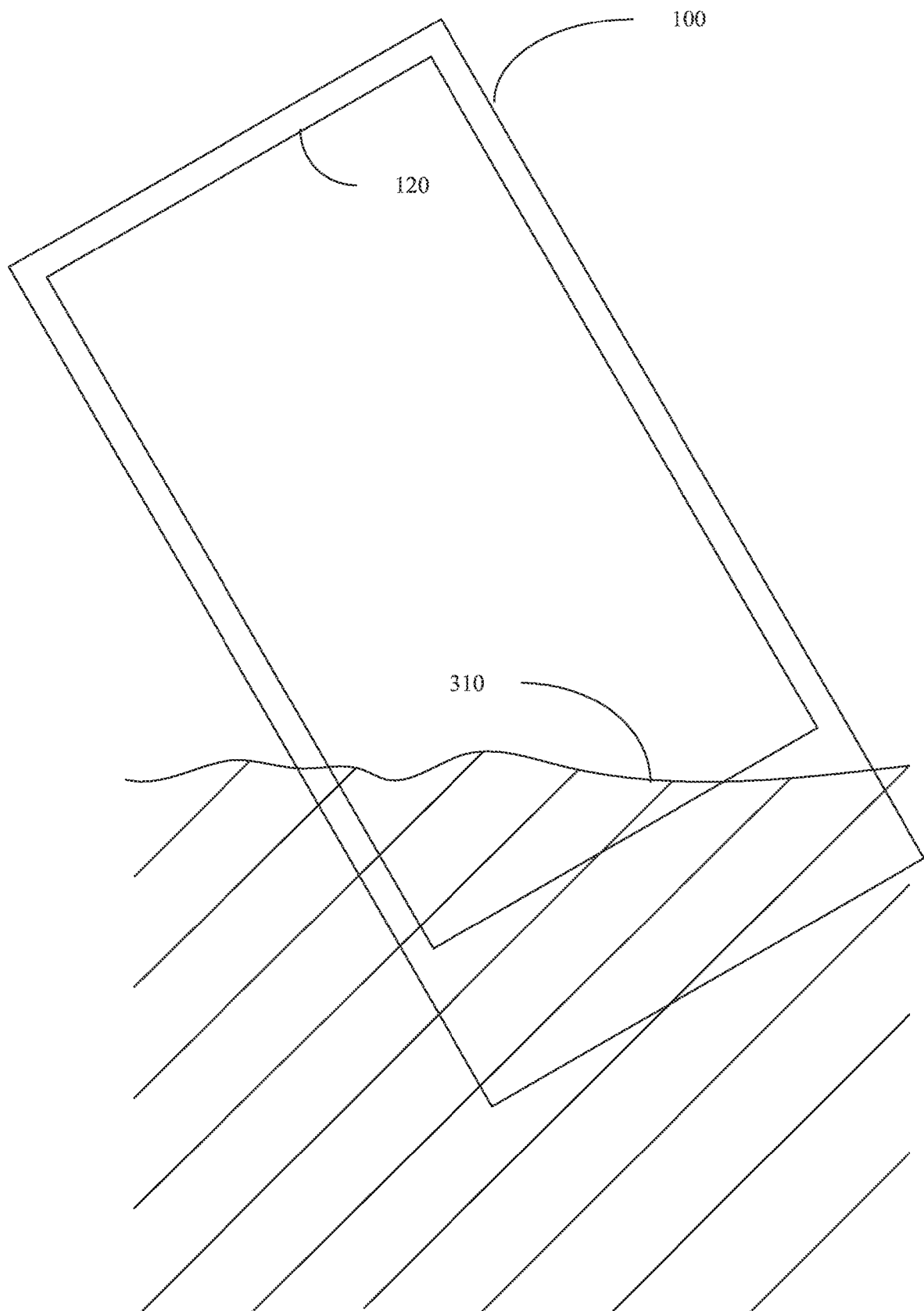

Please refer to FIGS. 3 and 4, which are diagrams illustrate touch systems according to embodiments of the present invention partially submerged into conductive liquid. Although most of the electronic systems have only one touch screen 120. However, the touch system 100 according to embodiments of the present invention may have two or more touch panel or screen 120. In other words, the present application is applicable to any electronic system having at least one touch panel or screen 120 which is submerged into conductive liquid. In addition, the touch panel or screen 120 mentioned in the present application may be flat or curvy. In addition to traditional rigid base plate, the touch panel or screen 120 may be built on flexible base plate. The conductive liquid may be water, sea water, salty water or any liquid with conductivity coefficient greater than a threshold.

In the embodiments as shown in FIGS. 3 and 4, the touch system 100 is partially submerged in conductive liquid. A surface separating the conductive liquid from other media is called the liquid surface 310. The touch screen 120 may be partially submerged in the conductive liquid vertically or in other angle. At least a part of the touch screen 120 is above the liquid surface.

The difference between the embodiments as shown in FIGS. 3 and 4 is that the liquid surface intersects with two opposite edges of the touch screen 120 in the embodiment as shown in FIG. 3. In the embodiment as shown in FIG. 4, the liquid surface intersects with two adjacent edges of the touch screen 120. In other words, at least one of the first electrodes 121 or the second electrodes 122 is totally submerged under the liquid surface in the embodiment as shown in FIG. 3. However, in the embodiment as shown in FIG. 4, no first electrodes 121 or second electrodes 122 is entirely submerged in the conductive liquid.

One of the purposes provided by the present application is to detect the liquid surface 310 by the touch screen 120. Since the design of the touch system 100 is fixed, assuming that the touch system includes gyroscope, accelerometer, gravity scale, or instruments for detecting attitude. After the liquid surface 310 is detected, the CPU 142 of the touch system 100 is able to detect whether a physical interface, an antenna or a sensing subsystem is above or below the liquid surface 310 according to the liquid surface 310 and the attitude.

Figure 5:
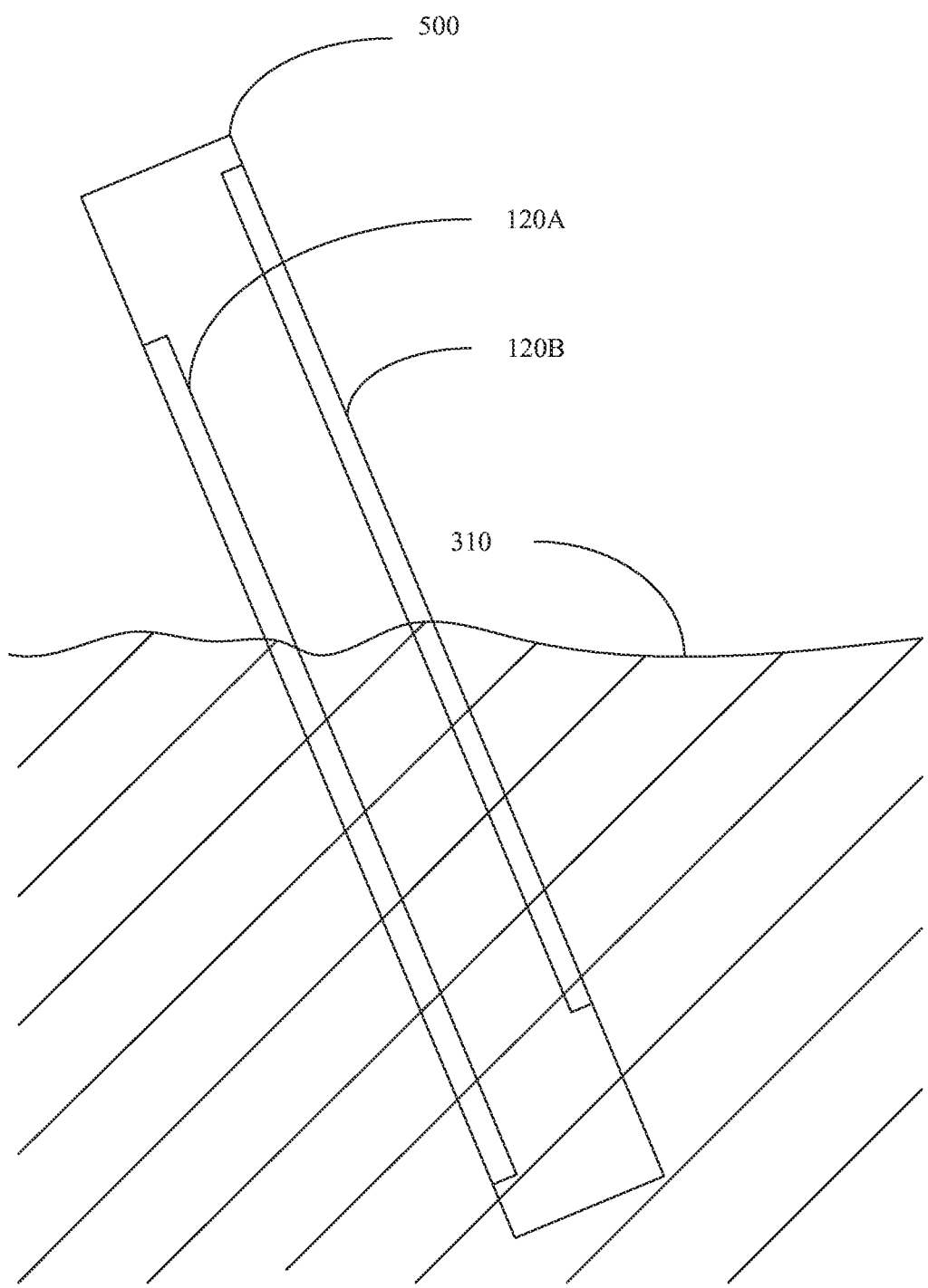
FIG. 5 is a diagram depicts a touch system according to an embodiment of the present invention partially submerged into conductive liquid.

Please refer to FIG. 5, which is a diagram depicts a touch system according to an embodiment of the present invention partially submerged into conductive liquid. The touch system 500 may include two touch screens 120A and 120B which are placed at two opposite surfaces of the touch system 500. The sizes of these two touch screens 120A and 120B may be different. Their positions at these two opposite surfaces may be different, too. In one embodiment, the touch system 500 may comprise a touch screen 120A and a touch panel 120B. When the touch system 500 detects where the liquid surface are at the two touch screens 120A and 120B, the touch system 500 may determine its attitude according to the relative positions of the two touch screens 120A and 120B and may finds out whether the physical interfaces, the antennas or sensing subsystems are above or below the liquid surface 310.

In following paragraphs, we explain how to use capacitance sensing methods for detecting where the liquid surface is at the touch panel or screen which is partially submerged in the conductive liquid. Please refer to FIG. 6, which is a diagram shows multiple first electrodes and multiple second electrodes included in a touch system 100 according to an embodiment of the present invention.

Figure 6:
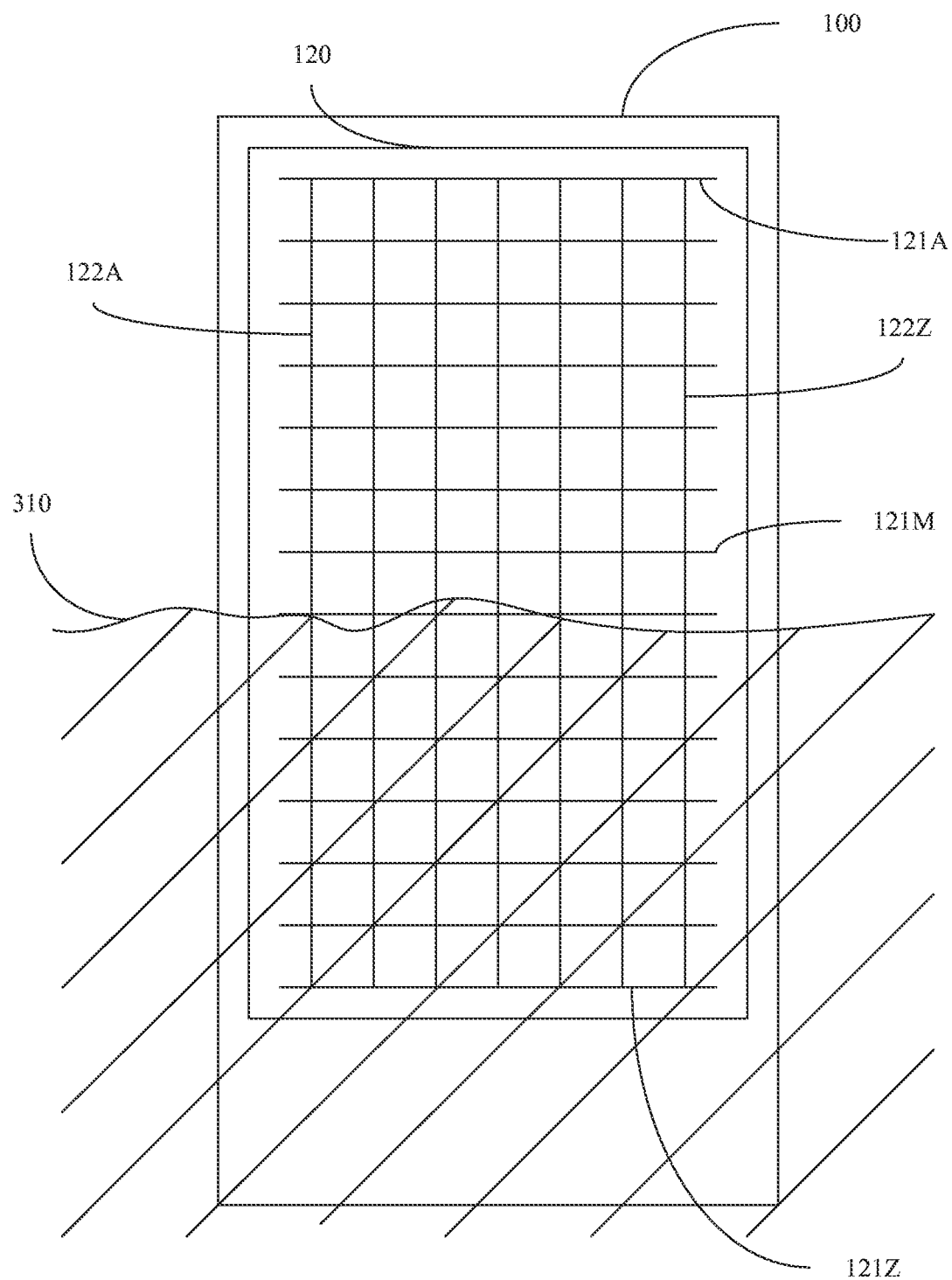
FIG. 6 is a diagram shows multiple first electrodes and multiple second electrodes included in a touch system according to an embodiment of the present invention.
Figure 7:
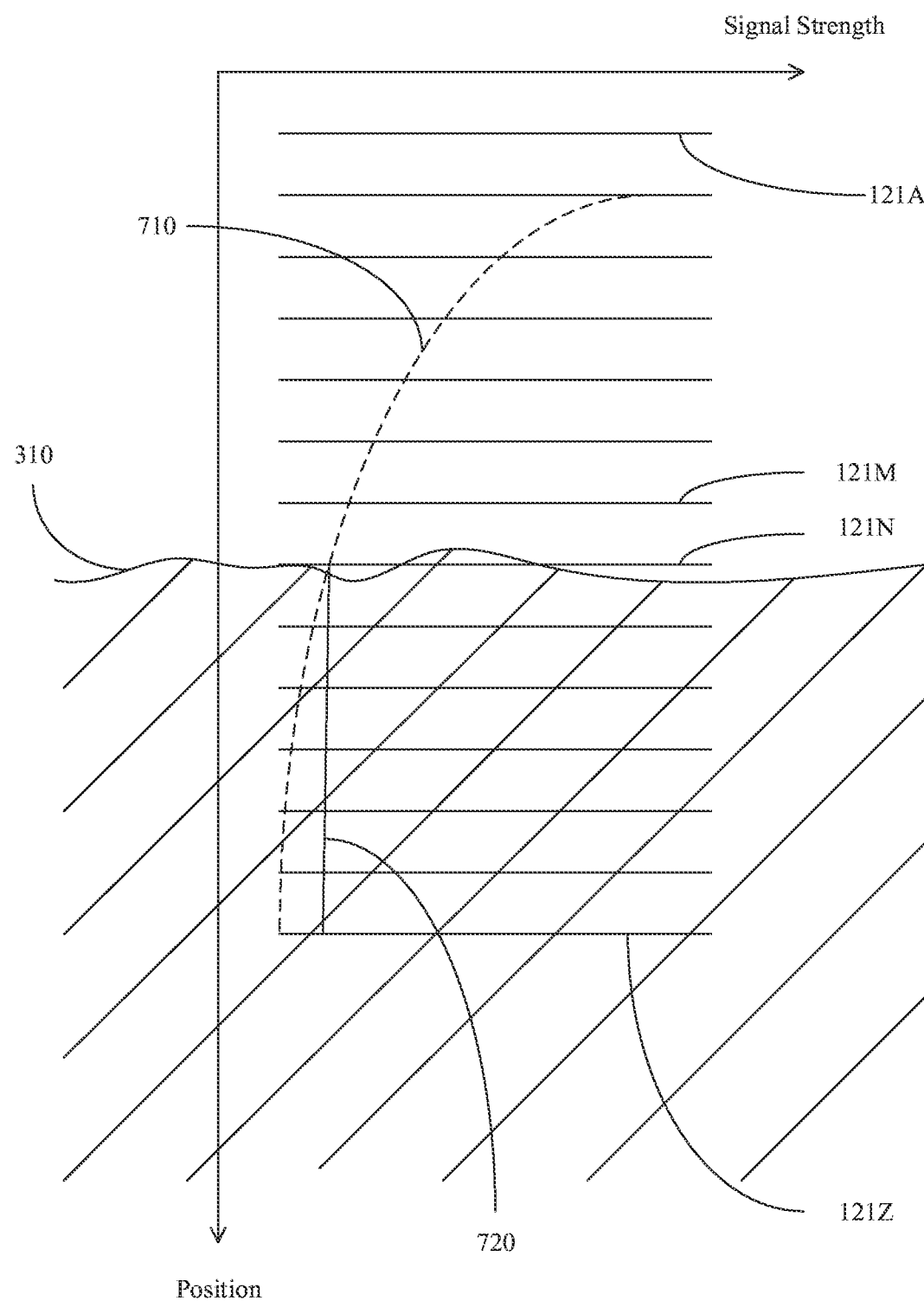
FIG. 7 is a diagram illustrates one-dimensional sensing information gathered in the embodiment as shown in FIG. 6.

Please refer to FIG. 7, which is a diagram illustrates one-dimensional sensing information gathered in the embodiment as shown in FIG. 6. The horizontal axis as shown in FIG. 7 represents magnitude of signal strength. The vertical axis represents positions of the first electrodes 121. The touch sensitive processing apparatus 110 commands the driving circuit module 112 to transmit driving signals to the most upper one of the first electrodes 121A and commands the sensing circuit module 113 to sense the rest of the first electrodes 121. The generated one-dimensional sensing information above the liquid surface is a quadratic curve. The generated one-dimensional sensing information below the liquid surface is likely a straight line. The processor module 114 of the touch sensitive processing may find out that the one-dimensional sensing information below the first electrode 121M is likely a straight line. Thus, it may determine that the liquid surface 310 is in between two adjacent first electrodes 121M and 121N.

As shown in FIG. 7, the signal values corresponding to the first electrode 121N through the last one of the first electrodes 121Z cannot form a quadratic curve. An absolute value of a difference between their maximum value and minimum value is less than a threshold. The processor module 114 may determine which of the first electrodes 121 are entirely or partially submerged in the conductive liquid according to one or two of the abovementioned characteristics. Since the first electrode 121N is closest to the first one of the first electrodes 121A, the processor module 114 may determine that at least a part of the first electrode 121N is submerged below the liquid surface 310.

Figure 8:
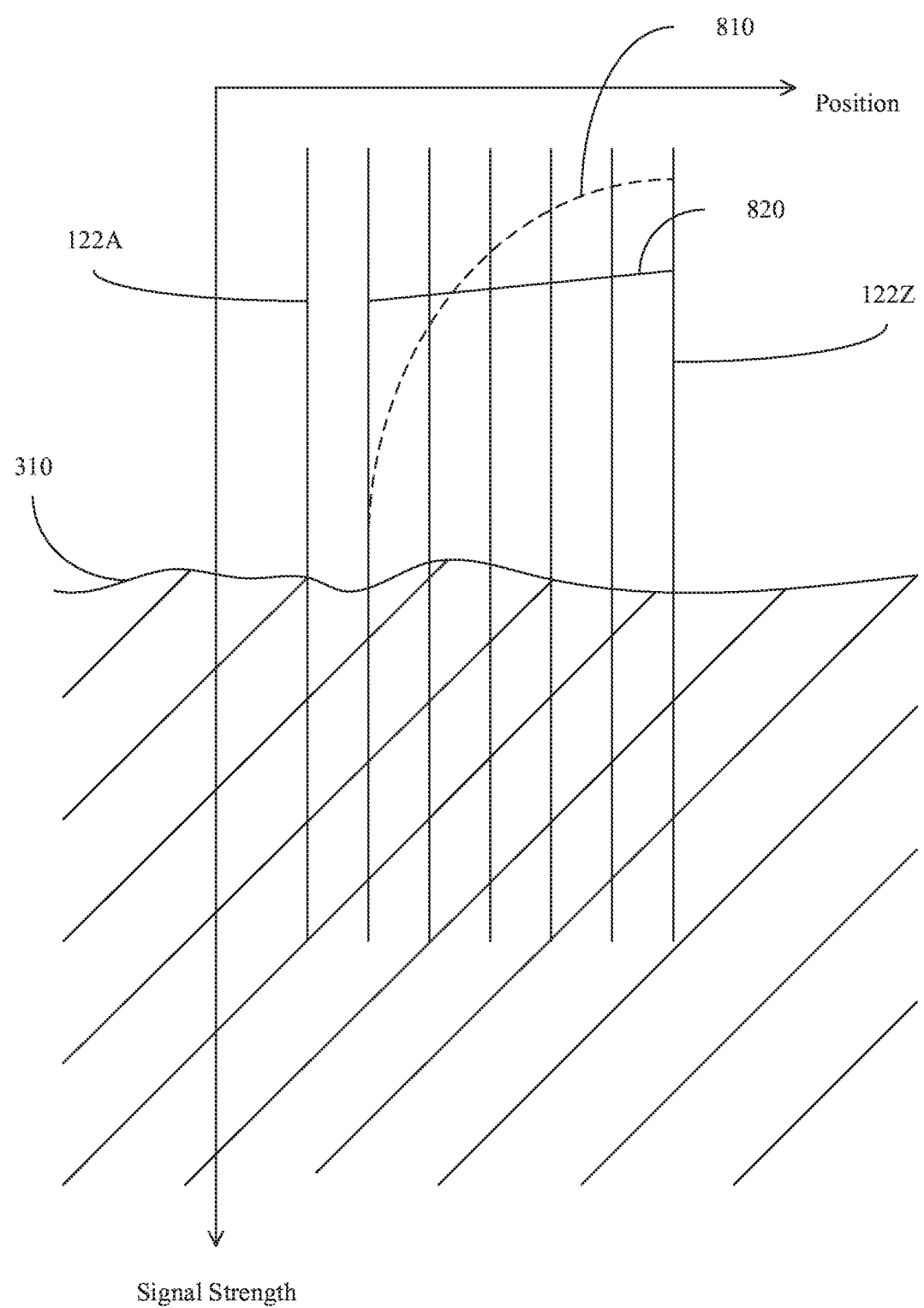
FIG. 8 is a diagram illustrates one-dimensional sensing information gathered in the embodiment as shown in FIG. 6.

Please refer to FIG. 8, which is a diagram illustrates one-dimensional sensing information gathered in the embodiment as shown in FIG. 6. The vertical axis as shown in FIG. 8 represents magnitude of signal strength. The horizontal axis represents positions of the second electrodes 122. The touch sensitive processing apparatus 110 commands the driving circuit module 112 to transmit driving signals to the most left one of the second electrodes 122A and commands the sensing circuit module 113 to sense the rest of the second electrodes 122. The generated one-dimensional sensing information above the liquid surface is a straight line 820. If the touch screen 120 is in the air, the generated one-dimensional sensing information should form a quadratic curve 810.

As shown in FIG. 8, the signal values corresponding to the first one of the second electrodes 122A through the last one of the second electrodes 122Z cannot form a quadratic curve where an absolute value of a difference between their maximum value and their minimum value is less than another threshold. The processor module 114 may determine which of the second electrodes 122 are entirely or partially submerged in the conductive liquid according to one or two of the abovementioned characteristics. In the embodiment as shown in FIG. 8, the processor module 114 may determine that every one of the second electrodes is at least partially submerged below the liquid surface 310 according to the line 820. In other words, every one of the second electrodes intersects with the liquid surface 310. The processor module 114 may determine that the liquid surface 310 intersects with two opposite edges in parallel to the second electrodes 122.

In the embodiments as shown in FIG. 6 through FIG. 8, it may determine that the area of the touch screen 120 corresponding to the first electrodes 121A-121M is not submerged in the conductive liquid according to the one-dimensional sensing information as shown in FIG. 7. It may also determine that every one of the second electrodes 122A-122Z is at least partially submerged in the conductive liquid according to the one-dimensional sensing information as shown in FIG. 8. Hence, after receiving the information from the touch sensitive processing apparatus 110, the CPU module 142 of the touch system 100 may calculate where the liquid surface is at the touch screen 120 according to attitude information from other sensors. Even without the attitude information from other sensors, the CPU module 142 may determine that the area of the touch screen 120 corresponding to the first electrodes 121A-121M is not submerged in the conductive liquid according to the information provided by the touch sensitive processing apparatus 110. Furthermore, it may assume that the first electrode 121M is a ceiling of the liquid surface 310.

Figure 9:
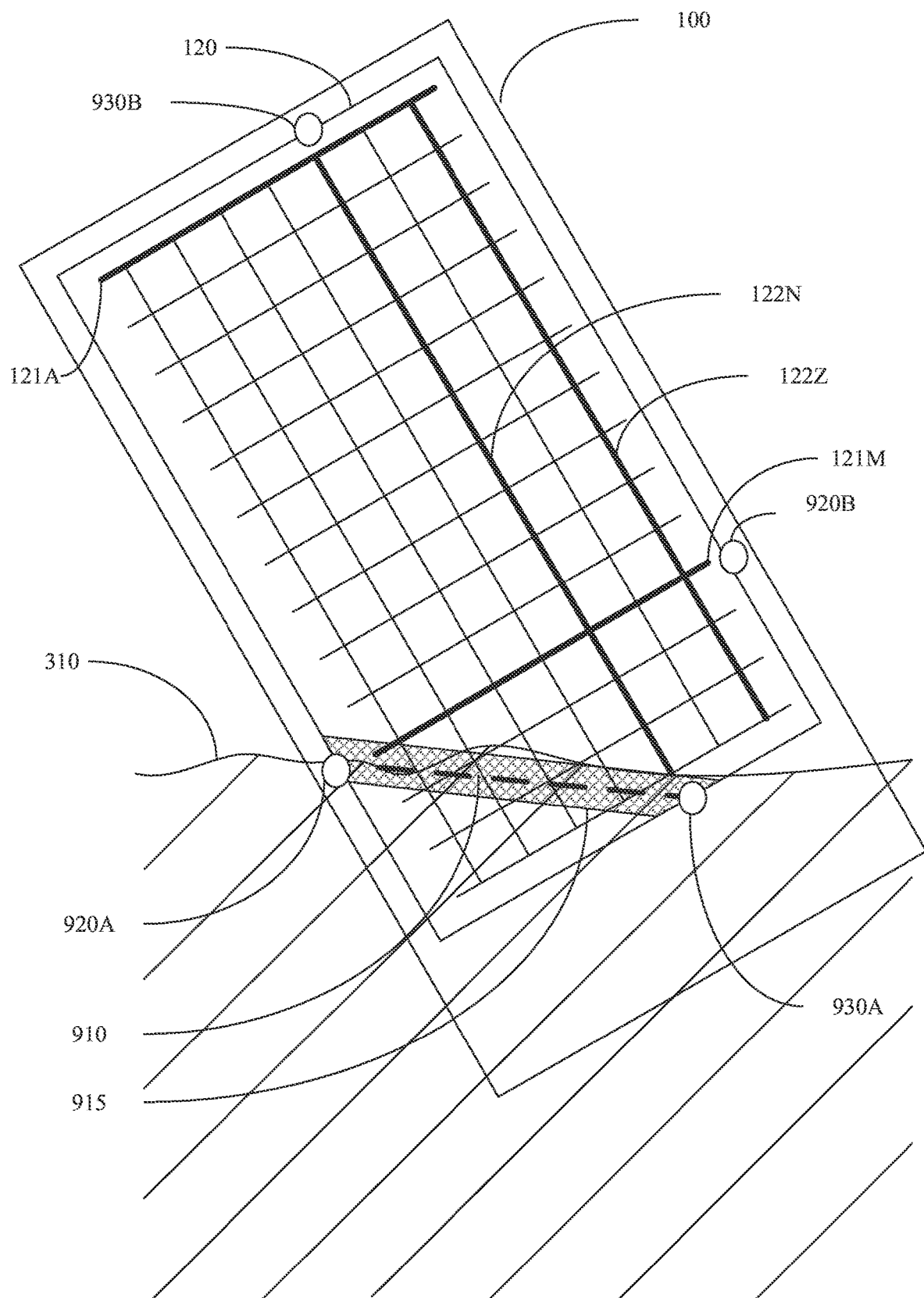
FIG. 9 is a diagram depicts un-submerged touch electrodes included in the embodiment as shown in FIG. 4.

Please refer to FIG. 9, which is a diagram depicts un-submerged touch electrodes included in the embodiment as shown in FIG. 4. In the embodiment as shown in FIG. 9, it may determine that the first electrodes 121A-121M are not submerged in the conductive liquid according to the sensing method as shown in FIG. 7. Furthermore, it may determine that the second electrodes 122N-122Z are not submerged in the conductive liquid according to the sensing method as shown in FIG. 8. The processor module 114 of the touch sensitive processing apparatus 110 may find out two boundary points 920A and 920B where the first electrode 121M, the lowest un-submerged first electrode, intersects with the two opposite edges of the touch screen 120. Because the boundary point 920B is near the un-submerged last one of the second electrodes 122Z, it is excluded. Similarly, the processor module 114 of the touch sensitive processing apparatus 110 may find out two boundary points 930A and 930B where the second electrode 122N, the lowest un-submerged second electrode, intersects with the two opposite edges of the touch screen 120. Because the boundary point 930B is near the un-submerged first one of the first electrodes 121A, it is also excluded. A line 910 between the left boundary points 920A and 930A may be viewed as the liquid surface 310 by the touch sensitive processing apparatus 110.

There are errors between the real liquid surface 310 and the line 910. Thus, a boundary zone 915 may be established according to the line 910 by the touch sensitive processing apparatus 110. The boundary zone 915 is configured to expand the line 910 because the real liquid surface 310 may be a dynamic wave surface. The area above the boundary zone 915 is assumed, by the touch sensitive processing apparatus 110, as a dry area which is not submerged in the conductive liquid. The boundary zone 915 may be an area where the line 910 shifts upward and downward vertically for a distance.

Figure 10A:
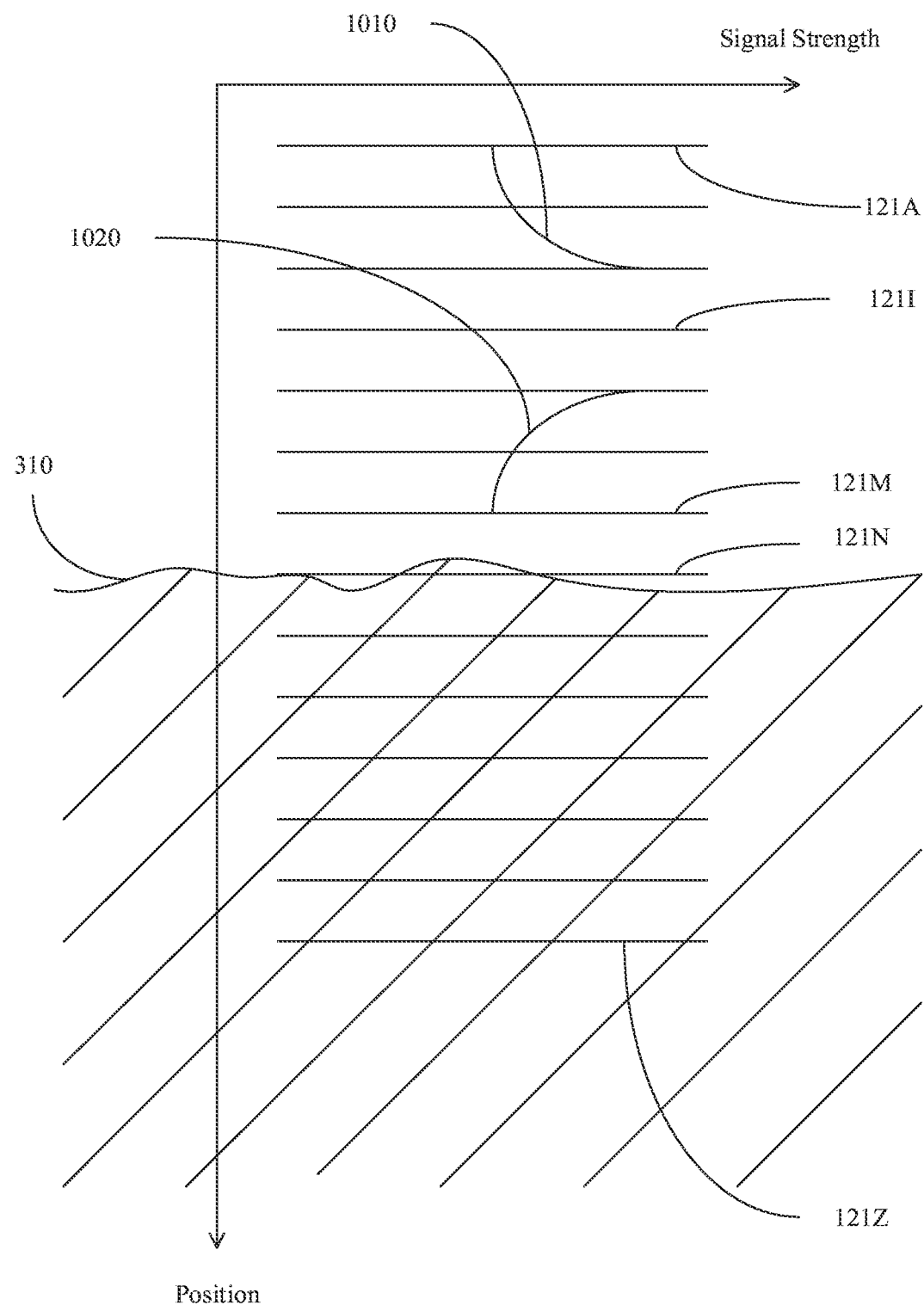
FIGS. 10A and 10B are diagrams show mutual capacitance sensing between parallel electrodes according to one embodiment of the present invention.
Figure 10B:
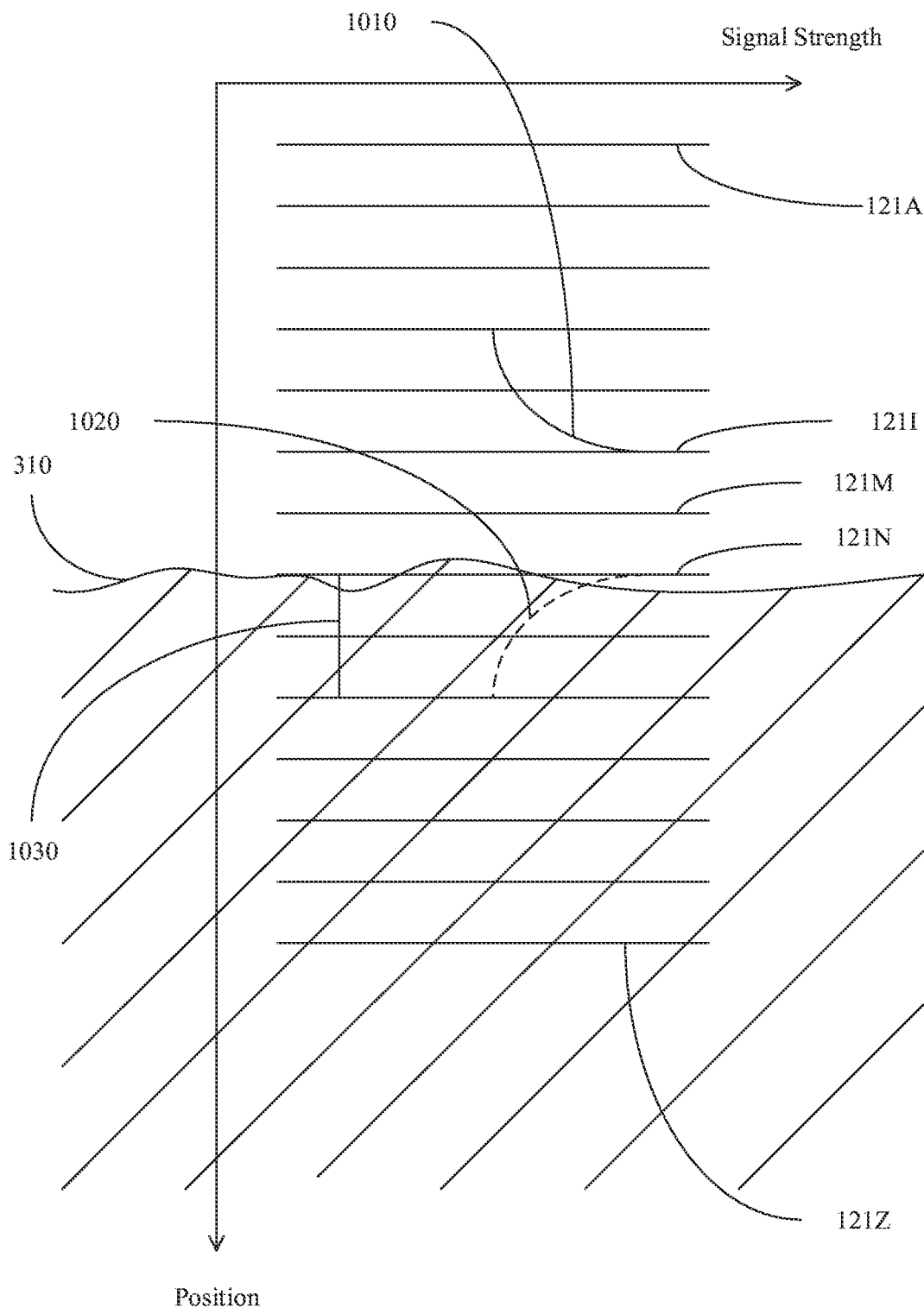

Please refer to FIGS. 10A and 10B, which are diagrams show mutual capacitance sensing between parallel electrodes according to one embodiment of the present invention. In the embodiment as shown in FIG. 7, the driving signal is transmitted from the first electrode which is closest to the boundary. Since capacitance is inversely proportional to the square of the distance, the signal values corresponding to the first electrodes including the last first electrode 121Z may form a quadratic curve which is quite close to a line. Hence, in the embodiments as shown in FIGS. 10A and 10B, only a part with a larger variation rate in the quadratic curve may be used in a single sensing step. The detection of liquid surface 310 may be performed by multiple sensing steps.

In one embodiment, sensing information are gathered from N of the first electrodes before and N of the first electrodes after the first electrode 121I which transmits the driving signal. At the beginning, the driving signal is transmitted from the (N+1)th first electrode 121. Meanwhile, sensing information are gathered from the first through the N-th first electrodes 121 and from the (N+2)th through the (2N+1)th first electrodes 121. In the embodiment as shown in FIG. 10A, N is set as 3. Therefore, at the beginning, the driving signal is transmitted from the fourth first electrode 121 and sensing information are gathered from the first through the third first electrodes 121 and from the fifth through the seventh first electrodes. The sensing information corresponding to the first through the third first electrodes 121 may form a first quadratic curve 1010. The sensing information corresponding to the fifth through the seventh first electrodes 121 may form a second quadratic curve 1020.

Already elaborated, it may determine whether the first electrodes are partially or entirely submerged in the conductive liquid according to whether these two pieces of one-dimensional sensing information can form two quadratic curves or whether an absolute value of a difference between their maximum value and their minimum value is larger than a threshold. In the embodiment as shown in FIG. 10A, the six first electrodes 121 being sensed are not submerged under the liquid surface 310. These two pieces of one-dimensional sensing information indeed can form two quadratic curves and their absolute value is larger than the threshold.

In the embodiment, the driving signal is firstly provided to the (N+1)th first electrode 121. However, in other embodiments, it may firstly provide the driving signals to the first electrode 121A. And the sensing is performed to the first electrodes 121 at one side of the first electrode 121A. Then the driving signal is provided to the (N+2)th first electrode 121 and the sensing is performed to the second through (N+1)th first electrodes and to the (N+3)th through the (2N+2)th first electrodes. Similarly, the mutual capacitance sensing between parallel electrodes is performed until the last one of the first electrodes 121Z or until the (N+1)th first electrode from the bottom is driven. Besides, the driving and the sensing may be performed every N+1 first electrode. For example, the second sensing step may be performed by providing the driving signal to the (2N+2)th first electrode in order to prevent duplicate sensing on the same first electrodes. Alternatively, the driving and the sensing may be performed every 2N+1 first electrode. In this case, the second sensing step may be performed by providing the driving signal to the (3N+2)th first electrode. In brief, the present application does not limit how many the driving and sensing step is performed.

In the embodiment as shown in FIG. 10B, the driving signal is transmitted from the first electrode 121M. Because the liquid surface 310 is around the first electrode 121N, the one-dimensional sensing information below forms a straight line 1030. Thus, the processor module 114 may determine that the liquid surface 310 is below the first electrode 121M which transmits the driving signal. In other words, the area corresponding to the first electrode 121A through 121M is not submerged into the conductive liquid.

In one embodiment, after the un-submerged area is determined, the processor module 114 may stop further sensing steps on parallel first electrodes. In another embodiment, the processor module 114 may command the first electrode 121N next to the first electrode 121M being driven, in order to make sure of that the first electrode 121N and those first electrodes below the first electrode 121N is submerged according to the two gathered one-dimensional sensing information.

In one embodiment, when the processor module 114 decides to drive the first electrode 121Z or the (N+1)th first electrode 121 from the bottom at first, it may determine this end of the touch screen is submerged in the conductive liquid. Next, the processor module 114 may continue to drive the first electrode 121A or the (N+1)th first electrode 121. If it is determined that the opposite end of the touch screen is also submerged in the conductive liquid, the processor module 114 may determine that the whole or most of the touch screen 120 is submerged into the conductive liquid.

In one embodiment, the processor module 114 may firstly perform the driving and parallel sensing steps on the first electrodes 121 for determining which of the neighboring first electrodes 121 are not submerged in the conductive liquid. Next, the processor module 114 may perform the driving and parallel sensing steps on the second electrodes 122 for determining which of the neighboring second electrodes 122 are not submerged in the conductive liquid. As described in the embodiment as shown in FIG. 9, four boundary points could be found out accordingly. And two upper boundary points are excluded subsequently. It may determine the line 910 defined by the two remained boundary points as the liquid surface. Or a boundary zone 915 is further determined by expanding the line 910.

The aforementioned sensing on parallel electrodes is performed by driving a touch electrode and sensing on other touch electrodes in parallel to the driven one. Subsequently, based on one or two gathered one-dimensional sensing information, the position of the liquid surface is determined. In following paragraphs, multiple one-dimensional sensing information are gathered by sensing on touch electrodes which are perpendicular to the driven touch electrode. A two-dimensional sensing information or a so-called sensing image could be collected according to the multiple one-dimensional sensing information. Subsequently, these multiple one-dimensional sensing information or the sensing image are used to determine whether the touch screen is partially submerged in the conductive liquid.

Please refer to FIG. 11, which is a diagram illustrates a sensing image of mutual capacitance sensing between perpendicular electrodes according to one embodiment of the present invention. There are multiple sensing values in this sensing image 1100. Absolute values of the sensing values can be classified into three classes 0, U, and A, where $0<U<A$. The sensing value may be one of the signal value, difference value or dual difference value. In other words, if the sensing value is larger than a first threshold, it is classified as A class.

In the middle of the sensing image 1100, there exists a boundary zone consisting of A-class sensing values. The sensing image is divided, by the boundary zone, into two sides. It is a classic phenomenon when the liquid surface cuts the touch screen. The boundary zone touches the upper edge and the lower edge of the sensing image as shown in FIG. 11. The sensing image is divided into a left side and a right side by the boundary zone. Most sensing values in the left side are classified into the lower 0-class, and most sensing values in the right side are classified into the higher U class. In other words, if a left-side average value and a right-side average value are calculated according to the left side and the right side of the boundary zone, respectively, the right-side average value is larger than the left-side average value. Hence, the processor module 114 may determine that the right side is below the liquid surface and the left side is above the liquid surface. With regard to several abnormalities of sensing values around the boundary zone, they may be caused by interferences or drops of conductive liquid staying on the touch screen.

The processor module 114 may determine a straight line 1110, as the liquid surface, along a ceiling of the boundary zone. Alternatively, the processor module 114 may determine a curve 1120, as the liquid surface, among the A-class sensing values or along the middle of the boundary zone.

Because it may not be possible to detect touching or approximating events according to the submerged part of the sensing image 1110, the processor module 114 may filter all touching or approximating events below the liquid surface out. That is the processor module 114 does not report any touching or approximating events below the liquid surface to the CPU module 142. However, it is still possible to detect touching or approximating events according to the un-submerged part of the sensing image 1110. For example, two touching or approximating events 1130 and 1140 could be found as shown in FIG. 11. The sensing values included in the touching and sensing events are classified as X-class. In other words, when an absolute value of the sensing values is larger than a second threshold, it is classified as X-class. The first threshold may or may not equal to the threshold. Anyway, the values in the X-class and A-class are always larger than the values classified in the 0-class.

In one embodiment, the boundary zone may be taken as one touching or approximating event. If a size of a touching or approximating event exceeds a threshold and the event contacts two edges of the touch screen, it may determine that the event is caused by the liquid surface. The boundary zone may contact two opposite edges, two adjacent edges or three adjacent edges. If the boundary zone can divide the sensing image 1110 into two sides, steps for calculating average values of sensing values of both sides can be proceed. Thus, the calculated average values can be used for determining which side is submerged in the conductive liquid. If the boundary zone contacts two or three adjacent edges of the touch screen and the boundary cannot divide the sensing image 1110 into two sides, it may determine the only one side is above the liquid surface.

Besides, the multiple one-dimensional sensing information of the sensing image 1110 may be used to determine positions of the liquid surface. For example, each horizontal one-dimensional sensing information as shown in FIG. 11 includes a line piece which has sensing values classified as A-class. Those adjacent line pieces having A-class sensing values may be taken as a large line piece group, a.k.a. one single touching or approximating event. In other words, the area where the touching or approximating event occupies is the aforementioned boundary zone. A point may be calculated according to sensing values of each of the line pieces. This point may be derived from a central point, a center of gravity or a pointing corresponding to the maximum sensing values. Next, in one embodiment, a curve connecting all of these points can be taken as the liquid surface. In another embodiment, a straight line may be considered as the liquid surface if a sum of distance values between the straight line and each of the point is a minimum. In an alternative embodiment, a quadratic curve may be considered as the liquid surface if a sum of distance values between the quadratic curve and each of the point is a minimum.

It is already known how to find out touching or approximating events and/or line piece groups according to sensing image. Based on the aforementioned determination steps on the found touching or approximating event, it may determine whether the found touching or approximating event is caused by the liquid surface or not. And it may further determine which side is above the liquid surface.

In previous paragraphs, methods for detecting liquid surface by sensing parallel touch electrodes and by a sensing image are provided. In one embodiment, a first liquid surface is firstly found by one of these methods, and then a second liquid surface is found by another one of these methods. At last, a third liquid surface is calculated subsequently according the first and the second liquid surface. There are three methods for detecting a single touching or approximating event or a rectangle defined by two touching or approximating events in an area which is mostly covered by conductive liquid. Any one of these three methods may be applicable to the area below the boundary zone or the liquid surface. In other words, in one embodiment, after a liquid surface is determined by the touch sensitive processing apparatus, the touching or approximating events found in the sensing image may be ignored. It turns to use one of these methods to detect the single event or the rectangle.

For example, the first one of the three methods when an area is determined being mostly covered by conductive liquid or object includes following steps. The processor module 114 may command the driving circuit module 112 providing driving signals to all of the first electrodes 121 in the area, command the sensing circuit module 113 sensing all of the second electrodes 122 to gather multiple second sensing values, and calculate at least one second coordinate value according to the second sensing values; command the driving circuit module 112 providing driving signals to all of the second electrodes 122 in the area, command the sensing circuit module 113 sensing all of the first electrodes 121 to gather multiple first sensing values, and determine at least one first coordinate value according to the first sensing values; and determine that an external conductive object touching the position at the position represented by the first and the second coordinate values.

The second one of the three methods when an area is determined being mostly covered by conductive liquid or object includes following steps. The processor module 114 may command the driving circuit module 112 providing driving signals to all of the first electrodes 121 in the area, command the sensing circuit module 113 sensing all of the first electrodes 121 to gather multiple first sensing values, calculate at least one first coordinate value according to the first sensing values; command the sensing circuit module 113 sensing all of the second electrodes 122 to gather multiple second sensing values, calculate at least one second coordinate value according to the second sensing values; and determine that an external conductive object touching the position at the position represented by the first and the second coordinate values.

The third one of the three methods when an area is determined being mostly covered by conductive liquid or object includes following steps. The processor module 114 may command the driving circuit module 112 providing driving signals to all of the first electrodes 121 in the area, command the sensing circuit module 113 sensing all of the first electrodes 121 to gather multiple first sensing values, calculate at least one first coordinate value according to the first sensing values; command the driving circuit module 112 providing driving signals to all of the second electrodes 122 in the area, command the sensing circuit module 113 sensing all of the second electrodes 122 to gather multiple second sensing values, calculate at least one second coordinate value according to the second sensing values; and determine that an external conductive object touching the position at the position represented by the first and the second coordinate values.

In case two first coordinate values and two second coordinate values are calculated, it may determine that there are two external conductive objects touching two across corners of a rectangle defined by these two first coordinate values and two second coordinate values. However, it still needs to determine which one of the corners of the rectangle is above the liquid surface.

After the rectangle is determined, it may further determine whether all of the four corners of the rectangle are below the liquid surface. If so, the touch sensitive processing apparatus 110 may report this rectangle or the four corners to the CPU module 142. If only one corner is above the liquid surface, it may perform steps for gathering the sensing image. If the corner above the liquid surface matches a touching or approximating event observed in the sensing image, the touch sensitive processing apparatus 110 may report the corner above the liquid surface and the across corner to the CPU 142 and ignore another two corners of the rectangle. If the corner above the liquid surface does not matches any touching or approximating event observed in the sensing image, the touch sensitive processing apparatus 110 may report two corners adjacent to the corner above the liquid surface to the CPU 142.

In other words, before detecting any liquid surface, the touch sensitive processing apparatus 110 can perform multiple point detection on entire touch screen 120. After a liquid surface is detected, the touch sensitive apparatus 110 may perform detection of a single touching event or a rectangle on the submerged area and maintain original detection capability on the rest area of the touch screen 120.

Because the touch screen 120 is fixed in the touch system 100, when the CPU module 142 receives where the liquid surface is from the touch sensitive processing apparatus 110, it may gather attitude information from other sensor. Thus it may determine which part of the touch system 100 is also submerged into the conductive liquid.

In the embodiment as shown in FIG. 1, modules connecting to the I/O interface module 141 are the network interface module 145 and the storage module 145. In another embodiment, modules connecting to the I/O interface module 141 may include one or more communication modules such as 5G/4G/3G/2G wide area network wireless communication modules, local area network wireless communication modules and/or personal network wireless communication modules (e.g. Bluetooth, Zigbee, UWB, millimeter wave communication, etc.) If antennas of these communication modules are submerged in the conductive liquid, their corresponding wireless communication functions would be malfunctioned or degraded.

In addition, the touch system 100 may include satellite positioning signal receiver module, light sensor module, linear accelerometer module, accelerometer module, angular accelerometer module, barometer module, water pressure module, magnetometer module, fingerprint sensor module, face scanner module, camera module, flashlight module, microphone module, speaker module, wireless charging sensor module, wired interface module (e.g. USB, Lightning, IEEE 1394, etc.) When any one of the modules of the touch system 10 is determined being submerged in the conductive liquid, the CPU module 142 may perform corresponding actions. Functions of the corresponding action may include turning off the module to reduce electricity consumption or changing operating modes or parameter of the module to adapt to the submerged environment and to reduce error inputs.

Figure 12:
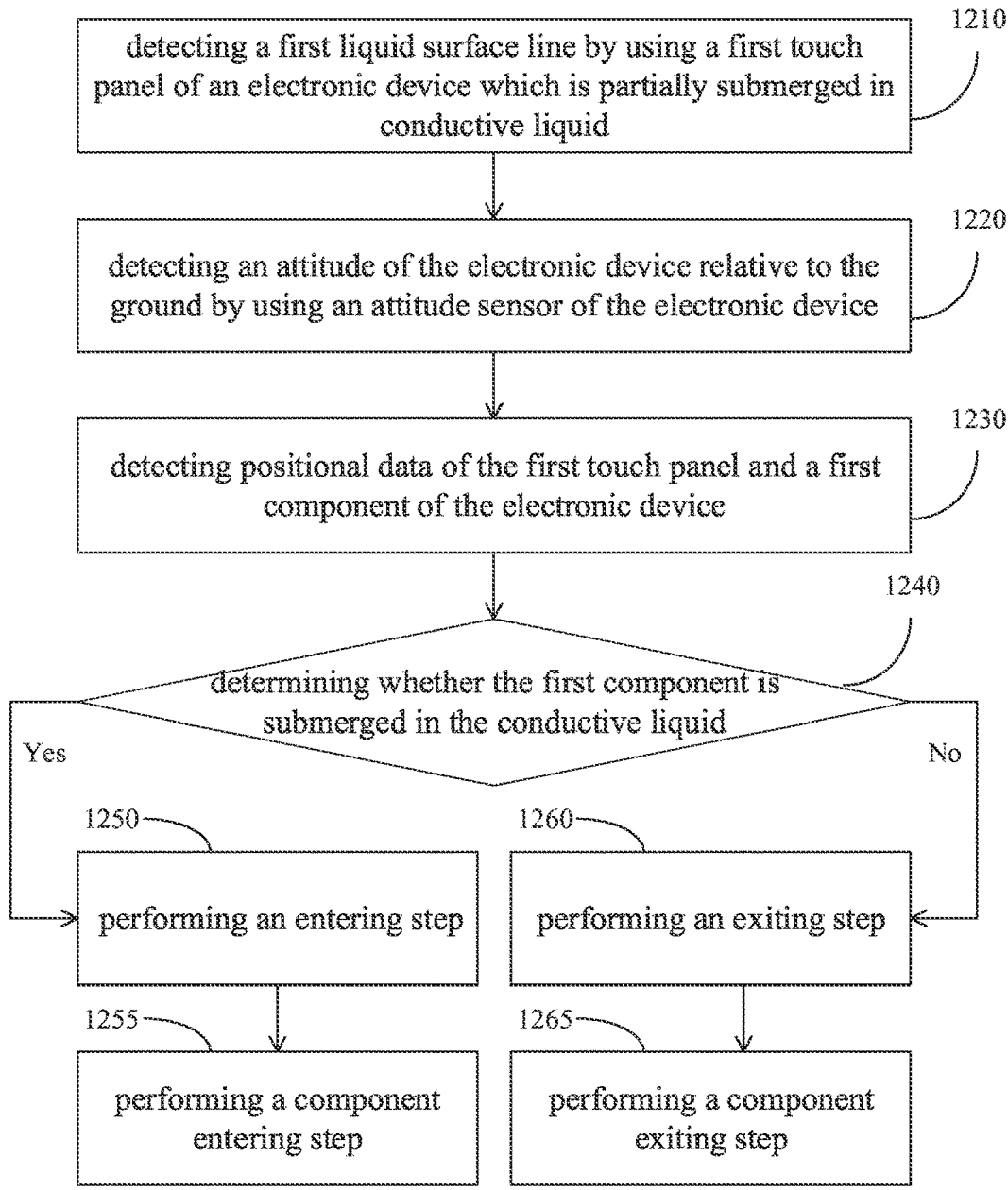
FIG. 12 is a flowchart diagram depicts a method for a part of an electronic device entering and exiting conductive liquid in accordance with an embodiment of the present invention.

Please refer to FIG. 12, which is a flowchart diagram depicts a method 1200 for a part of an electronic device entering and exiting conductive liquid in accordance with an embodiment of the present invention. The electronic device may be the touch system 100 as shown in FIG. 1. A first touch panel included in the electronic device may be the touch panel or screen 120 as shown in FIG. 1. A first component included in the electronic device may be one of the aforementioned modules. The method 1200 may be applicable to the touch system 100.

Step 1210: detecting a first liquid surface line by using a first touch panel of an electronic device which is partially submerged in conductive liquid. Already discussed, the present application provides at least three methods for detecting liquid surface line by using a touch panel or screen. These methods can be used in this step. The first liquid surface line may be a straight line or just a line.

Step 1220: detecting an attitude of the electronic device relative to the ground by using an attitude sensor of the electronic device. Already discussed, the attitude sensor may include linear accelerometer module, accelerometer module, angular accelerometer module, gyroscope module, etc. for detecting the attitude. Normally, the ground level would be parallel to the first liquid surface line. However, if the conductive liquid is shaking, the first liquid surface may not be parallel to the ground level.

Step 1230: detecting positional data of the first touch panel and a first component of the electronic device. If the shape of the electronic device is fixed, the relative position between the first touch panel and the first module is also fixed. Hence, the relative position may be stored as positional data in the memory module 144 of the host 140. If the shape of the electronic device is changeable, the relative position between the first touch panel and the first component has to be detected by a position sensor. The sensing result may be also stored as positional data in the memory module 144. For example, a certain point of the electronic device may be configured as the origin of a local coordinate system. Next, coordinate values of the vertices of the touch panel and coordinate values of the vertices of the first component are recorded. These coordinate values are the so-called positional data.

Step 1240: determining whether the first component is submerged in the conductive liquid. After the attitude is detected at step 1220, the local coordinate system of the electronic device may be transformed into a ground coordinate system relative to the ground level. Next, considering the first liquid surface line detected at step 1210 is a line on the first touch panel, a highest point and a lowest point of the first liquid surface line in the ground coordinate system relative to the ground level may be found. In one embodiment, if all coordinates of the vertices of the first component in the ground coordinate system are all lower than the lowest point, it may determine the first component is entirely submerged in the conductive liquid. If all coordinates of the vertices of the first component in the ground coordinate system are all higher than the highest point, it may determine the first component is entirely out of the conductive liquid. When it is determined that the first component is partially submerged in the conductive liquid, it may further take this case as the submerged case or the un-submerged case according to the needs of the corresponding embodiments. Alternatively, in addition to these two submerged or un-submerged cases, there may be additional steps to handle the partially submerged case. If the first component is determined being submerged in the conductive liquid at step 1240, the flow goes to step 1250 or step 1255. If the If the first component is determined being un-submerged in the conductive liquid at step 1240, the flow goes to step 1260 or 1265.

Optional step 1250: performing an entering step by the electronic device. For example, the electronic device may switch to a power saving mode or a sleep mode or record the time when it is submerged in the conductive liquid. In one embodiment, if the first component includes a speaker, the electronic device may cease operations of a music player program. In another embodiment, if the first component includes a satellite positioning signal receiver module, the electronic device may cease operations of a navigation program.

Optional step 1255: performing a component entering step by the first component. In one embodiment, if the first component includes a speaker, the first component ceases functions of playing music. In another embodiment, if the first component includes a satellite positioning signal receiver module, the first component cease processing of received satellite positioning signals.

Optional step 1260: performing an exiting step by the electronic device. In one embodiment if the first component includes a speaker, the electronic device may resume operations of a music player program. In another embodiment, if the first component includes a satellite positioning signal receiver module, the electronic device may resume operations of a navigation program.

Optional step 1265: performing a component exiting step by the first component. In one embodiment, if the first component includes a speaker, the first component resumes playing music. In another embodiment, if the first component includes a satellite positioning signal receiver module, the first component starts processing of received satellite positioning signals.

Figure 13:
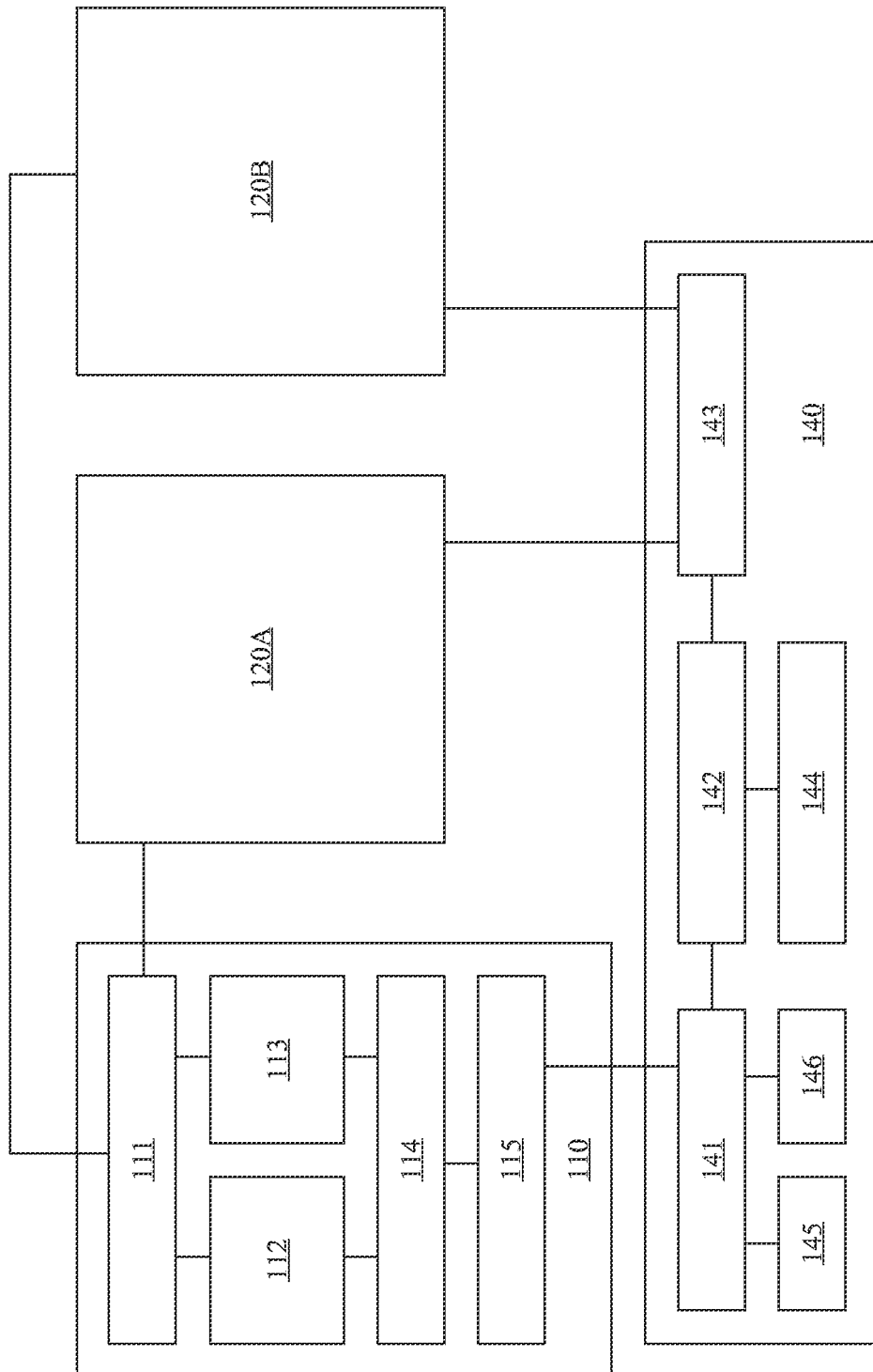
FIG. 13 is a block diagram depicts a touch system according to one embodiment of the present invention.

Please refer to FIG. 13, which is a block diagram depicts a touch system 1300 according to one embodiment of the present invention. Comparing with the touch system 100 as shown in FIG. 1, the differences are the touch system 1300 including a first touch panel or screen 120A and a second touch panel or screen 120B. The structures of these two touch screen 120A and 120B are similar to the structure of the touch screen 120, which includes multiple first electrodes 121 and multiple second electrodes 122. However, the present application does not limit that the sizes, the resolutions, and the numbers of touch electrodes of these two touch screens 120A and 120B have to be identical. These two touch screens 120A and 120B may be connected to the graphics processor module 143 which controls their outputs. Besides, these two touch screens 120A and 120B are installed on surfaces of the touch system 1300 for outputs and user's inputs. Already discussed, the memory module 144 may include positional data of these two touch screens 120A and 120B, for examples, coordinate values of each vertex of these two touch screens 120A and 120B.

In one embodiment, these two touch screens 120A and 120B may be installed on different surfaces of the touch system 1300. As shown in FIG. 5, they are installed on opposite surfaces. In another embodiment, the shape of the touch system 1300 is changeable, for examples, foldable phone or laptop computer. When the touch system 1300 is configured in a first shape, they may be positioned on the same plane. When the touch system 1300 is configured in a second shape, they may be positioned on different planes. In an alternative embodiment, the touch screens 120A and 120B may belong to one flexible touch screen. When the touch system 1300 is configured in the first shape, the flexible touch screen consisted of these two touch screens 120A and 120B may be on one plane. When the touch system 1300 is configured in the second shape, the flexible touch screen consisted of these two touch screens 120A and 120B may be bent and these two touch screens 120A and 120B are on different planes.

In this embodiment, the touch sensitive processing apparatus 110 may control one or more touch screens 120 such as these two touch screens 120A and 120B which may or may not be the same model. The interconnection network module 111 may be configured to connect the driving circuit module 112 to any one of the first electrodes or the second electrodes 122 of the first touch screen 120A. Analogously, the interconnection network module 111 may be configured to connect the driving circuit module 112 to any one of the first electrodes or the second electrodes 122 of the second touch screen 120B. With regard to the sensing circuit module 113, the interconnection network module 111 may be configured to connect the sensing circuit module 113 to any one of the first electrodes or the second electrodes 122 of the first touch screen 120A and to connect the sensing circuit module 113 to any one of the first electrodes or the second electrodes 122 of the second touch screen 120B. Hence, the processor module 114 may control the touch screens 120A and 120B in a time-sharing manner or by additional computing resources. For example, by using one of the methods for detecting liquid surface, the processor module 114 detects a first liquid surface and a second liquid surface corresponding to the first touch screen 120A and the second touch screen 120B, respectively. Then these liquid surfaces are transmitted to the host 140 via the interface module 115. Of course, the touch sensitive processing apparatus 110 may detect one or more external conductive objects, stylus 130, or electronic board eraser 135 touching or approximating to the first and the second touch screens 120A and 120B, and transmits the detection results to the host via the interface module 115.

Figure 14:
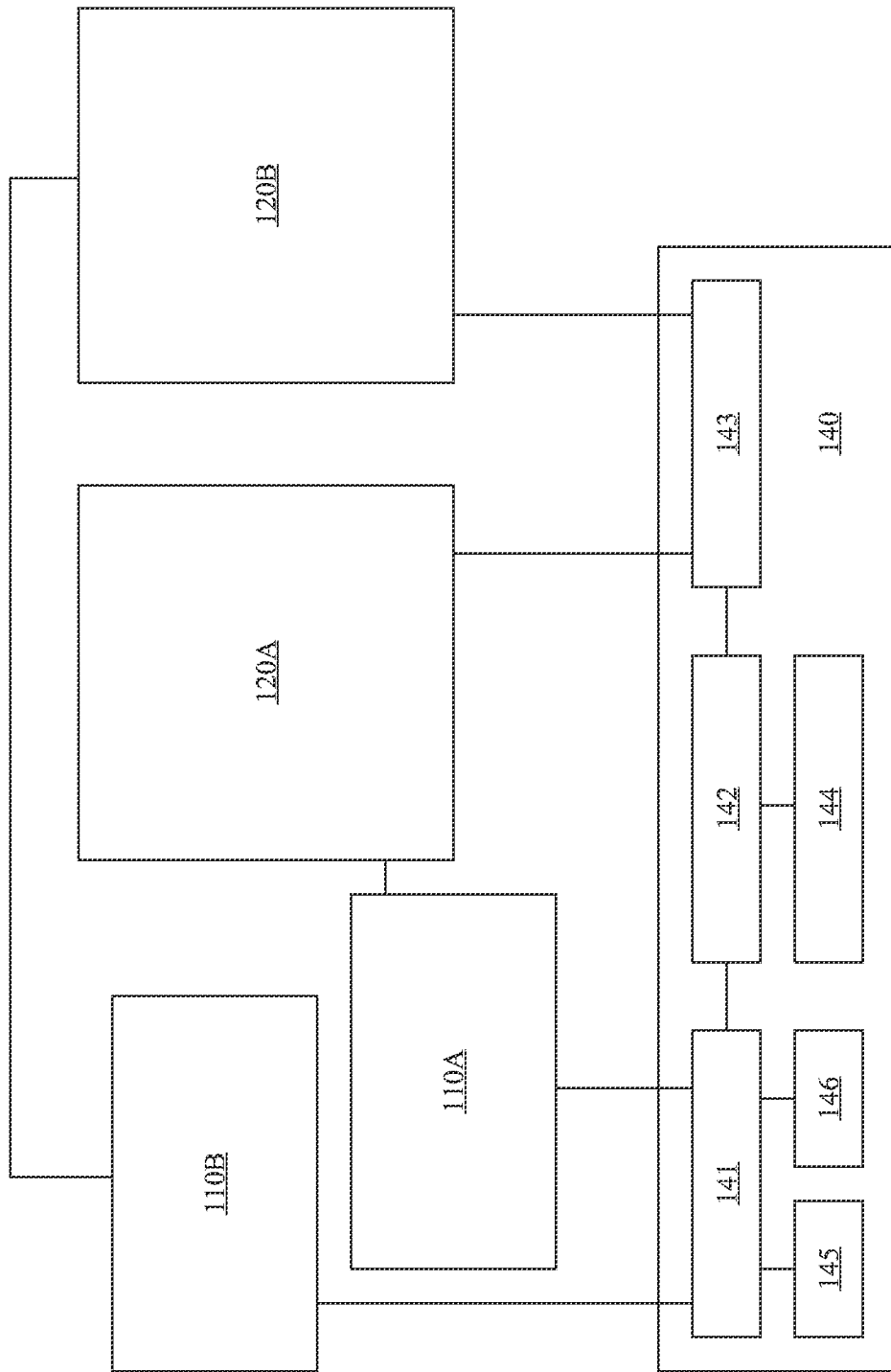
FIG. 14 is a block diagram depicts a touch system according to one embodiment of the present invention.

Please refer to FIG. 14, which is a block diagram depicts a touch system 1400 according to one embodiment of the present invention. Comparing with the embodiment as shown in FIG. 13, the differences are that the touch system 1400 includes two touch sensitive processing apparatus 110A and 110B for connecting to the first and the second touch screens 120A and 120B, respectively. In other words, each one of the touch sensitive processing apparatus 110A and 110B may be configured to detect liquid surface, one or more external conductive object, stylus 130, electronic board eraser 135 in the same fashion as the touch sensitive processing apparatus 110 as shown in FIG. 1 and to transmit the detection results to the host 140 via their interface module 115.

Figure 15:
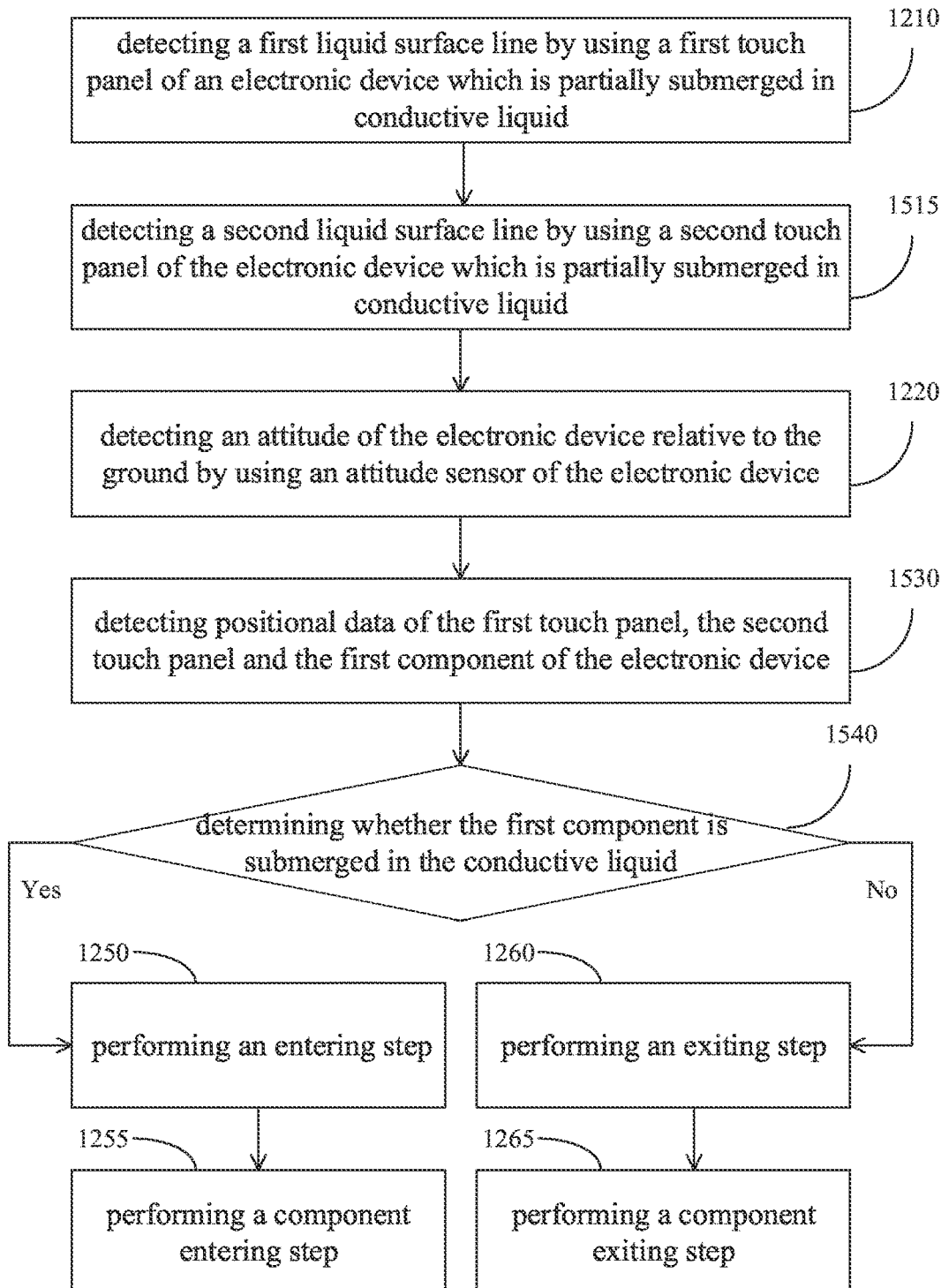
FIG. 15 is a flowchart diagram depicts a method for a part of an electronic device entering and exiting conductive liquid in accordance with an embodiment of the present invention.

Please refer to FIG. 15, which is a flowchart diagram depicts a method 1500 for a part of an electronic device entering and exiting conductive liquid in accordance with an embodiment of the present invention. The electronic device may be the touch systems 1300 or 1400 as shown in FIG. 13 or in FIG. 14, respectively. A first touch panel may be the first touch panel or screen 120A as shown in FIGS. 13 and 14. A second touch panel may be the second touch panel or screen 120B as shown in FIGS. 13 and 14. A first component may be any one of the aforementioned modules. The method 1500 may be applicable to the touch system 1300 or 1400.

The step 1210 may be performed on the first touch screen 120A by the touch sensitive processing apparatus 110 as shown in FIG. 13 or the first touch sensitive processing apparatus 110A as shown in FIG. 14.

Step 1515: detecting a second liquid surface line by using a second touch panel of the electronic device which is partially submerged in the conductive liquid. This step may be performed on the first touch screen 120B by the touch sensitive processing apparatus 110 as shown in FIG. 13 or the second touch sensitive processing apparatus 110B as shown in FIG. 14.

In the embodiment as shown in FIG. 15, the step 1220 is optional. For example, if the first and the second touch panels are on the same plane, the step 1220 is required.

Step 1530: detecting positional data of the first touch panel, the second touch panel and the first component of the electronic device. If the shape of the electronic device is fixed, the relative positions of the first touch panel and the second touch panel is also fixed. Thus the relative position may be stored as the positional data in the memory module 144 of the host 140. If the shape of the electronic device is changeable, such as a foldable phone or tablet computer, the relative positions of the first touch panel, the second touch panel and the first component have to be detected by a position sensor. The detection result may be stored as the positional data in the memory module 144 of the host 140. For example, a certain point of the electronic device may be configured as the origin of a local coordinate system. Next, coordinate values of the vertices of the first and the second touch panels and coordinate values of the vertices of the first component are recorded. These coordinate values are the so-called positional data.

Step 1540: determining whether the first component is submerged in the conductive liquid. If the positional data, regarding to the first and the second touch panels, detected at the step 1530 indicates that they are on the same plane, after the attitude is detected at step 1220, the local coordinate system of the electronic device may be transformed into a ground coordinate system relative to the ground level. Next, considering two liquid surface lines detected at the steps 1210 and 1515, are respectively. The first liquid surface line is a line on the first touch panel, a highest point and a lowest point of the first liquid surface line in the ground coordinate system relative to the ground level may be found. The second liquid surface line is a line on the second touch panel, a highest point and a lowest point of the second liquid surface line in the ground coordinate system relative to the ground level may be found. Among those four points, a highest point and a lowest point relative to the ground level could be determined. In one embodiment, if all coordinates of the vertices of the first component in the ground coordinate system are all lower than the lowest point, it may determine the first component is entirely submerged in the conductive liquid. If all coordinates of the vertices of the first component in the ground coordinate system are all higher than the highest point, it may determine the first component is entirely out of the conductive liquid.

If the positional data, regarding to the first and the second touch panels, detected at the step 1530 indicates that they are on different planes, a first liquid surface line and a second liquid surface line in the local coordinate system of the electronic device could be drawn. Next, a plane or a curved plane may be found as the liquid surface. For example, if the first and the second liquid surface lines are in parallel, a flat plane could be found accordingly. If the first and the second liquid surface lines are not in parallel, a curved plane could be found accordingly. In one embodiment, if all coordinates of the vertices of the first component are all higher than the liquid surface, it may determine the first component is entirely out of the conductive liquid. If all coordinates of the vertices of the first component are all lower than the liquid surface, it may determine the first component is entirely submerged in the conductive liquid.

Although the example works on the local coordinate system, the calculation may be done after the coordinates are transformed into the ground coordinate system relative to the ground level. The present application does not limit the calculations are based on which one of the coordinate systems.

When it is determined that the first component is partially submerged in the conductive liquid, it may further take this case as the submerged case or the un-submerged case according to the needs of the corresponding embodiments. Alternatively, in addition to these two submerged or un-submerged cases, there may be additional steps to handle the partially submerged case. If the first component is determined being submerged in the conductive liquid at step 1240, the flow goes to step 1250 or step 1255. If the If the first component is determined being un-submerged in the conductive liquid at step 1240, the flow goes to step 1260 or 1265.

In one embodiment, special designed circuits or application specific integrated circuits (ASIC) may be utilized to execute the methods as shown in FIG. 12 or FIG. 15. The special designed circuits or ASIC may connect to one or more the touch sensitive processing apparatus 100 and the attitude sensor as well as the CPU module 142 and the first component. In another embodiment, the first component includes the special designed circuits and ASIC. In an alternative embodiment, the CPU module 142 includes a combination of software and hardware circuits to implements the methods as shown in FIG. 12 or FIG. 15.

Figure 16:
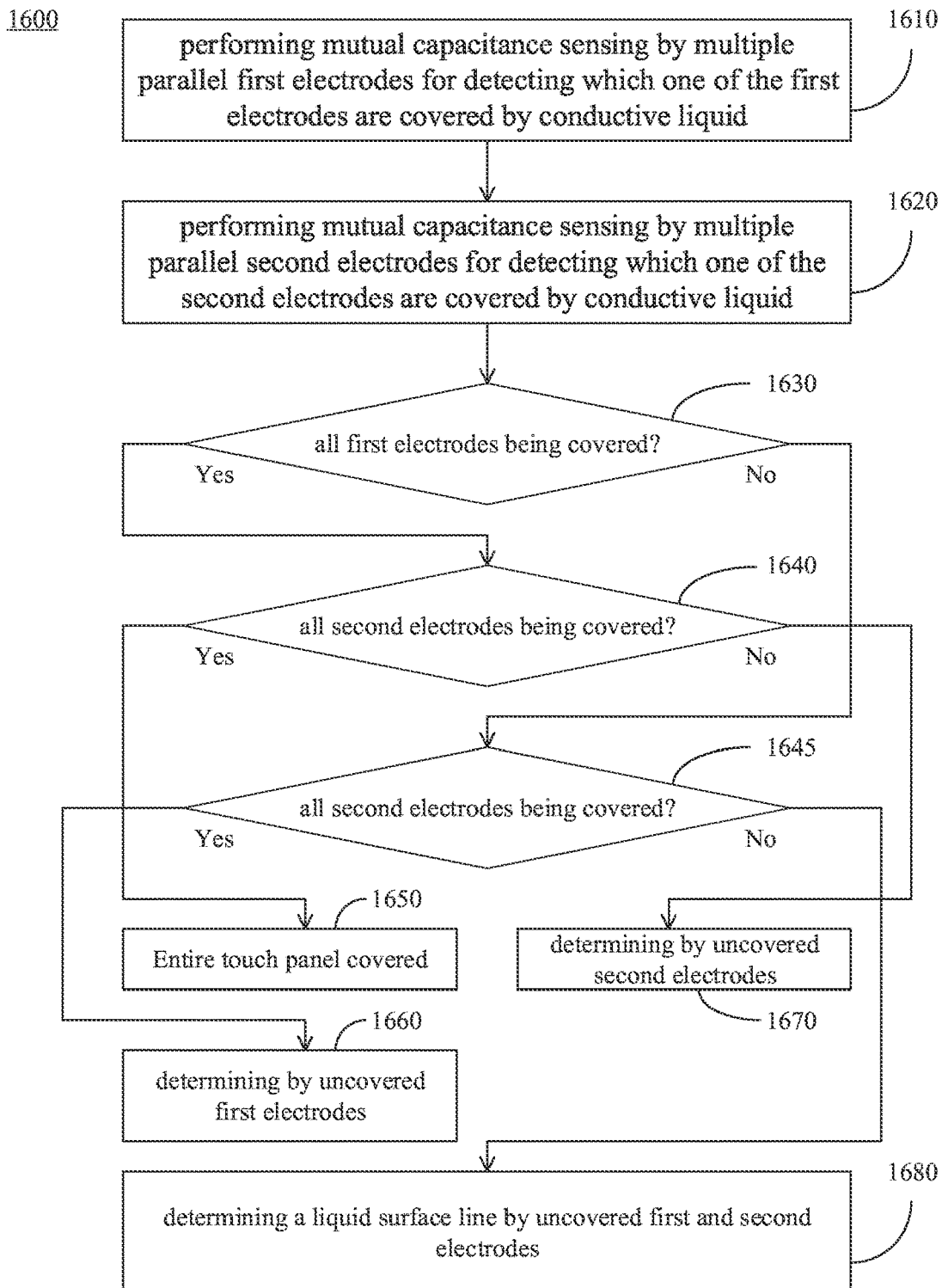
FIG. 16 is a flowchart diagram shows a method for detecting a liquid surface line in accordance with an embodiment of the present invention.

Please refer to FIG. 16, which is a flowchart diagram shows a method 1600 for detecting a liquid surface line in accordance with an embodiment of the present invention. The method 1600 may be applicable to the touch sensitive processing apparatus 110 as shown in FIGS. 1, 13 and 14 which is connected to the touch panel or screen 120. The touch panel or screen 120 has multiple parallel first electrodes and multiple parallel second electrodes. The first electrodes and the second electrodes form multiple intersections.

Step 1610: performing mutual capacitance sensing by multiple parallel first electrodes for detecting which one of the first electrodes are covered by conductive liquid. In the embodiments as shown in FIGS. 7, 8, 9, 10A and 10B, it is already described that transmitting driving signals via one of the touch electrodes and sensing of other parallel touch electrodes. When the sensing values (signal values, difference values, or dual difference values) of the other parallel touch electrodes are close, e.g., so as these sensing values cannot form a quadratic curve, or an absolute of a difference between their maximum value and minimum value is less than a threshold, it may determine that the touch electrodes corresponding to these sensing values are covered by conductive liquid.

Step 1620: performing mutual capacitance sensing by multiple parallel second electrodes for detecting which one of the second electrodes are covered by conductive liquid. This step is similar or identical to the step 1610.

Step 1630: determining whether all of the first electrodes are covered by the conductive liquid according to the sensing results of the step 1610. If the determination result is positive, the flow goes to step 1640; otherwise the flow goes to the step 1645.

Step 1640. determining whether all of the second electrodes are covered by the conductive liquid according to the sensing results of the step 1620. If the determination result is yes, the flow goes to step 1650; otherwise the flow goes to the step 1670.

Step 1645: determining whether all of the second electrodes are covered by the conductive liquid according to the sensing results of the step 1620. If the determination result is yes, the flow goes to step 1660; otherwise the flow goes to the step 1680.

Step 1650: determining the touch panel is entirely covered by the conductive liquid. This step is executed in response to that all of the first electrodes and all of the second electrodes are determined being covered by the conductive liquid. Subsequently, the touch sensitive processing apparatus may find a position corresponding to one external conductive object or a rectangle corresponding to two external conductive objects by self-capacitance sensing on the touch panel.

Step 1660: determining a liquid surface line according to the un-submerged first electrodes. The premise of executing this step is that all of the second electrodes are covered by the conductive liquid. In other words, the situation is similar to the embodiment as shown in FIG. 3. Hence, as described in the embodiments as shown in FIGS. 7, 10A and 10B, a liquid surface line may be determined according to the un-submerged first electrodes.

In one embodiment, an attitude sensor may be utilized at the step 1660 for detecting the orientation of the touch panel, i.e., an angle between the first electrodes and the horizon. A line, generated by rotating the highest first electrode submerged in the conductive liquid the angle, may be considered as the liquid surface line.

Step 1670: determining a liquid surface line according to the un-submerged second electrodes. The premise of executing this step is that all of the first electrodes are covered by the conductive liquid. In other words, the situation is similar to the embodiment as shown in FIG. 3. Hence, as described in the embodiments as shown in FIGS. 7, 10A and 10B, a liquid surface line may be determined according to the un-submerged second electrodes.

In one embodiment, an attitude sensor may be utilized at the step 1670 for detecting the orientation of the touch panel, i.e., an angle between the second electrodes and the horizon. A line, generated by rotating the highest second electrode submerged in the conductive liquid the angle, may be considered as the liquid surface line.

Step 1680: determining a liquid surface line according to the un-submerged first electrodes and the un-submerged second electrodes. Two possible ways that the flow executes this step. The first possible situation is that the entire touch panel does not contact the conductive liquid. The second possible situation is that the liquid surface intersects with two adjacent edges of the touch panel as shown in FIG. 4. If the determination results of the steps 1610 and 1620 show not a single one of the first and the second electrodes are covered by the conductive liquid, the touch sensitive processing apparatus may go on detection of external conductive objects according to the traditional sensing method. If the situation as shown in FIG. 4 happens, it may determine the liquid surface line according to the lowest un-submerged first electrode and the lowest un-submerged second electrode as described in the embodiment as shown in FIG. 9. Or it may determine the liquid surface line according to the highest submerged first electrode and the highest submerged second electrode.

Figure 17:
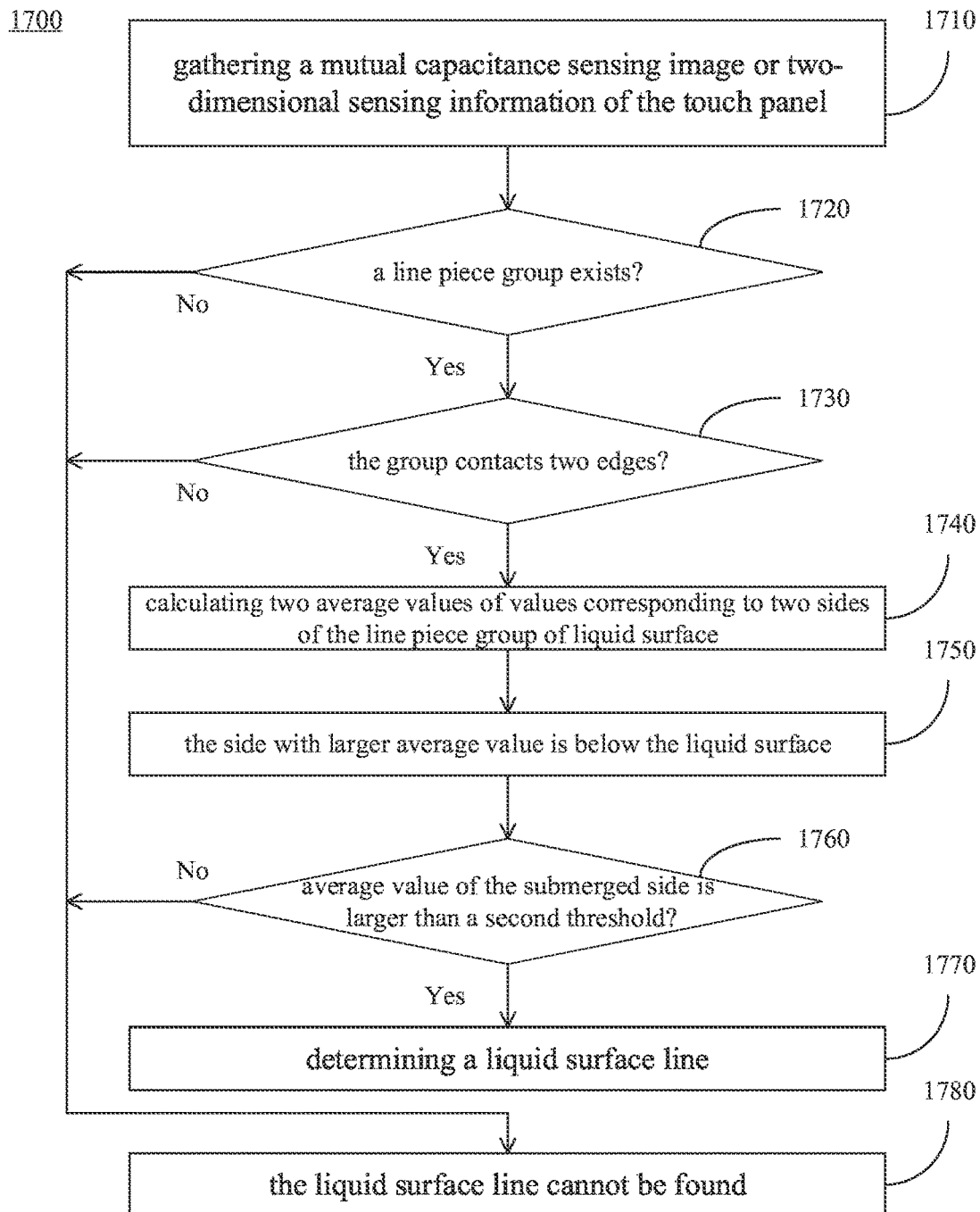
FIG. 17 is a flowchart diagram shows a method for detecting a liquid surface line in accordance with an embodiment of the present invention.

Please refer to FIG. 17, which is a flowchart diagram shows a method 1700 for detecting a liquid surface line in accordance with an embodiment of the present invention. The method 1700 is applicable to the touch sensitive processing apparatus 110 of the embodiments as shown in FIGS. 1, 13 and 14. The touch sensitive processing apparatus 100 is connected to the touch panel or screen 120. The touch panel or screen 120 has multiple parallel first electrodes 121 and multiple parallel second electrodes 122. The first and the second electrodes form multiple intersections.

Step 1710: gathering a mutual capacitance sensing image or two-dimensional sensing information of the touch panel.

Step 1720: determining whether a line piece group of liquid surface exists. This step includes looking for the line piece group of liquid surface in the mutual capacitance sensing image. The line piece group of liquid surface includes multiple line pieces of multiple one-dimensional sensing information. Each line piece includes one or more value (sensing value, difference value or dual difference value) which are larger than a first threshold value. When the line piece group of liquid surface cannot be found in the mutual capacitance sensing image, the flow goes to the step 1780; otherwise, the flow goes to the step 1730.

Step 1730: determining whether the line piece group of liquid surface contacts two edges of the touch panel. The two edges may be two adjacent edge or two opposite edges of the touch panel. If the line piece group of liquid surface does contact two edges of the touch panel, the flow goes to the step 1740; otherwise, the flow goes to the step 1780.

Step 1740: calculating two average values of values corresponding to two sides of the line piece group of liquid surface. Because the line piece group of liquid surface cuts the mutual capacitance sensing image into two sides, two average values of values (sensing value, difference value, or dual difference value) of these two sides can be calculated accordingly.

Step 1750: determining the side corresponding to the larger one of the two average values is below the liquid surface and another side is above the liquid surface.

Optional step 1760: determining whether the average value corresponding to the submerged side is larger than a second threshold, which is less than the first threshold. If the average value is less than the second threshold, it may determine that the touch panel is covered by a large object other than conductive liquid, the flow goes to the step 1780; otherwise, the flow goes to the step 1770.

Step 1770: determining a liquid surface line according to an interface separating the line piece group of liquid surface and the un-submerged side. In one embodiment, the liquid surface line may be a straight line where a sum of distances between the interface and the liquid surface line is a minimum. In another embodiment, the liquid surface line may be a curved line which passes each sensing points where the line piece group of liquid surface touches the un-submerged side. In an alternative embodiment, the liquid surface line which passes each sensing points where the un-submerged side touches the line piece group of liquid surface.

Step 1780: determining the liquid surface line cannot be found.

Figure 18:
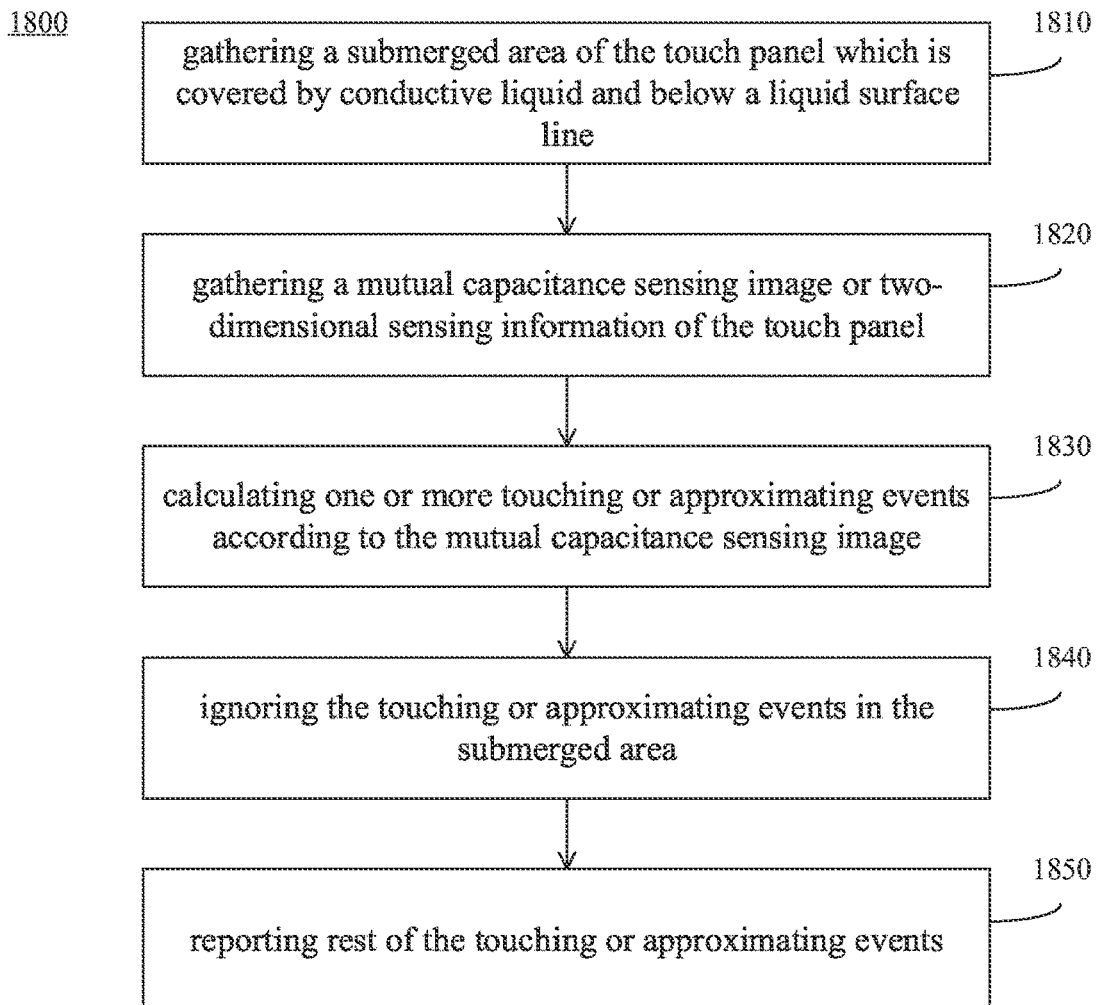
FIG. 18 is a flowchart diagram shows a method for detecting a touching or approximating event in accordance with an embodiment of the present invention.

Please refer to FIG. 18, which is a flowchart diagram shows a method 1800 for detecting a touching or approximating event in accordance with an embodiment of the present invention. The method 1800 is applicable to the touch sensitive processing apparatus 110 as shown in FIGS. 1, 13 and 14. The touch sensitive processing apparatus 110 has multiple parallel first electrodes 121 and multiple parallel second electrodes 122. The first electrodes and the second electrodes form multiple intersections.

Step 1810: gathering a submerged area of the touch panel which is covered by conductive liquid and below a liquid surface line. This step 1810 can be realized by executing the aforementioned methods 1600 or 1700 for gathering the liquid surface line, i.e., the submerged area below the liquid surface line which is covered by the conductive liquid.

Step 1820: gathering a mutual capacitance sensing image or two-dimensional sensing information of the touch panel.

Step 1830: calculating one or more touching or approximating events according to the mutual capacitance sensing image. The flow goes to the step 1840.

Step 1840: ignoring the touching or approximating events in the submerged area. That is determining whether each of the touching or approximating events is in the submerged area. If it is determined that the touching or approximating event happened in the area covered by the conductive liquid, the touching or approximating event is ignored. At last, the flow goes to the step 1850:

Step 1850: reporting rest of the touching or approximating events. That is to report those touching or approximating events did not happen in the area covered by the conductive liquid.

Figure 19A:
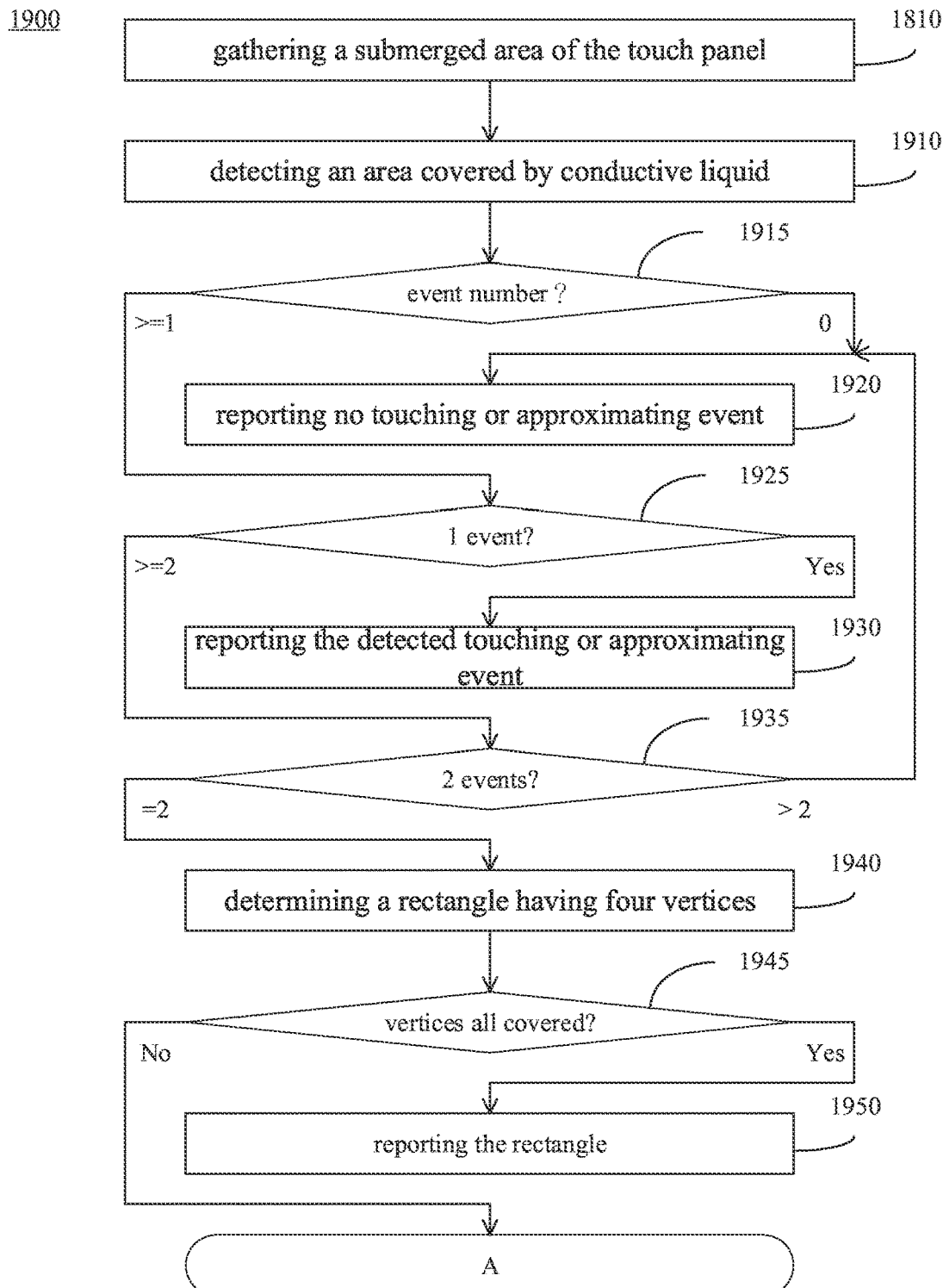
FIGS. 19A and 19B are flowchart diagrams illustrate a method for detecting a touching or approximating event in accordance with an embodiment of the present invention.
Figure 19B:
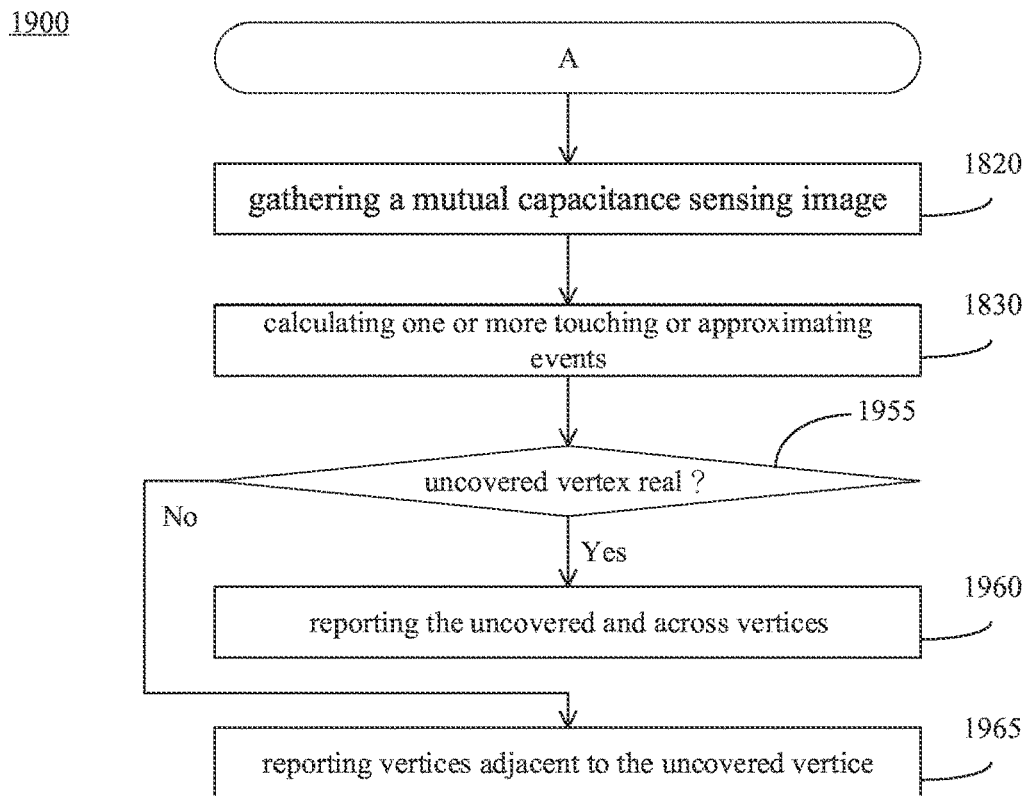

Please refer to FIGS. 19A and 19B, which are flowchart diagrams illustrate a method for detecting a touching or approximating event in accordance with an embodiment of the present invention. The connection between the flowcharts as shown in FIGS. 19A and 19B is at point A. The method 1900 is applicable to the touch sensitive processing apparatus 110 as shown in FIGS. 1, 13 and 14. The touch sensitive processing apparatus 110 has multiple parallel first electrodes 121 and multiple parallel second electrodes 122. The first electrodes and the second electrodes form multiple intersections.

Step 1910: detecting an area covered by conductive liquid. As described in the embodiment as shown in FIG. 11, there are three methods to detect object in the area covered by conductive liquid. The step 1910 may use one of these three methods.

Step 1915: determining a number of touching or approximating events detected in the area. If no touching event is detected, the flow goes to the step 1920; otherwise, the flow goes to the step 1925.

Step 1920: reporting no touching or approximating event detected in the area covered by the conductive liquid.

Step 1925: determining whether only one touching or approximating event is detected in the area covered by the conductive liquid. If only one touching or approximating event is detected, the flow goes to the step 1930. If two or more touching or approximating events are detected, the flow goes to the step 1935.

Step 1930: reporting the detected touching or approximating event.

Step 1935: determining whether exactly two touching or approximating events are detected in the area covered by the conductive liquid. If two touching or approximating events are detected, the flow goes to the step 1940; otherwise, the detection result may be influenced by noises, the flow goes to the step 1920.

Step 1940: determining a rectangle, having four vertices, according to the two touching or approximating events.

Step 1945: determining the four vertices of the rectangle are in the area covered by the conductive liquid. If the determination result is yes, the flow goes to the step 1950; otherwise, the flow goes to the step 1820.

Step 1950: reporting the rectangle or the four vertices.

Step 1955: determining whether the vertex outside the area covered by the conductive liquid is real. This determination step has to rely on the touching or approximating events calculated in the steps 1820 and 1830. If the vertex matches one of the touching or approximating events, the vertex is determined as a real event, the flow goes to the step 1960; otherwise, the flow goes to the step 1965.

Step 1960: reporting the vertex outside the area and its across vertex as two touching or approximating events.

Step 1965: reporting two vertices adjacent the vertex outside the area and its across vertex as two touching or approximating events.

Figure 20:
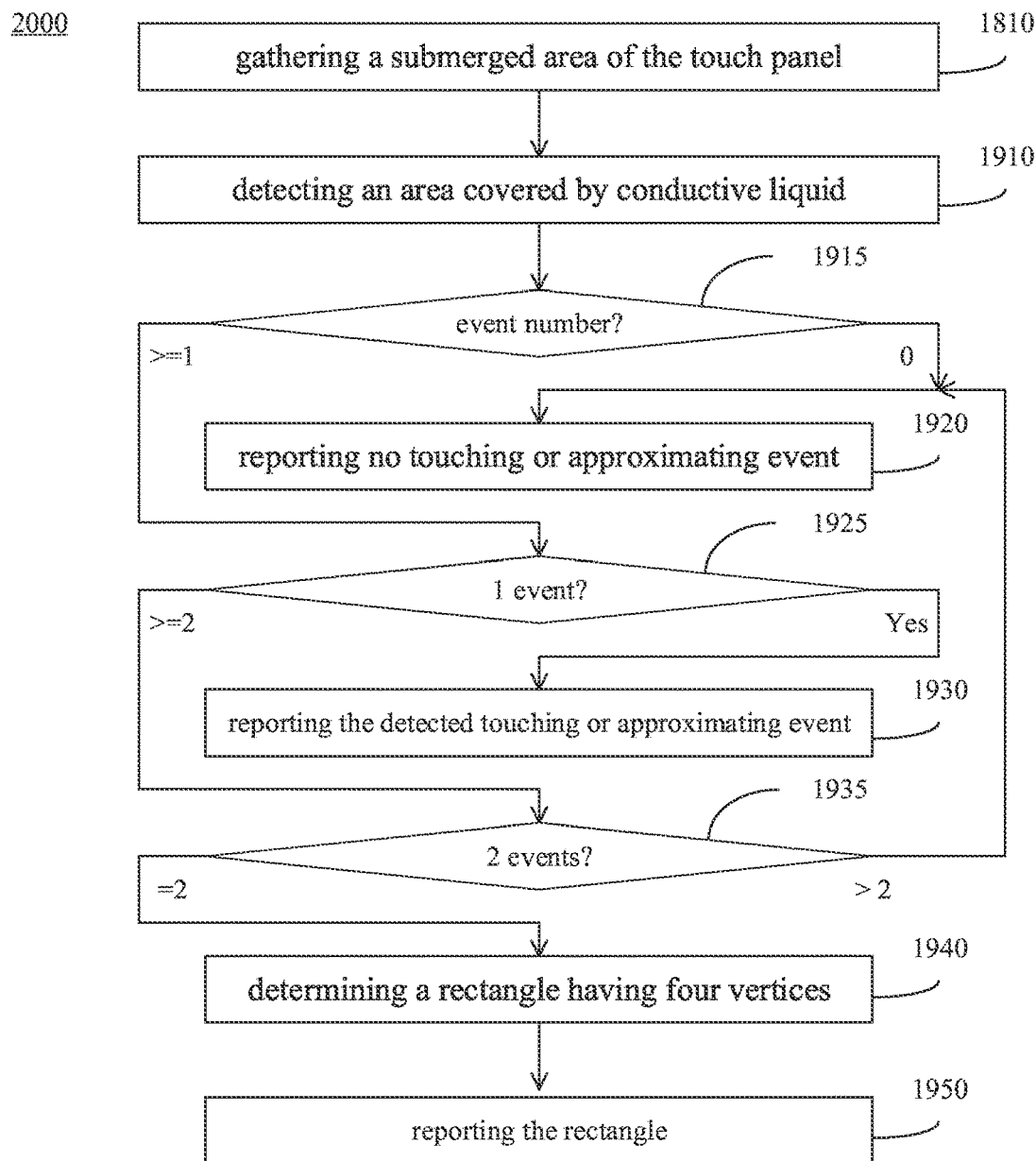
FIG. 20 is a flowchart diagram shows a method for detecting a touching or approximating event in accordance with an embodiment of the present invention.

Please refer to FIG. 20, which is a flowchart diagram shows a method 2000 for detecting a touching or approximating event in accordance with an embodiment of the present invention. The method 2000 is applicable to the touch sensitive processing apparatus 110 as shown in FIGS. 1, 13 and 14. The touch sensitive processing apparatus 110 has multiple parallel first electrodes 121 and multiple parallel second electrodes 122. The first electrodes and the second electrodes form multiple intersections.

The embodiment as shown in FIG. 20 utilizes the steps mentioned in FIG. 19. Comparing with the embodiment as shown in FIG. 19, the embodiment as shown in FIG. 20 reports only one touching or approximating event or a rectangle which is at least partially covered by the conductive liquid. This embodiment does not utilize mutual capacitance sensing image to verify the four vertices of the rectangle.

According to an embodiment, the present application provides an electronic device for detecting whether a component is submerged in conductive liquid, comprising: the component; a touch panel; a touch sensitive processing apparatus, coupled to the touch panel, configured to detect a liquid surface line when the electronic device is partially submerged in the conductive liquid; an attitude sensor, for detecting an attitude of the electronic device relative to ground; and a central processing unit (CPU) module, connected to the touch sensitive processing apparatus and the attitude sensor, configured to execute instruction for implementing following steps: receiving the liquid surface line from the touch sensitive processing apparatus; receiving the attitude from the attitude sensor; gathering positional data of the touch panel and the component; and determining whether the component is submerged in the conductive liquid according to the positional data, the liquid surface line and the attitude.

In one embodiment, in order to be adapted to changeable shape of the electronic device, the electronic device further comprises a sensor, connected to the CPU module, configured to detect the positional data of the touch panel and the component and to transmit the positional data to the CPU module.

In one embodiment, if relative positions of the touch panel and the component are fixed, the electronic device further comprises a memory module, connected to the CPU module, configured to store the positional data of the touch panel and the component and to provide the positional data to the CPU module.

In one embodiment, in order to be adapted to new environment, the CPU module is further configured to execute instruction for implementing one of following steps: performing an entering step if the component is determined being submerged in the conductive liquid; performing a component entering step if the component is determined being submerged in the conductive liquid; performing an exiting step if the component is determined being un-submerged in the conductive liquid; and performing a component exiting step if the component is determined being un-submerged in the conductive liquid.

According to an embodiment, the present application provides a method for detecting whether a component is submerged in conductive liquid, comprising: receiving a liquid surface line from a touch sensitive processing apparatus of an electronic device, wherein the touch sensitive processing apparatus, coupled to a touch panel, is configured to detect the liquid surface line when the electronic device is partially submerged in the conductive liquid; receiving an attitude from an attitude sensor of the electronic device, wherein the attitude sensor is configured for detecting an attitude of the electronic device relative to ground; gathering positional data of the touch panel and the component; and determining whether the component is submerged in the conductive liquid according to the positional data, the liquid surface line and the attitude.

In one embodiment, in order to be adapted to changeable shape of the electronic device, the gathering step further comprises: receiving the positional data of the touch panel and the component from a sensor of the electronic device.

In one embodiment, if relative positions of the touch panel and the component are fixed, the gathering step further comprises reading the positional data of the touch panel and the component from a memory module of the electronic device.

In one embodiment, in order to be adapted to new environment, the method further comprises one of following steps: performing an entering step if the component is determined being submerged in the conductive liquid; performing a component entering step if the component is determined being submerged in the conductive liquid; performing an exiting step if the component is determined being un-submerged in the conductive liquid; and performing a component exiting step if the component is determined being un-submerged in the conductive liquid.

According to one embodiment, the present application provides an electronic device for detecting whether a component is submerged in conductive liquid, comprising: the component; a first touch panel; a second touch panel; a touch sensitive processing apparatus, coupled to the first touch panel and the second touch panel, configured to detect a first liquid surface line by the first touch panel and to detect a second liquid surface line by the second touch panel when the electronic device is partially submerged in the conductive liquid; and a central processing unit (CPU) module, connected to the touch sensitive processing apparatus, configured to execute instruction for implementing following steps: receiving the first liquid surface line and the second liquid surface line from the touch sensitive processing apparatus; gathering positional data of the first touch panel, the second touch panel and the component; and determining whether the component is submerged in the conductive liquid according to the positional data, the first liquid surface line and the second liquid surface line.

In one embodiment, in order to be adapted to changeable shape of the electronic device, the electronic device further comprises a sensor, connected to the CPU module, configured to detect the positional data of the first touch panel, the second touch panel and the component and to transmit the positional data to the CPU module.

In one embodiment, if relative positions of the first touch panel, the second touch panel and the component are fixed, the electronic device further comprises a memory module, connected to the CPU module, configured to store the positional data of the first touch panel, the second touch panel and the component and to provide the positional data to the CPU module.

In one embodiment, in order to be adapted to new environment, the CPU module is further configured to execute instruction for implementing one of following steps: performing an entering step if the component is determined being submerged in the conductive liquid; performing a component entering step if the component is determined being submerged in the conductive liquid; performing an exiting step if the component is determined being un-submerged in the conductive liquid; and performing a component exiting step if the component is determined being un-submerged in the conductive liquid.

In one embodiment, in order to more precisely determine whether the component is submerged in the conductive liquid, the electronic device further comprises an attitude sensor, connected to the CPU module, configured to detect an attitude of the electronic device relative to ground, wherein the CPU module is further configured to execute instruction for receiving the attitude from the attitude sensor, wherein the determining is further according to the positional data, the first liquid surface line, the second liquid surface line and the attitude.

According to one embodiment, the present application provides an electronic device for detecting whether a component is submerged in conductive liquid, comprising: the component; a first touch panel; a second touch panel; a first touch sensitive processing apparatus, coupled to the first touch panel, configured to detect a first liquid surface line by the first touch panel when the electronic device is partially submerged in the conductive liquid; a second touch sensitive processing apparatus, coupled to the second touch panel, configured to detect a second liquid surface line by the second touch panel when the electronic device is partially submerged in the conductive liquid; and a central processing unit (CPU) module, connected to the first touch sensitive processing apparatus and the second touch sensitive processing apparatus, configured to execute instruction for implementing following steps: receiving the first liquid surface line and the second liquid surface line from the first touch sensitive processing apparatus and the second touch sensitive processing apparatus, respectively; gathering positional data of the first touch panel, the second touch panel and the component; and determining whether the component is submerged in the conductive liquid according to the positional data, the first liquid surface line and the second liquid surface line.

In one embodiment, in order to be adapted to changeable shape of the electronic device, the electronic device further comprises a sensor, connected to the CPU module, configured to detect the positional data of the first touch panel, the second touch panel and the component and to transmit the positional data to the CPU module.

In one embodiment, if relative positions of the first touch panel, the second touch panel and the component are fixed, the electronic device further comprises a memory module, connected to the CPU module, configured to store the positional data of the first touch panel, the second touch panel and the component and to provide the positional data to the CPU module.

In one embodiment, in order to be adapted to new environment, the CPU module is further configured to execute instruction for implementing one of following steps: performing an entering step if the component is determined being submerged in the conductive liquid; performing a component entering step if the component is determined being submerged in the conductive liquid; performing an exiting step if the component is determined being un-submerged in the conductive liquid; and performing a component exiting step if the component is determined being un-submerged in the conductive liquid.

In one embodiment, in order to more precisely determine whether the component is submerged in the conductive liquid, the electronic device further comprises an attitude sensor, connected to the CPU module, configured to detect an attitude of the electronic device relative to ground, wherein the CPU module is further configured to execute instruction for receiving the attitude from the attitude sensor, wherein the determining is further according to the positional data, the first liquid surface line, the second liquid surface line and the attitude.

According to an embodiment, the present application provides a method for detecting whether a component is submerged in conductive liquid, comprising: receiving a first liquid surface line and a second liquid surface line, wherein the first liquid surface line is a line where a surface of the conductive liquid contacts a first touch panel of an electronic device, wherein the second liquid surface line is a line where the surface of the conductive liquid contacts a second touch panel of the electronic device; gathering positional data of the first touch panel, the second touch panel and the component; and determining whether the component is submerged in the conductive liquid according to the positional data, the first liquid surface line and the second liquid surface line.

In one embodiment, in order to be adapted to changeable shape of the electronic device, the gathering step further comprises receiving the positional data of the first touch panel, the second touch panel and the component from a sensor of the electronic device.

In one embodiment, if relative positions of the first touch panel, the second touch panel and the component are fixed, the gathering step further comprises reading the positional data of the first touch panel, the second touch panel and the component from a memory module of the electronic device.

In one embodiment, in order to be adapted to new environment, the method further comprises one of following steps: performing an entering step if the component is determined being submerged in the conductive liquid; performing a component entering step if the component is determined being submerged in the conductive liquid; performing an exiting step if the component is determined being un-submerged in the conductive liquid; and performing a component exiting step if the component is determined being un-submerged in the conductive liquid.

In one embodiment, in order to receive the first and the second liquid surface lines corresponding to the first and the second touch panels, respectively, the electronic device further comprises a touch sensitive processing apparatus coupled to the first touch panel and the second touch panel for detecting the first liquid surface line and the second liquid surface line, respectively, wherein the first liquid surface line and the second liquid surface line are received from the touch sensitive processing apparatus.

In one embodiment, in order to receive the first and the second liquid surface lines corresponding to the first and the second touch panels, respectively, the electronic device further comprises a first touch sensitive processing apparatus, coupled to the first touch panel, for detecting the first liquid surface line and a second touch sensitive processing apparatus, coupled to the second touch panel, for detecting the second liquid surface line, wherein the first liquid surface line and the second liquid surface line are received from the first touch sensitive processing apparatus and the second touch sensitive processing apparatus, respectively.

In one embodiment, in order to more precisely determine whether the component is submerged in the conductive liquid, the electronic device further comprises an attitude sensor for detecting an attitude of the electronic device relative to ground, wherein the method further comprises receiving the attitude from the attitude sensor, wherein the determining is further according to the positional data, the first liquid surface line, the second liquid surface line and the attitude.

According to an embodiment, the present application provides a CPU module as described in the aforementioned paragraphs.

According to an embodiment, the present application provides a touch sensitive processing apparatus for detecting whether a touch panel is partially submerged in conductive liquid, comprising: a driving circuit module; a sensing circuit module; an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: having the driving circuit module drive at least one of the first electrodes and having the sensing circuit module sense the first electrodes for determining which of the first electrodes are covered by the conductive liquid; having the driving circuit module drive at least one of the second electrodes and having the sensing circuit module sense the second electrodes for determining which of the second electrodes are covered by the conductive liquid; determining a liquid surface line according to the second electrodes which are un-submerged if all of the first electrodes and part of the second electrodes are determined being submerged in the conductive liquid; and determining the liquid surface line according to the first electrodes and the second electrodes which are un-submerged if part of the first electrodes and part of the second electrodes are determined being submerged in the conductive liquid.

In one embodiment, in order to detect the situations that the entire touch panel is submerged or un-submerged, the processor module is further configured to execute instruction for implementing following steps: determining the entire touch panel is covered by the conductive liquid if all of the first electrodes and all of the second electrodes are determined being submerged in the conductive liquid; and determining the touch panel is not covered by the conductive liquid if all of the first electrodes and all of the second electrodes are determined being un-submerged in the conductive liquid.

In one embodiment, in order to increase the preciseness of the determined liquid surface line, the processor module is further configured to execute instruction for implementing at least one of following steps: having the driving circuit module drive different one of the first electrodes and having the sensing circuit module sense the first electrodes, adjacent to the first electrode being driven, iteratively for determining which of the first electrodes are covered by the conductive liquid; and having the driving circuit module drive different one of the second electrodes and having the sensing circuit module sense the second electrodes, adjacent to the second electrode being driven, iteratively for determining which of the second electrodes are covered by the conductive liquid.

In one embodiment, in order to reduce number of the detections and to accelerate the detections, the processor module is further configured to execute instruction for implementing at least one of following steps: having the driving circuit module stop sensing the first electrodes, adjacent to the first electrode being driven, if it is determined that at least one of the first electrodes is submerged by the conductive liquid and another one of the first electrodes is not submerged by the conductive liquid; and having the driving circuit module stop sensing the second electrodes, adjacent to the second electrode being driven, if it is determined that at least one of the second electrodes is submerged by the conductive liquid and another one of the second electrodes is not submerged by the conductive liquid.

In one embodiment, in order to provide an option for different applications, the first electrode being driven is selected from one of following: an outermost one of the parallel first electrodes; and one of the parallel first electrodes which is closest to a central figurative parallel line of the parallel first electrodes.

In one embodiment, in order to provide an option for different applications, the first electrodes being driven are two of the outermost first electrodes.

In one embodiment, in order to detect the submerged area, when multiple sensing values corresponding to the first electrodes cannot form a quadratic curve or an absolute value of a difference between the maximum value and the minimum value of the multiple sensing values is less than a predetermined value, it is determined that the first electrodes corresponding to the multiple sensing values are covered by the conductive liquid.

In one embodiment, in order to increase the preciseness of the determined liquid surface line, the processor module is further configured to execute instruction for implementing following steps: receiving an attitude of the touch panel from an attitude sensor; and adjusting the liquid surface line according to the attitude.

According to one embodiment, the present application provides a method for detecting whether a touch panel is partially submerged in conductive liquid, wherein the touch panel comprises multiple parallel first electrodes and multiple parallel second electrodes, wherein the method comprising: driving at least one of the first electrodes and sensing the first electrodes for determining which of the first electrodes are covered by the conductive liquid; driving at least one of the second electrodes and sensing the second electrodes for determining which of the second electrodes are covered by the conductive liquid; determining a liquid surface line according to the second electrodes which are un-submerged if all of the first electrodes and part of the second electrodes are determined being submerged in the conductive liquid; and determining the liquid surface line according to the first electrodes and the second electrodes which are un-submerged if part of the first electrodes and part of the second electrodes are determined being submerged in the conductive liquid.

In one embodiment, in order to detect the situations that the entire touch panel is submerged or un-submerged, the method further comprises: determining the entire touch panel is covered by the conductive liquid if all of the first electrodes and all of the second electrodes are determined being submerged in the conductive liquid; and determining the touch panel is not covered by the conductive liquid if all of the first electrodes and all of the second electrodes are determined being un-submerged in the conductive liquid.

In one embodiment, in order to increase the preciseness of the determined liquid surface line, the method further comprises: driving different one of the first electrodes and sensing the first electrodes, adjacent to the first electrode being driven, iteratively, for determining which of the first electrodes are covered by the conductive liquid; and driving different one of the second electrodes and sensing the second electrodes, adjacent to the second electrode being driven, iteratively for determining which of the second electrodes are covered by the conductive liquid.

In one embodiment, in order to reduce number of the detections and to accelerate the detections, the method further comprises: stopping sensing the first electrodes, adjacent to the first electrode being driven, if it is determined that at least one of the first electrodes is submerged by the conductive liquid and another one of the first electrodes is not submerged by the conductive liquid; and stopping sensing the second electrodes, adjacent to the second electrode being driven, if it is determined that at least one of the second electrodes is submerged by the conductive liquid and another one of the second electrodes is not submerged by the conductive liquid.

In one embodiment, in order to provide an option for different applications, the first electrode being driven is selected from one of following: an outermost one of the parallel first electrodes; and one of the parallel first electrodes which is closest to a central figurative parallel line of the parallel first electrodes.

In one embodiment, in order to provide an option for different applications, the first electrodes being driven are two of the outermost first electrodes.

In one embodiment, in order to detect the submerged area, when multiple sensing values corresponding to the first electrodes cannot form a quadratic curve or an absolute value of a difference between the maximum value and the minimum value of the multiple sensing values is less than a predetermined value, it is determined that the first electrodes corresponding to the multiple sensing values are covered by the conductive liquid.

In one embodiment, in order to increase the preciseness of the determined liquid surface line, the method further comprises: receiving an attitude of the touch panel from an attitude sensor; and adjusting the liquid surface line according to the attitude.

According to one embodiment, the present application provides a touch system for detecting whether a touch panel is partially submerged in conductive liquid, comprising: the touch panel; a touch sensitive processing apparatus, further comprising: a driving circuit module; a sensing circuit module; an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: having the driving circuit module drive at least one of the first electrodes and having the sensing circuit module sense the first electrodes for determining which of the first electrodes are covered by the conductive liquid; having the driving circuit module drive at least one of the second electrodes and having the sensing circuit module sense the second electrodes for determining which of the second electrodes are covered by the conductive liquid; determining a liquid surface line according to the second electrodes which are un-submerged if all of the first electrodes and part of the second electrodes are determined being submerged in the conductive liquid; and determining the liquid surface line according to the first electrodes and the second electrodes which are un-submerged if part of the first electrodes and part of the second electrodes are determined being submerged in the conductive liquid.

According to one embodiment, the present application provides a touch sensitive processing apparatus for detecting whether a touch panel is partially submerged in conductive liquid, comprising: a driving circuit module; a sensing circuit module; an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: having the driving circuit module drive one of the first electrodes and having the sensing circuit module sense the second electrodes, iteratively, for generating multiple one-dimensional sensing information; forming two-dimensional sensing information according to the multiple one-dimensional sensing information; determining whether a line piece group of liquid surface exists according to the two-dimensional sensing information, wherein the line piece group of liquid surface includes line pieces which are continuous parts of some of the one-dimensional sensing information, all values of sensing information belonging to the line piece group of liquid surface are larger than a first threshold; determining whether the line piece group of liquid surface contacts two edges of the touch panel if it is determined that the line piece group of liquid surface does exist; calculating two average values of values of sensing information corresponding to two sides of the two-dimensional sensing information which are separated by the line piece group of liquid surface if it is determined that the line piece group of liquid surface contacts two edges of the touch panel; determining one side with a larger one of the two average values is below a surface of the conductive liquid and another side is above the surface of the conductive liquid; and determining a liquid surface line according to an interface between the line piece group of liquid surface and the side above the surface of the conductive liquid.

In one embodiment, in order to confirm the covered area is submerged in the conductive liquid rather than covered by other object, the processor module is further configured to execute instruction for implementing following steps: determining whether the larger one of the two average values is larger than a second threshold, where the first threshold is larger than the second threshold; and proceeding the determining the liquid surface line step when it is determined that the larger one of the two average values is larger than the second threshold.

In one embodiment, in order to find out a straight line which is the closest to the real liquid surface, the liquid surface line is a straight line, where a sum of distances between the liquid surface line and an interface between the line piece group of liquid surface and the side above the surface of the conductive liquid is smallest.

In one embodiment, in order to provide a more real liquid surface line, the liquid surface line is a curved line, which passes sensing points corresponding to the line piece group of liquid surface which are adjacent to the side above the surface of the conductive liquid.

In one embodiment, in order to provide a more real and lower liquid surface line, the liquid surface line is a curved line, which passes sensing points corresponding to the side above the surface of the conductive liquid which are adjacent to the line piece group of liquid surface.

According to one embodiment, the present application provides a touch sensitive processing method for detecting whether a touch panel is partially submerged in conductive liquid, wherein the touch panel comprises multiple parallel first electrodes and multiple second electrodes, the touch sensitive processing method comprising: driving one of the first electrodes and sensing the second electrodes, iteratively, for generating multiple one-dimensional sensing information; forming two-dimensional sensing information according to the multiple one-dimensional sensing information; determining whether a line piece group of liquid surface exists according to the two-dimensional sensing information, wherein the line piece group of liquid surface includes line pieces which are continuous parts of some of the one-dimensional sensing information, all values of sensing information belonging to the line piece group of liquid surface are larger than a first threshold; determining whether the line piece group of liquid surface contacts two edges of the touch panel if it is determined that the line piece group of liquid surface does exist; calculating two average values of values of sensing information corresponding to two sides of the two-dimensional sensing information which are separated by the line piece group of liquid surface if it is determined that the line piece group of liquid surface contacts two edges of the touch panel; determining one side with a larger one of the two average values is below a surface of the conductive liquid and another side is above the surface of the conductive liquid; and determining a liquid surface line according to an interface between the line piece group of liquid surface and the side above the surface of the conductive liquid.

In one embodiment, in order to confirm the covered area is submerged in the conductive liquid rather than covered by other object, the touch sensitive processing method further comprises: determining whether the larger one of the two average values is larger than a second threshold, where the first threshold is larger than the second threshold; and proceeding the determining the liquid surface line step when it is determined that the larger one of the two average values is larger than the second threshold.

In one embodiment, in order to find out a straight line which is the closest to the real liquid surface, the liquid surface line is a straight line, where a sum of distances between the liquid surface line and an interface between the line piece group of liquid surface and the side above the surface of the conductive liquid is smallest.

In one embodiment, in order to provide a more real liquid surface line, the liquid surface line is a curved line, which passes sensing points corresponding to the line piece group of liquid surface which are adjacent to the side above the surface of the conductive liquid.

In one embodiment, in order to provide a more real and lower liquid surface line, the liquid surface line is a curved line, which passes sensing points corresponding to the side above the surface of the conductive liquid which are adjacent to the line piece group of liquid surface.

According to an embodiment, the present application provides a touch system for detecting whether a touch panel is partially submerged in conductive liquid, comprising: a touch panel, comprising multiple parallel first electrodes and multiple parallel second electrodes; and a touch sensitive processing apparatus, comprising: a driving circuit module; a sensing circuit module; an interconnection network module, configured to connect the driving circuit module and one of the multiple parallel first electrodes and the multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: having the driving circuit module drive one of the first electrodes and having the sensing circuit module sense the second electrodes, iteratively, for generating multiple one-dimensional sensing information; forming two-dimensional sensing information according to the multiple one-dimensional sensing information; determining whether a line piece group of liquid surface exists according to the two-dimensional sensing information, wherein the line piece group of liquid surface includes line pieces which are continuous parts of some of the one-dimensional sensing information, all values of sensing information belonging to the line piece group of liquid surface are larger than a first threshold; determining whether the line piece group of liquid surface contacts two edges of the touch panel if it is determined that the line piece group of liquid surface does exist; calculating two average values of values of sensing information corresponding to two sides of the two-dimensional sensing information which are separated by the line piece group of liquid surface if it is determined that the line piece group of liquid surface contacts two edges of the touch panel; determining one side with a larger one of the two average values is below a surface of the conductive liquid and another side is above the surface of the conductive liquid; and determining a liquid surface line according to an interface between the line piece group of liquid surface and the side above the surface of the conductive liquid.

In one embodiment, in order to confirm the covered area is submerged in the conductive liquid rather than covered by other object, the processor module is further configured to execute instruction for implementing following steps: determining whether the larger one of the two average values is larger than a second threshold, where the first threshold is larger than the second threshold; and proceeding the determining the liquid surface line step when it is determined that the larger one of the two average values is larger than the second threshold.

In one embodiment, in order to find out a straight line which is the closest to the real liquid surface, the liquid surface line is a straight line, where a sum of distances between the liquid surface line and an interface between the line piece group of liquid surface and the side above the surface of the conductive liquid is smallest.

In one embodiment, in order to a more real liquid surface line, the liquid surface line is a curved line, which passes sensing points corresponding to the line piece group of liquid surface which are adjacent to the side above the surface of the conductive liquid.

In one embodiment, in order to a more real and lower liquid surface line, the liquid surface line is a curved line, which passes sensing points corresponding to the side above the surface of the conductive liquid which are adjacent to the line piece group of liquid surface.

According to an embodiment, the present application provides a touch sensitive processing apparatus for detecting whether a touch panel is partially submerged in conductive liquid, comprising: a driving circuit module; a sensing circuit module; an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: detecting a liquid surface line, by the driving circuit module, the sensing circuit module and the interconnection network module, and a covered area of the touch panel, below the liquid surface line, which is covered by the conductive liquid; detecting first touching or approximating event in the covered area; when zero or three first touching or approximating events are detected, reporting no first touching or approximating event to a host; and when one first touching or approximating event is detected, reporting the first touching or approximating event to the host.

In one embodiment, in order to report touching or approximating events above the liquid surface line, the processor module is further configured to execute instruction for implementing following steps: having the driving circuit module drive one of the first electrodes and having the sensing circuit module sense the second electrodes, iteratively, for generating multiple one-dimensional sensing information; forming two-dimensional sensing information according to the multiple one-dimensional sensing information; calculating one or more second touching or approximating events according to the two-dimensional sensing information; reporting the one or more second touching or approximating events which are outside the covered area to the host.

In one embodiment, in order to report an rectangle defined by two touching or approximating events below the liquid surface line, the processor module is further configured to execute instruction for implementing following steps: when two first touching or approximating events are detected in the covered zone, forming a rectangle with four vertices according to the two first touching or approximating events; and reporting the rectangle to the host.

In one embodiment, in order to report an rectangle defined by two touching or approximating events below the liquid surface line, the processor module is further configured to execute instruction for implementing following steps: when two first touching or approximating events are detected in the covered zone, forming a rectangle with four vertices according to the two first touching or approximating events; and when the four vertices are inside the covered area, reporting the rectangle to the host.

In one embodiment, in order to distinguish two touching or approximating events from the rectangle, the four vertices of the rectangle sequentially includes a first vertex, a second vertex, a third vertex and a fourth vertex, wherein the processor module is further configured to execute instruction for implementing following steps: having the driving circuit module drive one of the first electrodes and having the sensing circuit module sense the second electrodes, iteratively, for generating multiple one-dimensional sensing information; forming two-dimensional sensing information according to the multiple one-dimensional sensing information; calculating one or more second touching or approximating events according to the two-dimensional sensing information; when the first vertex is not inside the covered area, determining whether the vertex is corresponding to one of the second touching or approximating events; when the first vertex is corresponding to one of the second touching or approximating events, reporting the third vertex as a first touching or approximating event to the host; and when the first vertex is not corresponding to one of the second touching or approximating events, reporting the two vertex and the fourth vertex as the first touching or approximating events to the host.

In one embodiment, in order to detect touching or approximating event inside the covered area, the processor module is further configured to execute instruction for implementing following steps: having the driving circuit module drive one of the first electrodes and having the sensing circuit module sense the second electrodes, iteratively, for generating multiple one-dimensional sensing information; forming two-dimensional sensing information according to the multiple one-dimensional sensing information; calculating one or more second touching or approximating events according to the two-dimensional sensing information; when the first vertex is not inside the covered area, determining whether the vertex is corresponding to one of the second touching or approximating events; when the first vertex is corresponding to one of the second touching or approximating events, reporting the third vertex as a first touching or approximating event to the host; and when the first vertex is not corresponding to one of the second touching or approximating events, reporting the two vertex and the fourth vertex as the first touching or approximating events to the host.

In one embodiment, in order to detect touching or approximating event inside the covered area, the processor module is further configured to execute instruction for implementing following steps: having the driving circuit module simultaneously drive the first electrodes inside the covered area and having the sensing circuit module sense the second electrodes inside the covered area for generating multiple second sensing values; determining at least one second coordinate value according to the multiple second sensing values; having the driving circuit module simultaneously drive the second electrodes inside the covered area and having the sensing circuit module sense the first electrodes inside the covered area for generating multiple first sensing values; determining at least one first coordinate value according to the multiple first sensing values; and determining there exists one second touching or approximating event located at a position represented by the first coordinate value and a second coordinate value.

In one embodiment, in order to detect touching or approximating event inside the covered area, the processor module is further configured to execute instruction for implementing following steps: having the driving circuit module simultaneously drive the first electrodes inside the covered area; having the sensing circuit module sense the first electrodes and the second electrodes inside the covered area for generating multiple first sensing values and multiple second sensing values, respectively; determining at least one first coordinate value according to the multiple first sensing values; determining at least one second coordinate value according to the multiple second sensing values; and determining there exists one second touching or approximating event located at a position represented by the first coordinate value and a second coordinate value.

In one embodiment, in order to detect touching or approximating event inside the covered area, the processor module is further configured to execute instruction for implementing following steps: having the driving circuit module simultaneously drive the first electrodes inside the covered area and having the sensing circuit module sense the first electrodes inside the covered area for generating multiple first sensing values; determining at least one first coordinate value according to the multiple first sensing values; having the driving circuit module simultaneously drive the second electrodes inside the covered area and having the sensing circuit module sense the second electrodes inside the covered area for generating multiple second sensing values; determining at least one second coordinate value according to the multiple second sensing values; and determining there exists one second touching or approximating event located at a position represented by the first coordinate value and a second coordinate value.

According to one embodiment, the present application provides a touch sensitive processing method for detecting whether a touch panel is partially submerged in conductive liquid, wherein the touch panel comprises multiple parallel first electrodes and multiple parallel second electrodes, comprising: detecting a liquid surface line and a covered area of the touch panel, below the liquid surface line, which is covered by the conductive liquid; detecting first touching or approximating event in the covered area; when zero or three first touching or approximating events are detected, reporting no first touching or approximating event to a host; and when one first touching or approximating event is detected, reporting the first touching or approximating event to the host.

In one embodiment, in order to report touching or approximating events above the liquid surface line, the method further comprises: driving one of the first electrodes and sensing the second electrodes, iteratively, for generating multiple one-dimensional sensing information; forming two-dimensional sensing information according to the multiple one-dimensional sensing information; calculating one or more second touching or approximating events according to the two-dimensional sensing information; reporting the one or more second touching or approximating events which are outside the covered area to the host.

In one embodiment, in order to report an rectangle defined by two touching or approximating events below the liquid surface line, the method further comprises: when two first touching or approximating events are detected in the covered zone, forming a rectangle with four vertices according to the two first touching or approximating events; and reporting the rectangle to the host.

In one embodiment, in order to report an rectangle defined by two touching or approximating events below the liquid surface line, the method further comprises: when two first touching or approximating events are detected in the covered zone, forming a rectangle with four vertices according to the two first touching or approximating events; and when the four vertices are inside the covered area, reporting the rectangle to the host.

In one embodiment, in order to distinguish two touching or approximating events from the rectangle, the four vertices of the rectangle sequentially includes a first vertex, a second vertex, a third vertex and a fourth vertex, the method further comprises: driving one of the first electrodes and sensing the second electrodes, iteratively, for generating multiple one-dimensional sensing information; forming two-dimensional sensing information according to the multiple one-dimensional sensing information; calculating one or more second touching or approximating events according to the two-dimensional sensing information; when the first vertex is not inside the covered area, determining whether the vertex is corresponding to one of the second touching or approximating events; when the first vertex is corresponding to one of the second touching or approximating events, reporting the third vertex as a first touching or approximating event to the host; and when the first vertex is not corresponding to one of the second touching or approximating events, reporting the two vertex and the fourth vertex as the first touching or approximating events to the host.

In one embodiment, in order to detect touching or approximating event inside the covered area, the method further comprises: simultaneously driving the first electrodes inside the covered area and sensing the second electrodes inside the covered area for generating multiple second sensing values; determining at least one second coordinate value according to the multiple second sensing values; simultaneously driving the second electrodes inside the covered area and sensing the first electrodes inside the covered area for generating multiple first sensing values; determining at least one first coordinate value according to the multiple first sensing values; and determining there exists one second touching or approximating event located at a position represented by the first coordinate value and a second coordinate value.

In one embodiment, in order to detect touching or approximating event inside the covered area, the method further comprises: simultaneously driving the first electrodes inside the covered area; sensing the first electrodes and the second electrodes inside the covered area for generating multiple first sensing values and multiple second sensing values, respectively; determining at least one first coordinate value according to the multiple first sensing values; determining at least one second coordinate value according to the multiple second sensing values; and determining there exists one second touching or approximating event located at a position represented by the first coordinate value and a second coordinate value.

In one embodiment, in order to detect touching or approximating event inside the covered area, the method further comprises: simultaneously driving the first electrodes inside the covered area and sensing the first electrodes inside the covered area for generating multiple first sensing values; determining at least one first coordinate value according to the multiple first sensing values; simultaneously driving the second electrodes inside the covered area and sensing the second electrodes inside the covered area for generating multiple second sensing values; determining at least one second coordinate value according to the multiple second sensing values; and determining there exists one second touching or approximating event located at a position represented by the first coordinate value and a second coordinate value.

According to one embodiment, the present application provides a touch system for detecting whether a touch panel is partially submerged in conductive liquid, comprising: the touch panel; and a touch sensitive processing apparatus, comprising: a driving circuit module; a sensing circuit module; an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and a processor module, connected to the driving circuit module, the sensing circuit module and the interconnection network module, configured to execute instruction for implementing following steps: detecting a liquid surface line, by the driving circuit module, the sensing circuit module and the interconnection network module, and a covered area of the touch panel, below the liquid surface line, which is covered by the conductive liquid; detecting first touching or approximating event in the covered area; when zero or three first touching or approximating events are detected, reporting no first touching or approximating event to a host; and when one first touching or approximating event is detected, reporting the first touching or approximating event to the host.

In one embodiment, the touch system further comprises the host.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch sensitive processing apparatus for detecting whether a touch panel is partially submerged in conductive liquid, comprising:
    a driving circuit module;
    a sensing circuit module;
    an interconnection network module, configured to connect the driving circuit module and one of multiple parallel first electrodes and multiple parallel second electrodes of the touch panel and to connect the sensing circuit module and one of the multiple parallel first electrodes and the multiple parallel second electrodes of the touch panel; and
    a processor module, connected to the driving circuit module, the sensing circuit module and the interconnection network module, configured to execute instruction for implementing following steps:
        having the driving circuit module drive one of the first electrodes and having the sensing circuit module sense the second electrodes, iteratively, for generating multiple one-dimensional sensing information;
        forming two-dimensional sensing information according to the multiple one-dimensional sensing information;
        determining whether a line piece group of liquid surface exists according to the two-dimensional sensing information, wherein the line piece group of liquid surface includes line pieces which are continuous parts of some of the one-dimensional sensing information, at least one or more values of sensing information belonging to each of the line pieces of the line piece group of liquid surface are larger than a first threshold;
        determining whether the line piece group of liquid surface contacts exactly two edges of the touch panel if it is determined that the line piece group of liquid surface does exist;
        calculating two average values of values of sensing information corresponding to two sides of the two-dimensional sensing information which are separated by the line piece group of liquid surface, respectively, if it is determined that the line piece group of liquid surface contacts exactly two edges of the touch panel;
        determining whether the larger one of the two average values is larger than a second threshold, where the first threshold is larger than the second threshold;
        determining the touch panel is partially covered by a large object other than conductive liquid when the larger one of the two average values is less than the second threshold;
        determining one side with the larger one of the two average values is below a surface of the conductive liquid and another side is above the surface of the conductive liquid when the larger one of the two average values is larger than the second threshold; and
        determining a liquid surface line according to an interface between the line piece group of liquid surface and the side above the surface of the conductive liquid.

2. The touch sensitive processing apparatus as claimed in claim 1, wherein the liquid surface line is a straight line, where a sum of distances between the liquid surface line and an interface between the line piece group of liquid surface and the side above the surface of the conductive liquid is smallest.

3. The touch sensitive processing apparatus as claimed in claim 1, wherein the liquid surface line is a curved line, which passes sensing points corresponding to the line piece group of liquid surface which are adjacent to the side above the surface of the conductive liquid.

4. The touch sensitive processing apparatus as claimed in claim 1, wherein the liquid surface line is a curved line, which passes sensing points corresponding to the side above the surface of the conductive liquid which are adjacent to the line piece group of liquid surface.

5. A touch sensitive processing method for detecting whether a touch panel is partially submerged in conductive liquid, wherein the touch panel comprises multiple parallel first electrodes and multiple second electrodes, the touch sensitive processing method comprising:
    driving one of the first electrodes and sensing the second electrodes, iteratively, for generating multiple one-dimensional sensing information;
    forming two-dimensional sensing information according to the multiple one-dimensional sensing information;
    determining whether a line piece group of liquid surface exists according to the two-dimensional sensing information, wherein the line piece group of liquid surface includes line pieces which are continuous parts of some of the one-dimensional sensing information, at least one or more values of sensing information belonging to each of the line pieces of the line piece group of liquid surface are larger than a first threshold;

determining whether the line piece group of liquid surface contacts exactly two edges of the touch panel if it is determined that the line piece group of liquid surface does exist;

calculating two average values of values of sensing information corresponding to two sides of the two-dimensional sensing information which are separated by the line piece group of liquid surface, respectively, if it is determined that the line piece group of liquid surface contacts exactly two edges of the touch panel;

determining whether the larger one of the two average values is larger than a second threshold, where the first threshold is larger than the second threshold;

determining the touch panel is partially covered by a large object other than conductive liquid when the larger one of the two average values is less than the second threshold;

determining one side with the larger one of the two average values is below a surface of the conductive liquid and another side is above the surface of the conductive liquid when the larger one of the two average values is larger than the second threshold; and determining a liquid surface line according to an interface between the line piece group of liquid surface and the side above the surface of the conductive liquid.

6. The touch sensitive processing method of claim 5, wherein the liquid surface line is a straight line, where a sum of distances between the liquid surface line and an interface between the line piece group of liquid surface and the side above the surface of the conductive liquid is smallest.

7. The touch sensitive processing method of claim 5, wherein the liquid surface line is a curved line, which passes sensing points corresponding to the line piece group of liquid surface which are adjacent to the side above the surface of the conductive liquid.

8. The touch sensitive processing method of claim 5, wherein the liquid surface line is a curved line, which passes sensing points corresponding to the side above the surface of the conductive liquid which are adjacent to the line piece group of liquid surface.

9. A touch system for detecting whether a touch panel is partially submerged in conductive liquid, comprising:

the touch panel, comprising multiple parallel first electrodes and multiple parallel second electrodes; and a touch sensitive processing apparatus, comprising:
 a driving circuit module;
 a sensing circuit module;
 an interconnection network module, configured to connect the driving circuit module and one of the multiple parallel first electrodes and the multiple parallel second electrodes of the touch panel and to connect the sensing circuit module and one of the multiple parallel first electrodes and the multiple parallel second electrodes of the touch panel; and
 a processor module, connected to the driving circuit module, the sensing circuit module and the interconnection network module, configured to execute instruction for implementing following steps:
  having the driving circuit module drive one of the first electrodes and having the sensing circuit module sense the second electrodes, iteratively, for generating multiple one-dimensional sensing information;
  forming two-dimensional sensing information according to the multiple one-dimensional sensing information;
  determining whether a line piece group of liquid surface exists according to the two-dimensional sensing information, wherein the line piece group of liquid surface includes line pieces which are continuous parts of some of the one-dimensional sensing information, at least one or more values of sensing information belonging to each of the line pieces of the line piece group of liquid surface are larger than a first threshold;
  determining whether the line piece group of liquid surface contacts exactly two edges of the touch panel if it is determined that the line piece group of liquid surface does exist;
  calculating two average values of values of sensing information corresponding to two sides of the two-dimensional sensing information which are separated by the line piece group of liquid surface, respectively, if it is determined that the line piece group of liquid surface contacts exactly two edges of the touch panel;
  determining whether the larger one of the two average values is larger than a second threshold, where the first threshold is larger than the second threshold;
  determining the touch panel is partially covered by a large object other than conductive liquid when the larger one of the two average values is less than the second threshold;
  determining one side with the larger one of the two average values is below a surface of the conductive liquid and another side is above the surface of the conductive liquid when the larger one of the two average values is larger than the second threshold; and
  determining a liquid surface line according to an interface between the line piece group of liquid surface and the side above the surface of the conductive liquid.

10. The touch system as claimed in claim 9, wherein the liquid surface line is a straight line, where a sum of distances between the liquid surface line and an interface between the line piece group of liquid surface and the side above the surface of the conductive liquid is smallest.

11. The touch system as claimed in claim 9, wherein the liquid surface line is a curved line, which passes sensing points corresponding to the line piece group of liquid surface which are adjacent to the side above the surface of the conductive liquid.

12. The touch system as claimed in claim 9, wherein the liquid surface line is a curved line, which passes sensing points corresponding to the side above the surface of the conductive liquid which are adjacent to the line piece group of liquid surface.

* * * * *